US009398201B2

(12) United States Patent
Imaoka

(10) Patent No.: US 9,398,201 B2
(45) Date of Patent: Jul. 19, 2016

(54) ZOOM LENS SYSTEM, INTERCHANGEABLE LENS APPARATUS AND CAMERA SYSTEM

(71) Applicant: Panasonic Intellectual Property Management Co., Ltd., Osaka (JP)

(72) Inventor: Takuya Imaoka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/687,075

(22) Filed: Apr. 15, 2015

(65) Prior Publication Data

US 2015/0237242 A1 Aug. 20, 2015

Related U.S. Application Data

(63) Continuation of application No. PCT/JP2014/004630, filed on Sep. 9, 2014.

(30) Foreign Application Priority Data

Sep. 27, 2013 (JP) ................................. 2013-201518

(51) Int. Cl.
- *G02B 15/14* (2006.01)
- *G02B 27/64* (2006.01)
- *H04N 5/225* (2006.01)
- *G02B 15/173* (2006.01)

(52) U.S. Cl.
CPC .............. *H04N 5/2254* (2013.01); *G02B 15/14* (2013.01); *G02B 15/173* (2013.01); *G02B 27/646* (2013.01)

(58) Field of Classification Search
CPC ........ G02B 15/00; G02B 15/14; G02B 15/15; G02B 15/16; G02B 15/163; G02B 15/173; G02B 15/20; G02B 15/28; G02B 15/22; G02B 27/64; G02B 27/646; H04N 5/2254
See application file for complete search history.

(56) References Cited

U.S. PATENT DOCUMENTS

| 5,189,557 A | 2/1993 | Endo |
| 6,061,180 A * | 5/2000 | Hayakawa ........... G02B 15/173 359/557 |

(Continued)

FOREIGN PATENT DOCUMENTS

| JP | 04-186212 | 7/1992 |
| JP | 2010-039271 | 2/2010 |

(Continued)

OTHER PUBLICATIONS

International Search Report issued Oct. 21, 2014 in International (PCT) Application No. PCT/JP2014/004630.

*Primary Examiner* — Thong Nguyen
(74) *Attorney, Agent, or Firm* — Wenderoth, Lind & Ponack, L.L.P.

(57) ABSTRACT

A zoom lens system, in order from an object side to an image side, comprising: a first lens unit having positive optical power; a second lens unit having negative optical power; a third lens unit having positive optical power; a fourth lens unit having negative optical power, a fifth lens unit having negative optical power; and a sixth lens unit having positive optical power, wherein the condition: $3.5<|f_6/f_2|<15.5$ ($f_2$: a focal length of the second lens unit, $f_6$: a focal length of the sixth lens unit) is satisfied.

8 Claims, 33 Drawing Sheets

(56) References Cited

U.S. PATENT DOCUMENTS

| | | |
|---|---|---|
| 2010/0033836 A1 | 2/2010 | Ohtake |
| 2011/0228160 A1* | 9/2011 | Imaoka ............... G02B 15/173 348/345 |
| 2011/0286107 A1 | 11/2011 | Yamanaka et al. |
| 2012/0050603 A1 | 3/2012 | Imaoka et al. |
| 2013/0148005 A1 | 6/2013 | Imaoka et al. |
| 2015/0219882 A1* | 8/2015 | Mogi ................... G02B 15/173 348/345 |

FOREIGN PATENT DOCUMENTS

| | | |
|---|---|---|
| JP | 2011-247964 | 12/2011 |
| JP | 2012-047814 | 3/2012 |
| JP | 2012-063403 | 3/2012 |
| JP | 2013-025085 | 2/2013 |
| JP | 2013-182022 | 9/2013 |
| JP | 2014-006354 | 1/2014 |
| JP | 2014-006355 | 1/2014 |
| WO | 2012/026088 | 3/2012 |
| WO | 2013/129490 | 9/2013 |

* cited by examiner

ZOOM LENS SYSTEM, INTERCHANGEABLE LENS APPARATUS AND CAMERA SYSTEM

CROSS-REFERENCE TO RELATED APPLICATION

This application is a Continuation of International Application No. PCT/JP2014/004630, filed on Sep. 9, 2014, which in turn claims the benefit of Japanese Application No. 2013-201518, filed on Sep. 27, 2013, the disclosures of which Applications are incorporated by reference herein.

BACKGROUND

1. Field

The present disclosure relates to zoom lens systems, interchangeable lens apparatuses, and camera systems.

2. Description of the Related Art

In recent years, interchangeable-lens type digital camera systems (also referred to simply as "camera systems", hereinafter) have been spreading rapidly. Such interchangeable-lens type digital camera systems realize: taking of high-sensitive and high-quality images; high-speed focusing and high-speed image processing after image taking; and easy replacement of an interchangeable lens apparatus in accordance with a desired scene. Meanwhile, an interchangeable lens apparatus having a zoom lens system that forms an optical image with variable magnification is popular because it allows free change of the focal length.

Japanese Laid-Open Patent Publication No. 2012-047814 discloses a zoom lens system having a six-unit configuration of positive, negative, positive, negative, negative, and positive in which zooming is performed by moving a first lens unit, a second lens unit, a fourth lens unit, and a fifth lens unit, and focusing is performed by moving the fourth lens unit to the image side.

Japanese Laid-Open Patent Publication No. 2013-025085 discloses a zoom lens having a six-unit configuration of positive, negative, positive, negative, negative, and positive in which zooming is performed by moving all lens units and an aperture diaphragm, and focusing is performed by moving an object-side lens unit included in a second lens unit.

Japanese Laid-Open Patent Publication No. 2010-039271 discloses a variable focal length lens having a six-unit configuration of positive, negative, positive, negative, negative, and positive in which zooming is performed by moving first to third lens units, a fifth lens unit, and a sixth lens unit, and focusing is performed by moving the sixth lens unit to the object side.

SUMMARY

The present disclosure provides a zoom lens system having a short overall length, low decentering sensitivity, and excellent optical performance while having a high zoom ratio. Further, the present disclosure provides an interchangeable lens apparatus and a camera system each including the zoom lens system.

The novel concepts disclosed herein were achieved in order to solve the foregoing problems in the related art, and herein is disclosed:

a zoom lens system, in order from an object side to an image side, comprising:
a first lens unit having positive optical power;
a second lens unit having negative optical power;
a third lens unit having positive optical power;
a fourth lens unit having negative optical power,
a fifth lens unit having negative optical power; and
a sixth lens unit having positive optical power, wherein
the zoom lens system satisfies the following condition (1):

$$3.5 < |f_6/f_2| < 15.5 \tag{1}$$

where
$f_2$ is a focal length of the second lens unit, and
$f_6$ is a focal length of the sixth lens unit.

The novel concepts disclosed herein were achieved in order to solve the foregoing problems in the related art, and herein is disclosed:

an interchangeable lens apparatus comprising:
a zoom lens system; and
a lens mount section which is connectable to a camera body including an image sensor for receiving an optical image formed by the zoom lens system and converting the optical image into an electric image signal, wherein
the zoom lens system, in order from an object side to an image side, comprises:
a first lens unit having positive optical power;
a second lens unit having negative optical power;
a third lens unit having positive optical power;
a fourth lens unit having negative optical power,
a fifth lens unit having negative optical power; and
a sixth lens unit having positive optical power, and
the zoom lens system satisfies the following condition (1):

$$3.5 < |f_6/f_2| < 15.5 \tag{1}$$

where
$f_2$ is a focal length of the second lens unit, and
$f_6$ is a focal length of the sixth lens unit.

The novel concepts disclosed herein were achieved in order to solve the foregoing problems in the related art, and herein is disclosed:

a camera system comprising:
an interchangeable lens apparatus including a zoom lens system; and
a camera body which is detachably connected to the interchangeable lens apparatus via a camera mount section, and includes an image sensor for receiving an optical image formed by the zoom lens system and converting the optical image into an electric image signal, wherein
the zoom lens system, in order from an object side to an image side, comprises:
a first lens unit having positive optical power;
a second lens unit having negative optical power;
a third lens unit having positive optical power;
a fourth lens unit having negative optical power,
a fifth lens unit having negative optical power; and
a sixth lens unit having positive optical power, and
the zoom lens system satisfies the following condition (1):

$$3.5 < |f_6/f_2| < 15.5 \tag{1}$$

where
$f_2$ is a focal length of the second lens unit, and
$f_6$ is a focal length of the sixth lens unit.

The zoom lens system according to the present disclosure has a short overall length, low decentering sensitivity, and excellent optical performance while having a high zoom ratio.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Figure 1:
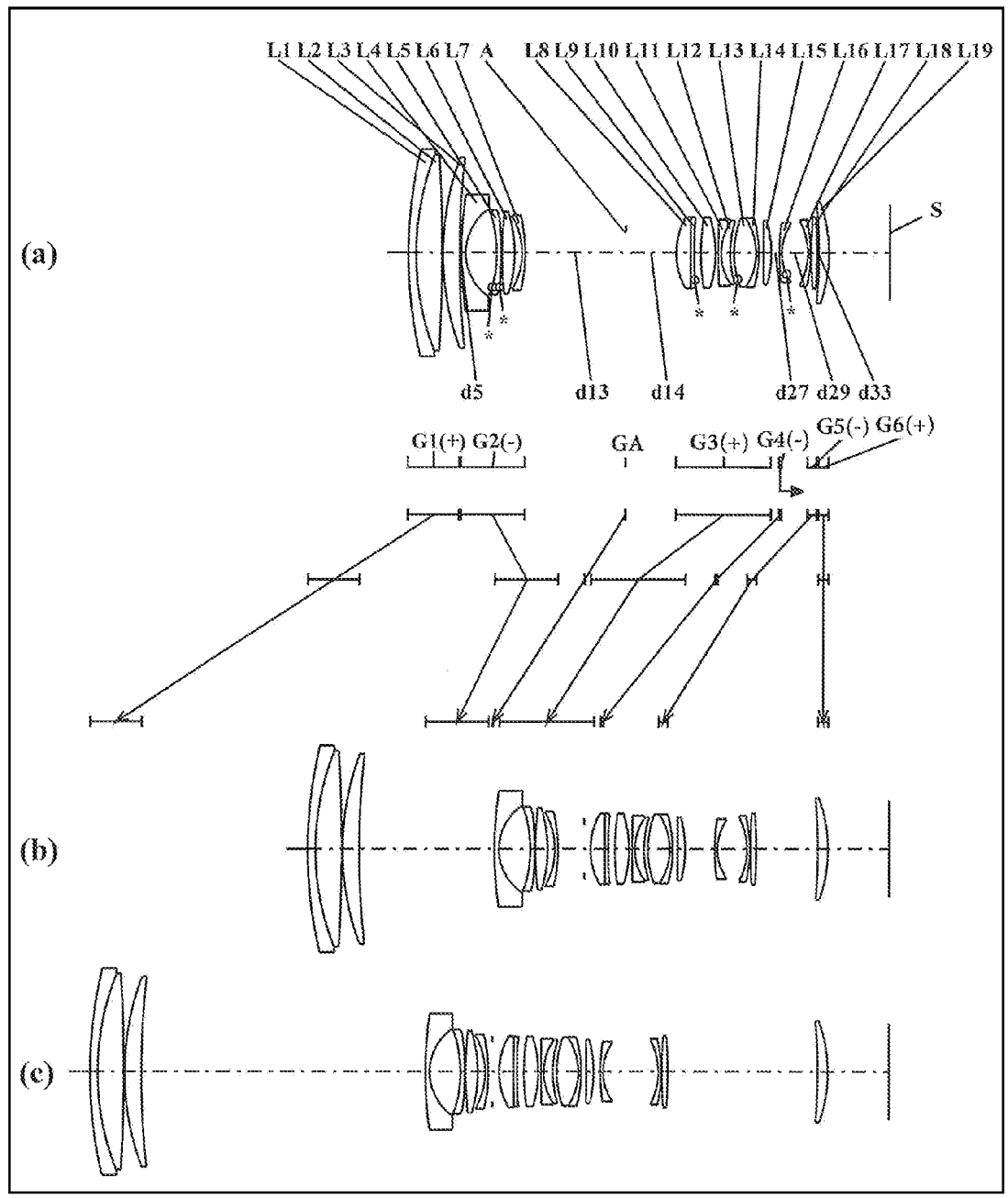
FIG. 1 is a lens arrangement diagram showing an infinity in-focus condition of a zoom lens system according to Embodiment 1 (Numerical Example 1)
Figure 2:
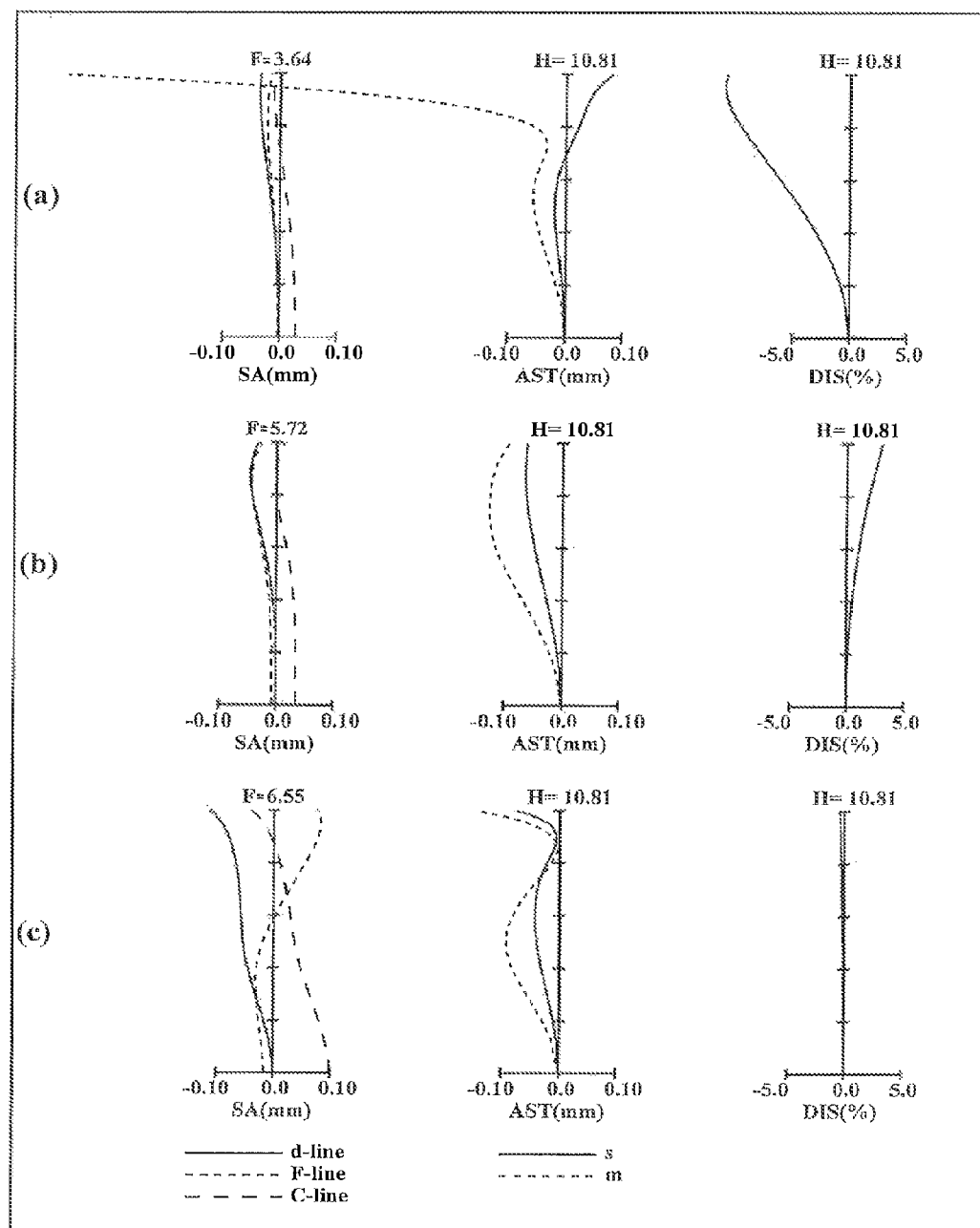
FIG. 2 is a longitudinal aberration diagram of an infinity in-focus condition of the zoom lens system according to Numerical Example 1.
Figure 3:
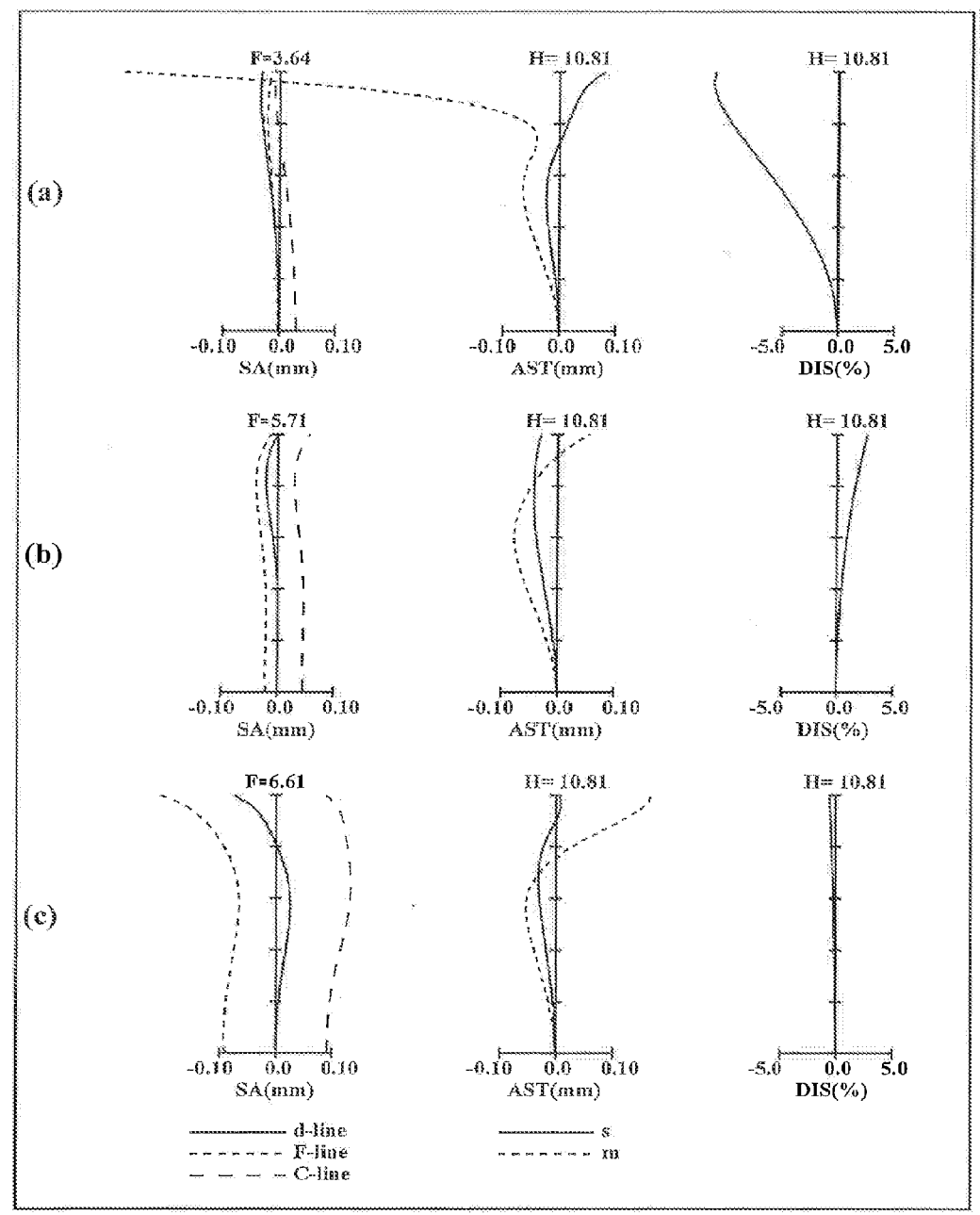
FIG. 3 is a longitudinal aberration diagram of a close-object in-focus condition of the zoom lens system according to Numerical Example 1.
Figure 4:
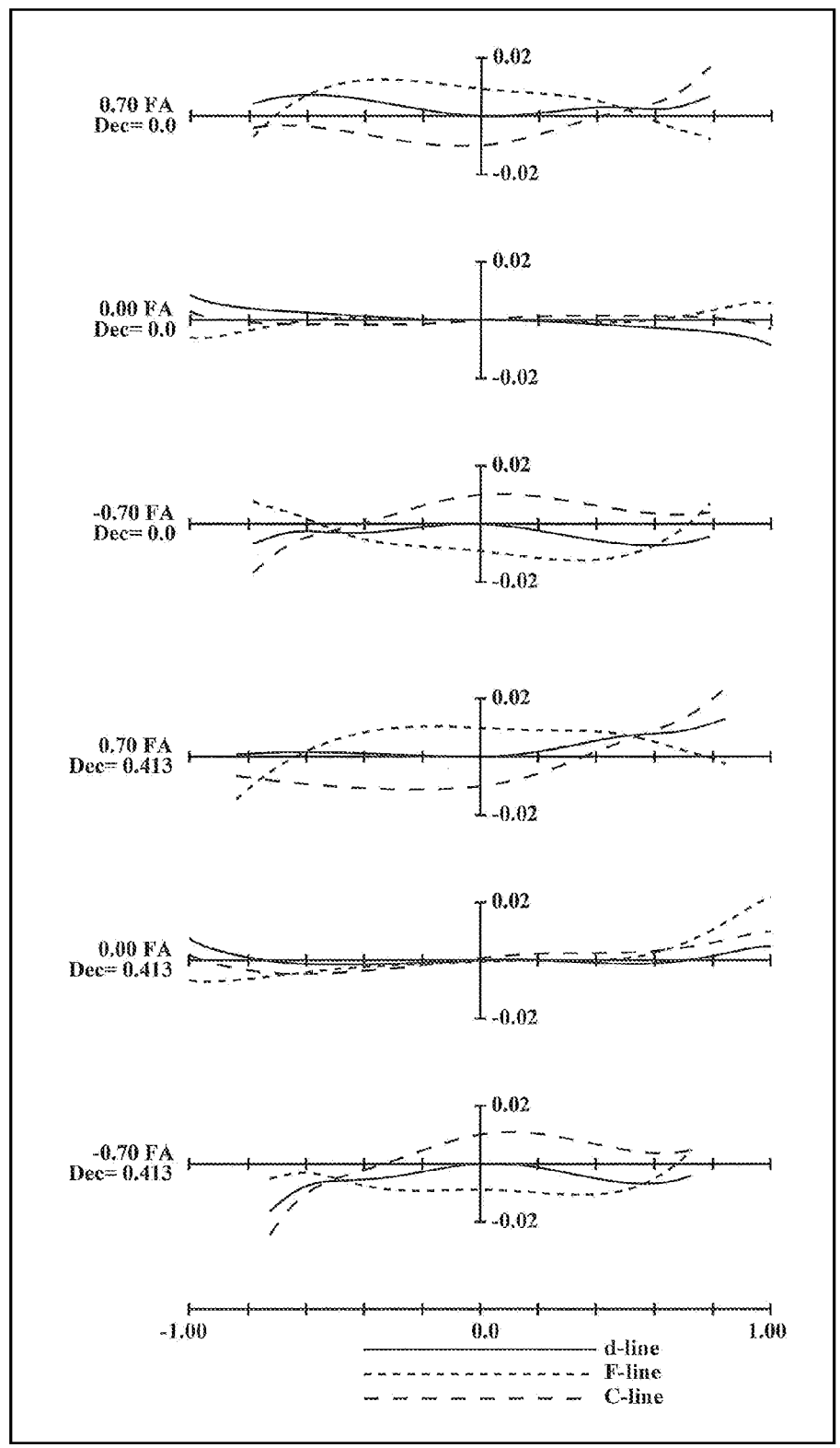
FIG. 4 is a lateral aberration diagram of the zoom lens system according to Numerical Example 1 at a telephoto limit in a basic state where image blur compensation is not performed and in an image blur compensation state.

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicant provides the attached drawings and the following description so that those skilled in the art can fully understand this disclosure. Therefore, the drawings and description are not intended to limit the subject defined by the claims.

Embodiments 1 to 8

FIGS. 1, 5, 9, 13, 17, 21, 25 and 29 are lens arrangement diagrams of zoom lens systems according to Embodiments 1 to 8, respectively. Each zoom lens system is in an infinity in-focus condition.

In each lens arrangement diagram, part (a) shows a lens configuration at a wide-angle limit, part (b) shows a lens configuration at a middle position, and part (c) shows a lens configuration at a telephoto limit. The wide-angle limit in part (a) indicates a minimum focal length condition, and the focal length in the minimum focal length condition is $f_W$. The middle position in part (b) indicates an intermediate focal length condition, and the focal length $f_M$ in the intermediate focal length condition is defined by the following formula (in the formula, $f_W$ is as described above, and $f_T$ is as described below);

$$f_M = \sqrt{(f_W * f_T)}$$

The telephoto limit in part (c) indicates a maximum focal length condition, and the focal length in the maximum focal length condition is $f_T$. In each lens arrangement diagram, each bent arrow located between part (a) and part (b) indicates a line obtained by connecting the positions of each lens unit respectively at a wide-angle limit, a middle position and a telephoto limit, in order from the top. In the part between the wide-angle limit and the middle position and the part between the middle position and the telephoto limit, the positions are connected simply with a straight line, and hence this line does not indicate actual motion of each lens unit.

Further, in each Fig., an arrow imparted to a lens unit indicates focusing from an infinity in-focus condition to a close-object in-focus condition.

That is, in FIGS. 1, 5, 9, 13, 17, 21, 25 and 29, the arrow indicates a direction along which a fourth lens unit G4 described later moves in focusing from the infinity in-focus condition to the close-object in-focus condition. In FIGS. 1, 5, 9, 13, 17, 21, 25 and 29, since the symbols of the respective lens units are imparted to part (a), the arrow indicating focusing is placed beneath each symbol of each lens unit for the convenience sake. However, the direction along which each lens unit moves in focusing in each zooming condition will be hereinafter described in detail for each embodiment.

Each of the zoom lens systems according to Embodiments 1, 2, 7 and 8, in order from the object side to the image side, comprises a first lens unit G1 having positive optical power, a second lens unit G2 having negative optical power, a diaphragm unit GA comprising solely an aperture diaphragm, a third lens unit G3 having positive optical power, a fourth lens unit G4 having negative optical power, a fifth lens unit G5 having negative optical power, and a sixth lens unit G6 having positive optical power.

In the zoom lens system according to each embodiment, in zooming, the respective lens units individually move in a direction along the optical axis such that the intervals between the respective lens units, that is, the interval between the first lens unit G1 and the second lens unit G2, the interval between the second lens unit G2 and the diaphragm unit GA, the interval between the diaphragm unit GA and the third lens unit G3, the interval between the third lens unit G3 and the fourth lens unit G4, the interval between the fourth lens unit G4 and the fifth lens unit G5, and the interval between the fifth lens unit G5 and the sixth lens unit G6, vary. In the zoom lens system according to each embodiment, these lens units are arranged in a desired optical power allocation, whereby size reduction of the entire lens system is achieved while having a high zoom ratio and maintaining excellent optical performance.

Each of the zoom lens systems according to Embodiments 3 to 6, in order from the object side to the image side, comprises a first lens unit G1 having positive optical power, a second lens unit G2 having negative optical power, a third lens unit G3 having positive optical power, a fourth lens unit G4 having negative optical power, a fifth lens unit G5 having negative optical power, and a sixth lens unit G6 having positive optical power.

In the zoom lens system according to each embodiment, in zooming, the respective lens units individually move in the direction along the optical axis such that the intervals between the respective lens units, that is, the interval between the first lens unit G1 and the second lens unit G2, the interval between the second lens unit G2 and the third lens unit G3, the interval between the third lens unit G3 and the fourth lens unit G4, the interval between the fourth lens unit G4 and the fifth lens unit G5, and the interval between the fifth lens unit G5 and the sixth lens unit G6, vary. In the zoom lens system according to each embodiment, these lens units are arranged in a desired optical power allocation, whereby size reduction of the entire lens system is achieved while having a high zoom ratio and maintaining excellent optical performance.

In FIGS. 1, 5, 9, 13, 17, 21, 25 and 29, an asterisk "*" imparted to a particular surface indicates that the surface is aspheric. In each Fig., symbol (+) or (−) imparted to the symbol of each lens unit corresponds to the sign of the optical power of the lens unit. In each Fig., a straight line located on the most right-hand side indicates the position of an image surface S.

Further, as shown in FIGS. 1, 5, 25 and 29, in the zoom lens systems according to Embodiments 1, 2, 7 and 8, the diaphragm unit GA comprises solely an aperture diaphragm A. As shown in FIGS. 9, 13, 17 and 21, in the zoom lens systems according to Embodiments 3 to 6, an aperture diaphragm A is provided in the third lens unit G3, that is, on the object side of an eighth lens element L8.

Embodiment 1

As shown in FIG. 1, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

The second lens unit G2, in order from the object side to the image side, comprises: a negative meniscus fourth lens element L4 with the convex surface facing the object side; a negative meniscus fifth lens element L5 with the convex surface facing the image side; a bi-convex sixth lens element L6; and a negative meniscus seventh lens element L7 with the convex surface facing the image side. The fifth lens element L5 has an aspheric object side surface and an aspheric image side surface.

The diaphragm unit GA comprises solely an aperture diaphragm A.

The third lens unit G3, in order from the object side to the image side, comprises: a positive meniscus eighth lens element L8 with the convex surface facing the object side; a negative meniscus ninth lens element L9 with the convex surface facing the object side; a bi-convex tenth lens element L10; a negative meniscus eleventh lens element L11 with the convex surface facing the object side; a positive meniscus twelfth lens element L12 with the convex surface facing the object side; a bi-convex thirteenth lens element L13; a negative meniscus fourteenth lens element L14 with the convex surface facing the image side; and a positive meniscus fifteenth lens element L15 with the convex surface facing the image side. Among these, the eighth lens element L8 and the ninth lens element L9 are cemented with each other, the eleventh lens element L11 and the twelfth lens element L12 are cemented with each other, and the thirteenth lens element L13 and the fourteenth lens element L14 are cemented with each other. The ninth lens element L9 has an aspheric image side surface, and the thirteenth lens element L13 has an aspheric object side surface.

The third lens unit G3, in order from the object side to the image side, comprises a 3A unit having positive optical power, a 3B unit having positive optical power, and a 3C unit having positive optical power. The eighth lens element L8, the ninth lens element L9, the tenth lens element L10, the eleventh lens element L11, and the twelfth lens element L12 correspond to the 3A unit, the thirteenth lens element L13 and the fourteenth lens element L14 correspond to the 3B unit, and the fifteenth lens element L15 corresponds to the 3C unit.

The fourth lens unit G4 comprises solely a negative meniscus sixteenth lens element L16 with the convex surface facing the object side. The sixteenth lens element L16 has an aspheric image side surface.

The fifth lens unit G5, in order from the object side to the image side, comprises: a negative meniscus seventeenth lens element L17 with the convex surface facing the image side; and a bi-convex eighteenth lens element L18.

The sixth lens unit G6 comprises solely a positive meniscus nineteenth lens element L19 with the convex surface facing the image side.

In the zoom lens system according to Embodiment 1, the thirteenth lens element L13 and the fourteenth lens element L14 corresponding to the 3B unit in the third lens unit G3 correspond to an image blur compensating lens unit described later which moves in a direction perpendicular to the optical axis to optically compensate image blur.

In the zoom lens system according to Embodiment 1, in zooming from the wide-angle limit to the telephoto limit at the time of image taking, the first lens unit G1, the diaphragm unit GA, the third lens unit G3, the fourth lens unit G4, and the fifth lens unit G5 monotonically move to the object side, the second lens unit G2 moves with locus of a convex to the image side, and the sixth lens unit G6 is fixed with respect to the image surface S. That is, in zooming, the respective lens units individually move along the optical axis such that the interval between the first lens unit G1 and the second lens unit G2, the interval between the fourth lens unit G4 and the fifth lens unit G5, and the interval between the fifth lens unit G5 and the sixth lens unit G6 increase, the interval between the second lens unit G2 and the diaphragm unit GA and the interval between the diaphragm unit GA and the third lens unit G3 decrease, and the interval between the third lens unit G3 and the fourth lens unit G4 varies.

In the zoom lens system according to Embodiment 1, in focusing from the infinity in-focus condition to the close-object in-focus condition, the fourth lens unit G4 serving as a focusing lens unit moves to the image side along the optical axis in any zooming condition.

Embodiment 2

Figure 5:
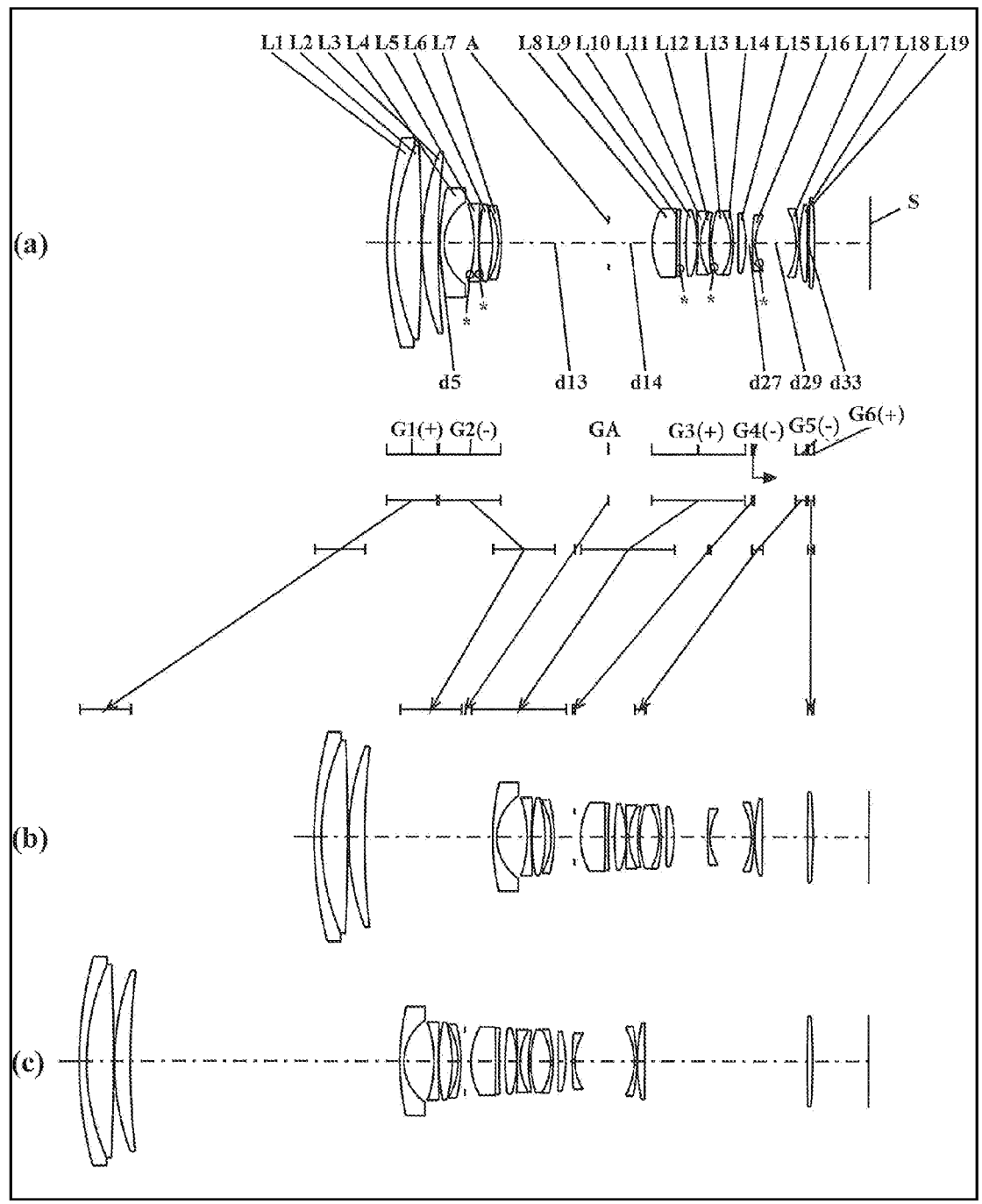
FIG. 5 is a lens arrangement diagram showing an infinity in-focus condition of a zoom lens system according to Embodiment 2 (Numerical Example 2)
Figure 6:
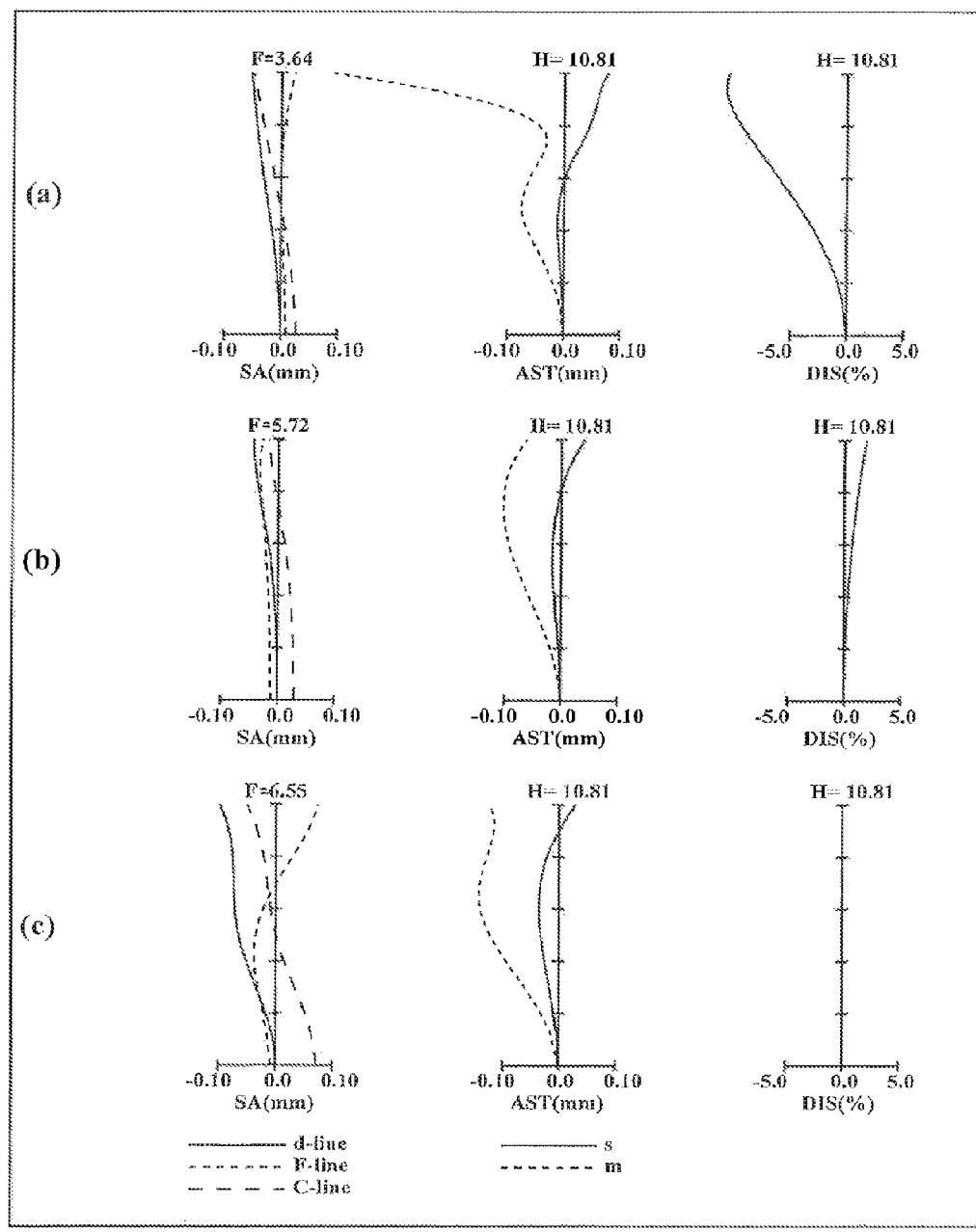
FIG. 6 is a longitudinal aberration diagram of an infinity in-focus condition of the zoom lens system according to Numerical Example 2.
Figure 7:
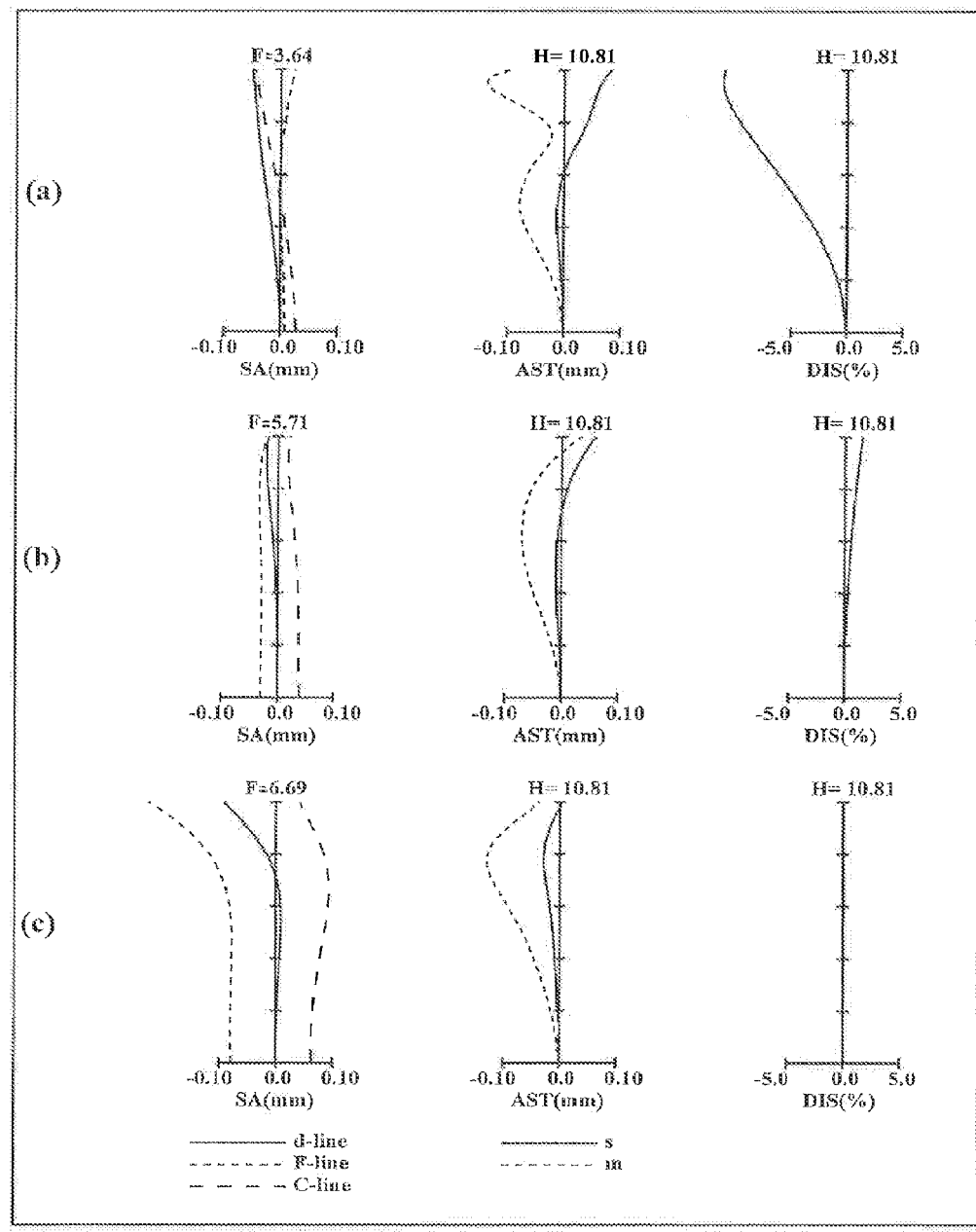
FIG. 7 is a longitudinal aberration diagram of a close-object in-focus condition of the zoom lens system according to Numerical Example 2.
Figure 8:
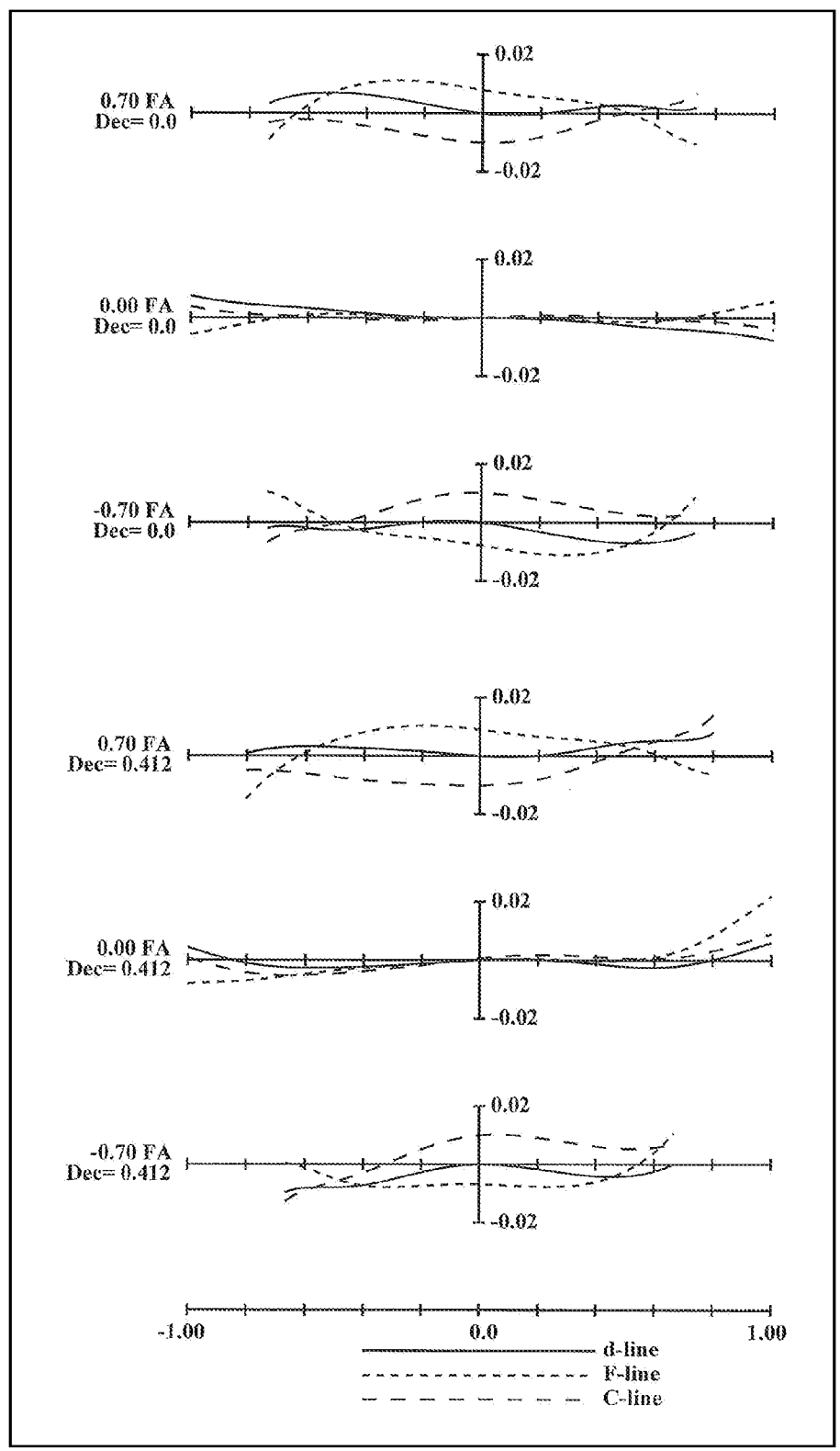
FIG. 8 is a lateral aberration diagram of the zoom lens system according to Numerical Example 2 at a telephoto limit in a basic state where image blur compensation is not performed and in an image blur compensation state.

As shown in FIG. 5, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side. The fifth lens element L5 has an aspheric object side surface and an aspheric image side surface.

The diaphragm unit GA comprises solely an aperture diaphragm A.

The third lens unit G3, in order from the object side to the image side, comprises: a bi-convex eighth lens element L8; a planar-concave ninth lens element L9 having a planar surface on the image side; a bi-convex tenth lens element L10; a bi-concave eleventh lens element L11; a positive meniscus twelfth lens element L12 with the convex surface facing the object side; a bi-convex thirteenth lens element L13; a negative meniscus fourteenth lens element L14 with the convex surface facing the image side; and a positive meniscus fifteenth lens element L15 with the convex surface facing the image side. Among these, the eighth lens element L8 and the ninth lens element L9 are cemented with each other, the eleventh lens element L11 and the twelfth lens element L12 are cemented with each other, and the thirteenth lens element L13 and the fourteenth lens element L14 are cemented with each other. The ninth lens element L9 has an aspheric image side surface, and the thirteenth lens element L13 has an aspheric object side surface.

The third lens unit G3, in order from the object side to the image side, comprises a 3A unit having positive optical power, a 3B unit having positive optical power, and a 3C unit having positive optical power. The eighth lens element L8, the ninth lens element L9, the tenth lens element L10, the eleventh lens element L11, and the twelfth lens element L12 correspond to the 3A unit, the thirteenth lens element L13 and the fourteenth lens element L14 correspond to the 3B unit, and the fifteenth lens element L15 corresponds to the 3C unit.

The fourth lens unit G4 comprises solely a negative meniscus sixteenth lens element L16 with the convex surface facing the object side. The sixteenth lens element L16 has an aspheric image side surface.

The fifth lens unit G5, in order from the object side to the image side, comprises: a negative meniscus seventeenth lens element L17 with the convex surface facing the image side; and a bi-convex eighteenth lens element L18.

The sixth lens unit G6 comprises solely a bi-convex nineteenth lens element L19.

In the zoom lens system according to Embodiment 2, the thirteenth lens element L13 and the fourteenth lens element L14 corresponding to the 3B unit in the third lens unit G3 correspond to an image blur compensating lens unit described later which moves in a direction perpendicular to the optical axis to optically compensate image blur.

In the zoom lens system according to Embodiment 2, in zooming from the wide-angle limit to the telephoto limit at the time of image taking, the first lens unit G1, the diaphragm unit GA, the third lens unit G3, the fourth lens unit G4, and the fifth lens unit G5 monotonically move to the object side, the second lens unit G2 moves with locus of a convex to the image side, and the sixth lens unit G6 is fixed with respect to the image surface S. That is, in zooming, the respective lens units individually move along the optical axis such that the interval between the first lens unit G1 and the second lens unit G2, the interval between the fourth lens unit G4 and the fifth lens unit G5, and the interval between the fifth lens unit G5 and the sixth lens unit G6 increase, the interval between the second lens unit G2 and the diaphragm unit GA and the interval between the diaphragm unit GA and the third lens unit G3 decrease, and the interval between the third lens unit G3 and the fourth lens unit G4 varies.

In the zoom lens system according to Embodiment 2, in focusing from the infinity in-focus condition to the close-object in-focus condition, the fourth lens unit G4 serving as a focusing lens unit moves to the image side along the optical axis in any zooming condition.

Embodiment 3

Figure 9:
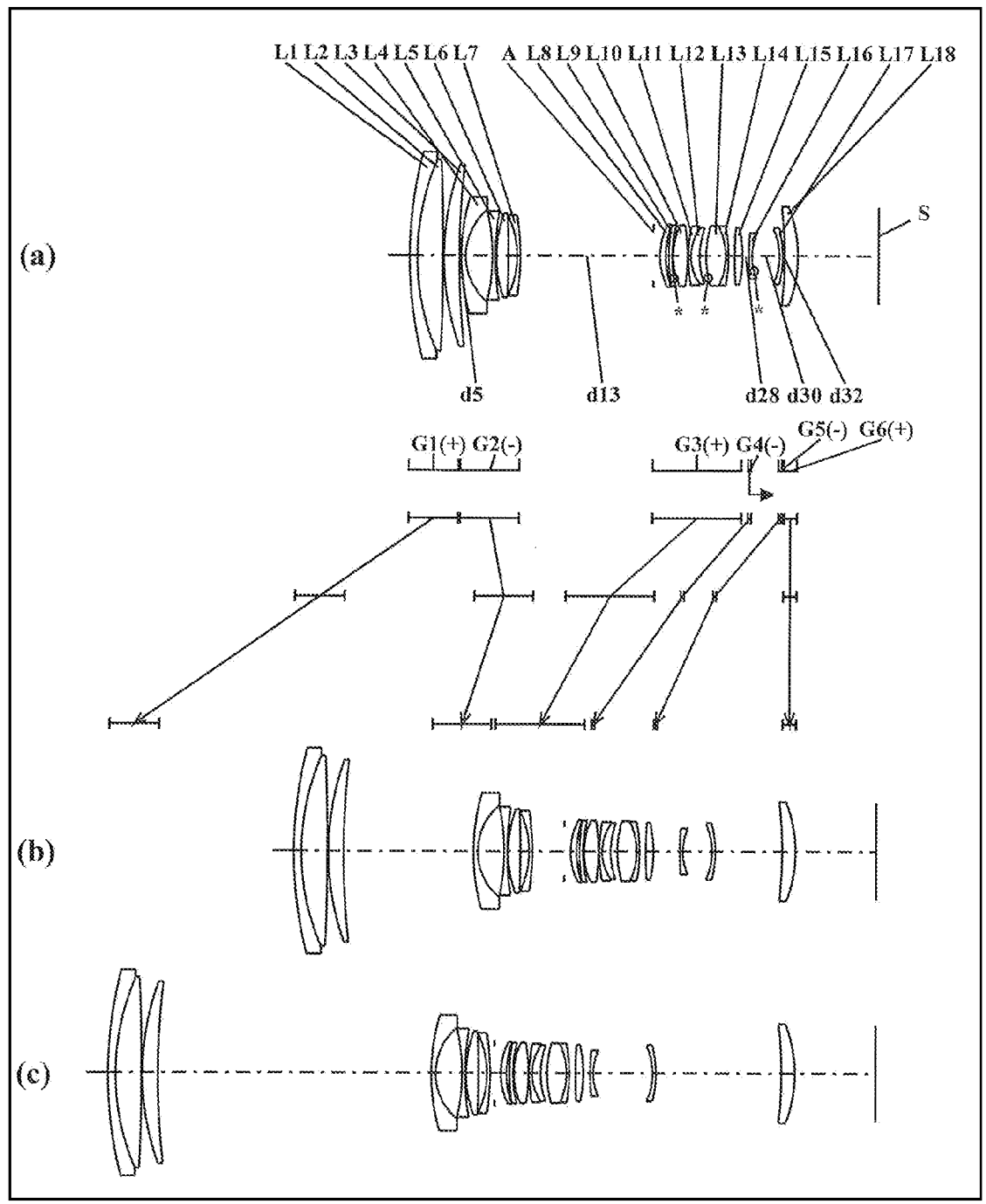
FIG. 9 is a lens arrangement diagram showing an infinity in-focus condition of a zoom lens system according to Embodiment 3 (Numerical Example 3)
Figure 10:
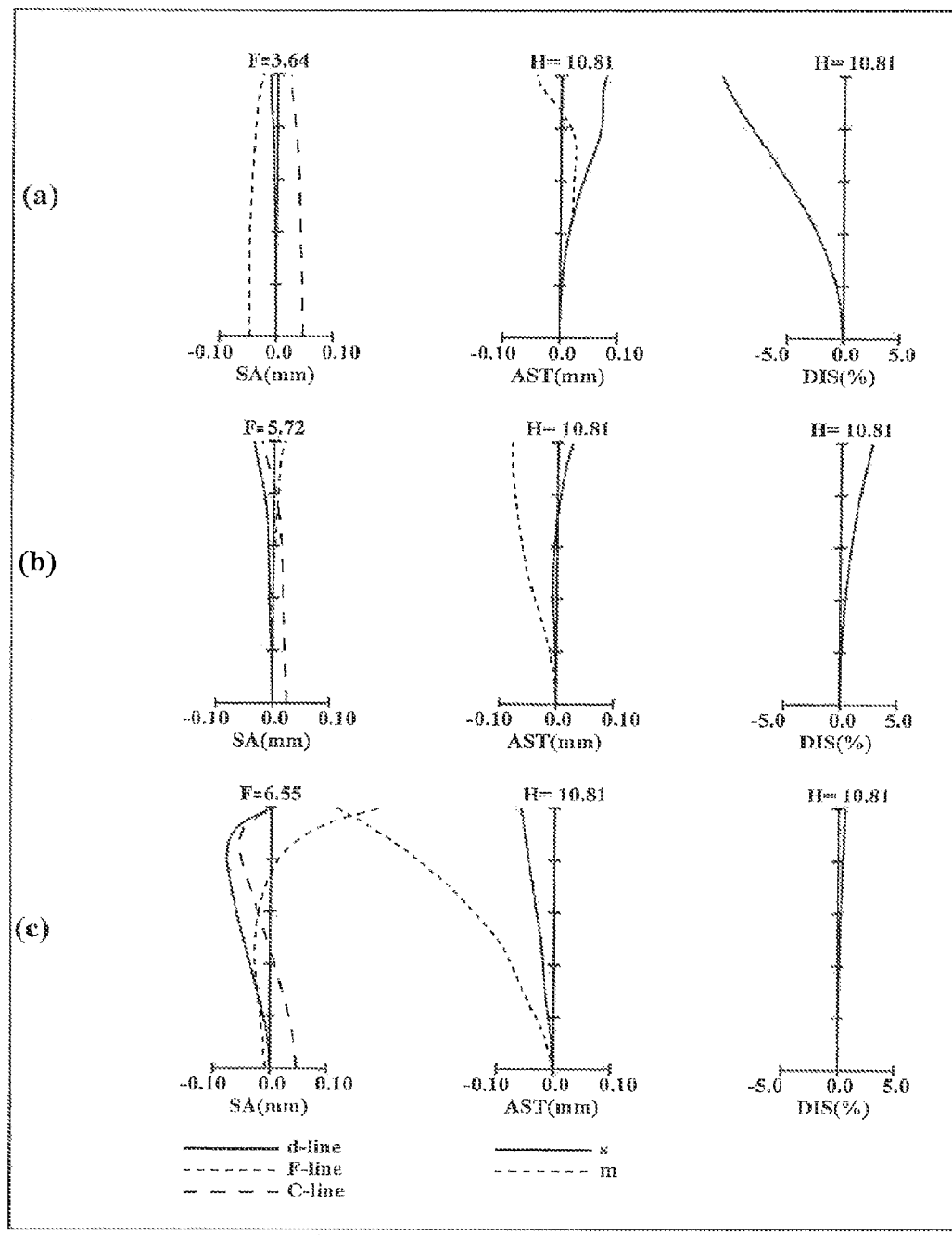
FIG. 10 is a longitudinal aberration diagram of an infinity in-focus condition of the zoom lens system according to Numerical Example 3.
Figure 11:
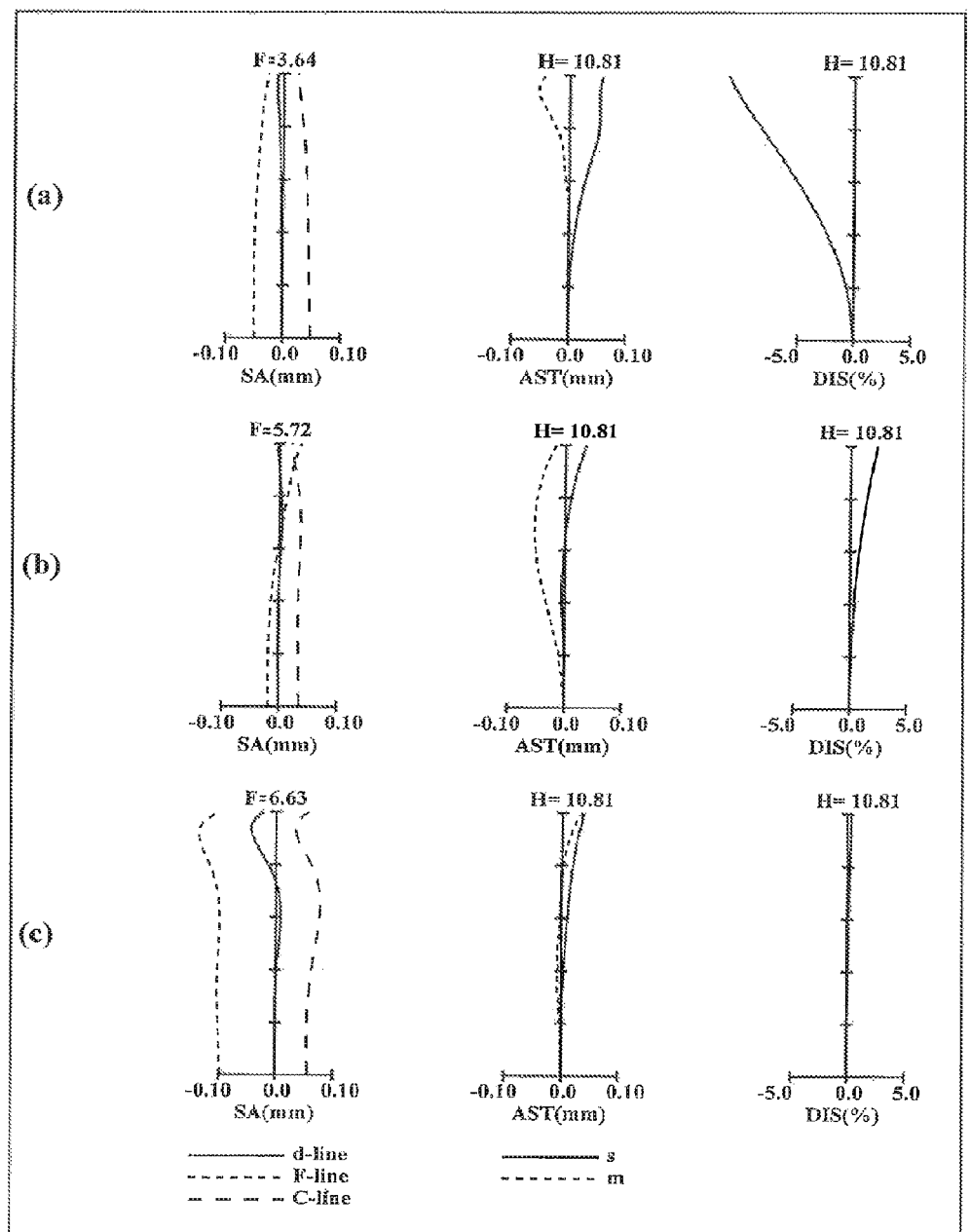
FIG. 11 is a longitudinal aberration diagram of a close-object in-focus condition of the zoom lens system according to Numerical Example 3.
Figure 12:
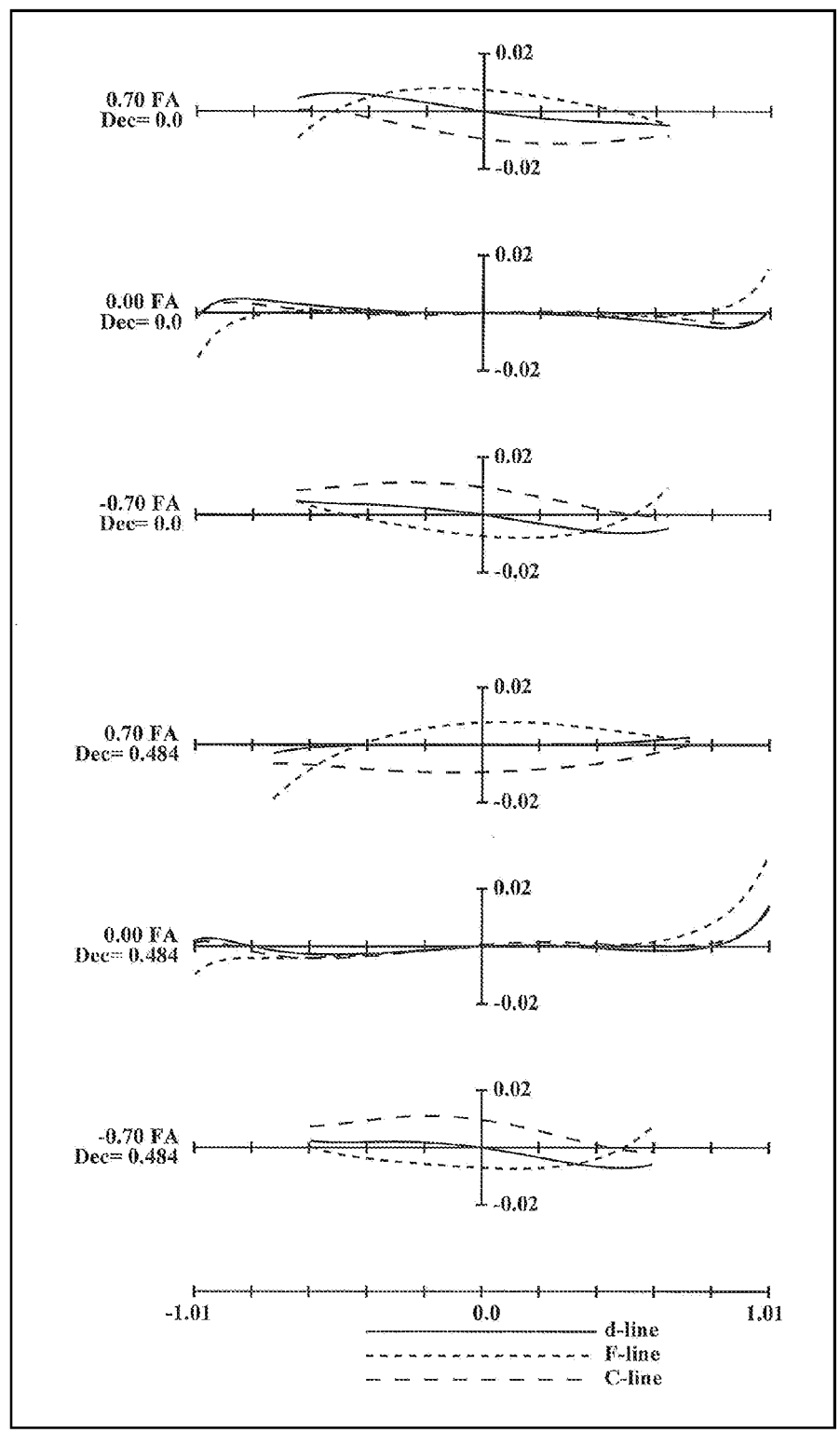
FIG. 12 is a lateral aberration diagram of the zoom lens system according to Numerical Example 3 at a telephoto limit in a basic state where image blur compensation is not performed and in an image blur compensation state.

As shown in FIG. 9, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side.

The third lens unit G3, in order from the object side to the image side, comprises: a positive meniscus eighth lens element L8 with the convex surface facing the object side; a negative meniscus ninth lens element L9 with the convex surface facing the object side; a bi-convex tenth lens element L10; a negative meniscus eleventh lens element L11 with the convex surface facing the object side; a positive meniscus twelfth lens element L12 with the convex surface facing the object side; a bi-convex thirteenth lens element L13; a negative meniscus fourteenth lens element L14 with the convex surface facing the image side; and a bi-convex fifteenth lens element L15. Among these, the eleventh lens element L11 and the twelfth lens element L12 are cemented with each other, and the thirteenth lens element L13 and the fourteenth lens element L14 are cemented with each other. The ninth lens element L9 has an aspheric image side surface, and the thirteenth lens element L13 has an aspheric object side surface. An aperture diaphragm A is provided on the object side of the eighth lens element L8.

The third lens unit G3, in order from the object side to the image side, comprises a 3A unit having positive optical power, a 3B unit having positive optical power, and a 3C unit having positive optical power. The eighth lens element L8, the ninth lens element L9, the tenth lens element L10, the eleventh lens element L11, and the twelfth lens element L12 correspond to the 3A unit, the thirteenth lens element L13 and the fourteenth lens element L14 correspond to the 3B unit, and the fifteenth lens element L15 corresponds to the 3C unit.

The fourth lens unit G4 comprises solely a negative meniscus sixteenth lens element L16 with the convex surface facing the object side. The sixteenth lens element L16 has an aspheric image side surface.

The fifth lens unit G5 comprises solely a negative meniscus seventeenth lens element L17 with the convex surface facing the image side.

The sixth lens unit G6 comprises solely a positive meniscus eighteenth lens element L18 with the convex surface facing the image side.

In the zoom lens system according to Embodiment 3, the thirteenth lens element L13 and the fourteenth lens element L14 corresponding to the 3B unit in the third lens unit G3 correspond to an image blur compensating lens unit described later which moves in a direction perpendicular to the optical axis to optically compensate image blur.

In the zoom lens system according to Embodiment 3, in zooming from the wide-angle limit to the telephoto limit at the time of image taking, the first lens unit G1, the third lens unit G3, the fourth lens unit G4, and the fifth lens unit G5 monotonically move to the object side, the second lens unit G2 moves with locus of a convex to the image side, and the sixth lens unit G6 is fixed with respect to the image surface S. That is, in zooming, the respective lens units individually move along the optical axis such that the interval between the first lens unit G1 and the second lens unit G2, the interval between the fourth lens unit G4 and the fifth lens unit G5, and the interval between the fifth lens unit G5 and the sixth lens unit G6 increase, the interval between the second lens unit G2 and the third lens unit G3 decreases, and the interval between the third lens unit G3 and the fourth lens unit G4 varies.

In the zoom lens system according to Embodiment 3, in focusing from the infinity in-focus condition to the close-object in-focus condition, the fourth lens unit G4 serving as a focusing lens unit moves to the image side along the optical axis in any zooming condition.

Embodiment 4

Figure 13:
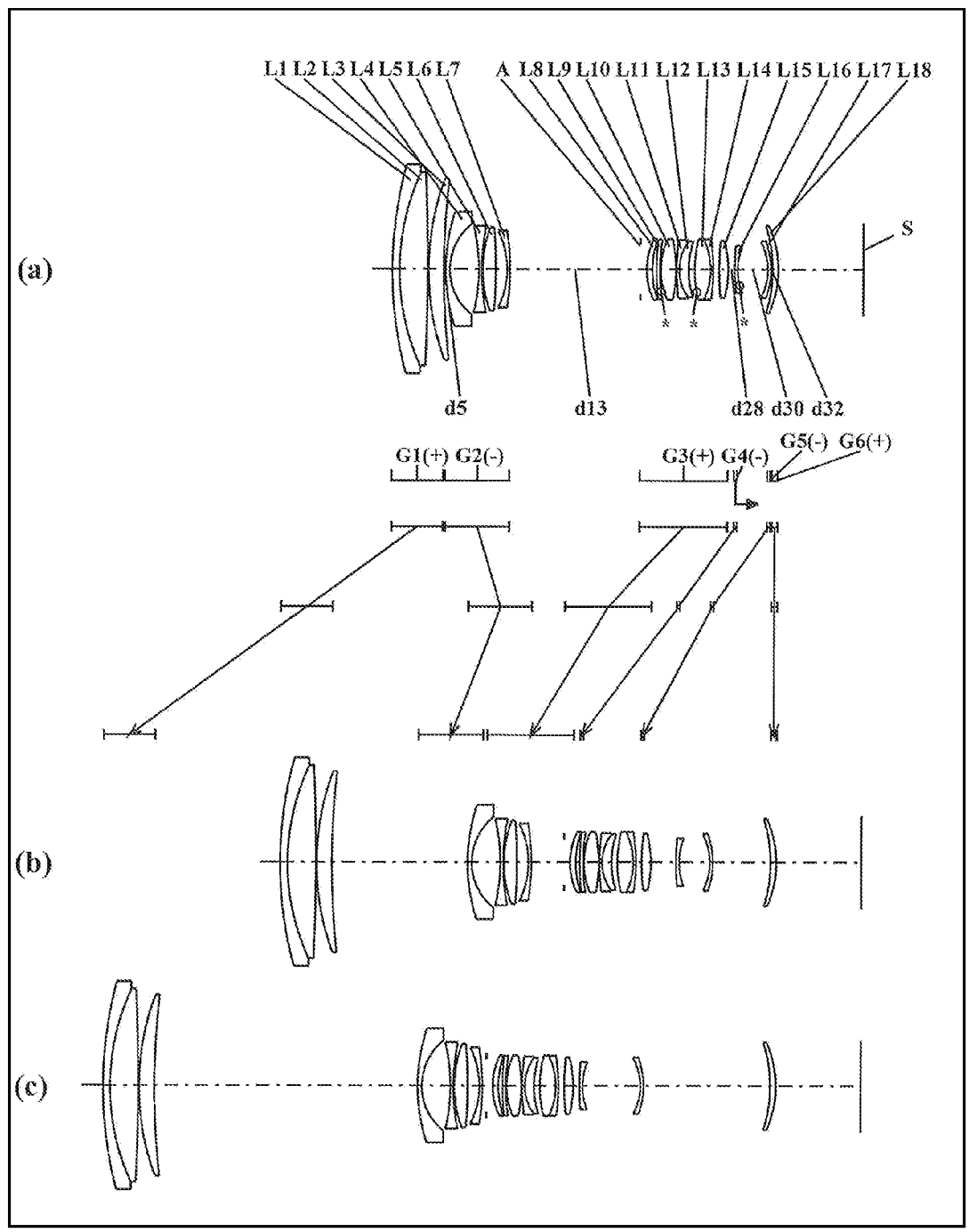
FIG. 13 is a lens arrangement diagram showing an infinity in-focus condition of a zoom lens system according to Embodiment 4 (Numerical Example 4)
Figure 14:
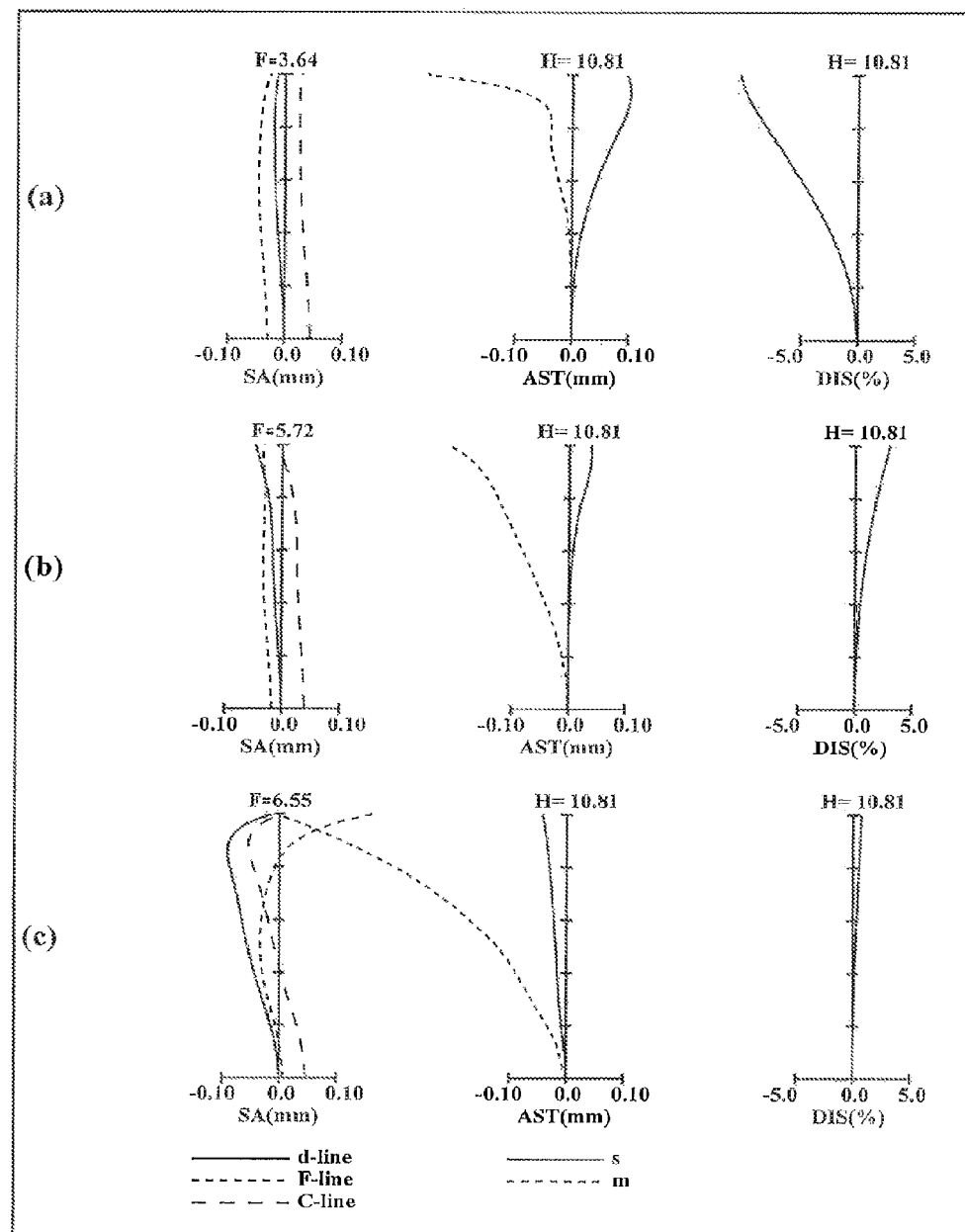
FIG. 14 is a longitudinal aberration diagram of an infinity in-focus condition of the zoom lens system according to Numerical Example 4.
Figure 15:
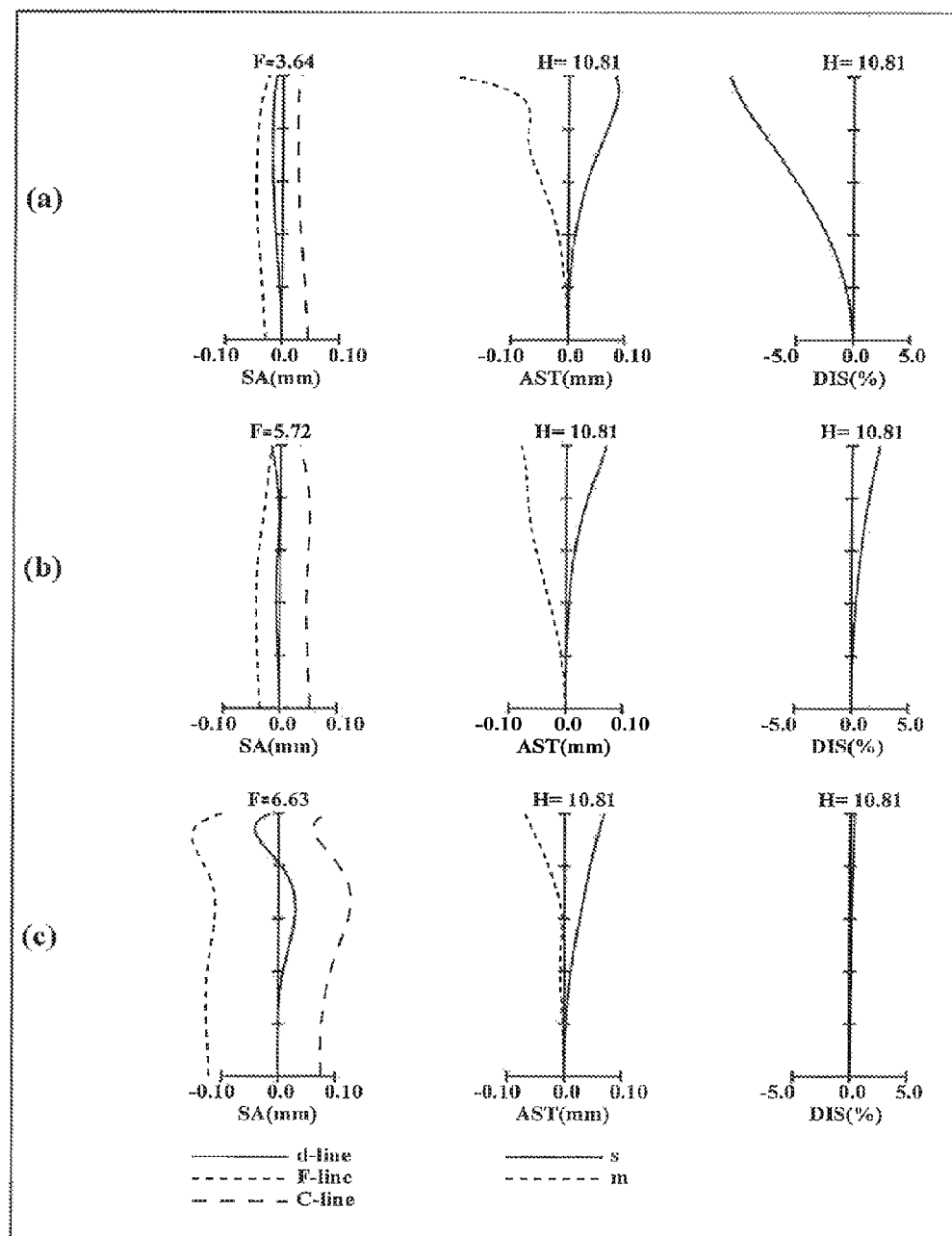
FIG. 15 is a longitudinal aberration diagram of a close-object in-focus condition of the zoom lens system according to Numerical Example 4.
Figure 16:
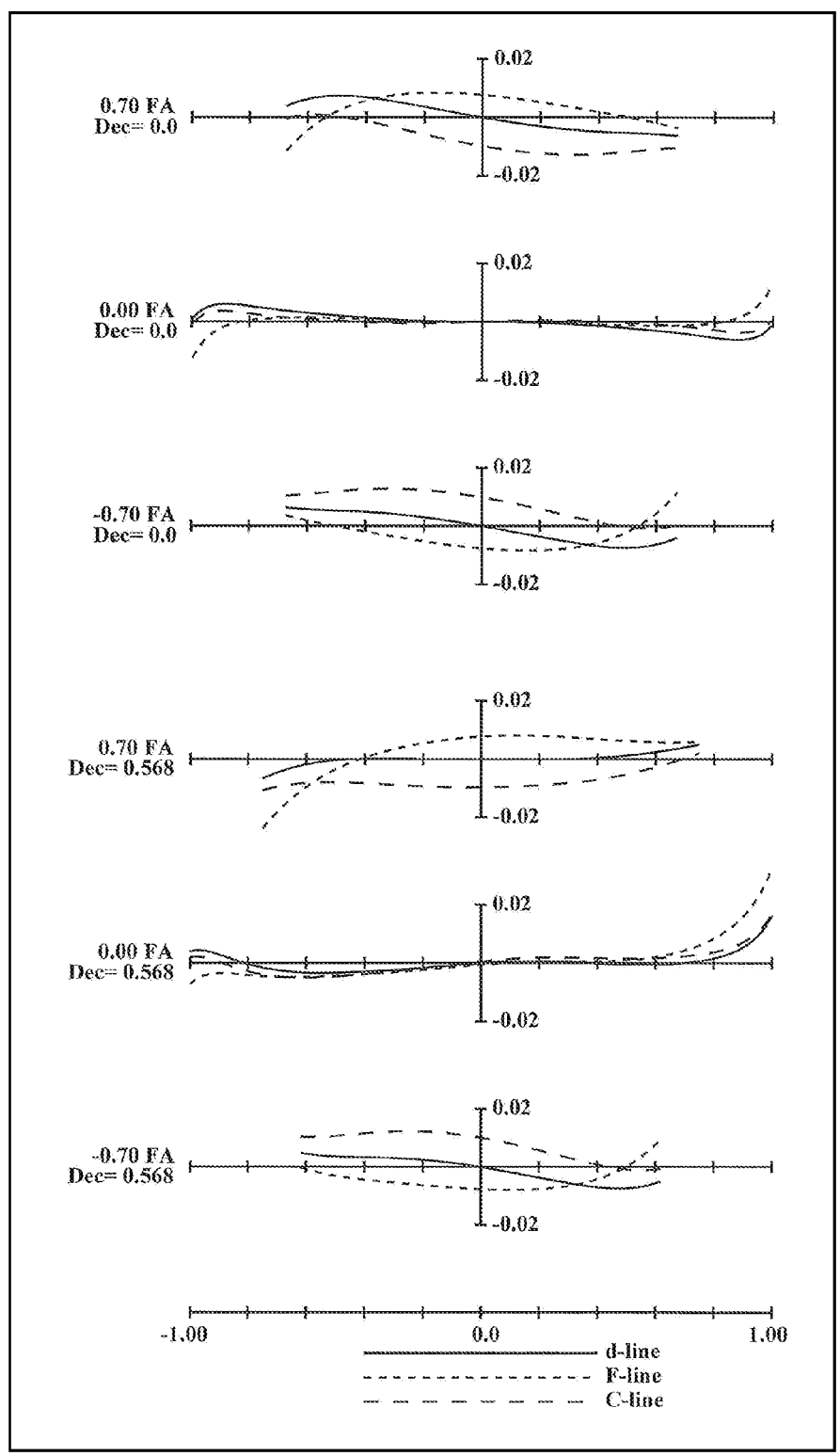
FIG. 16 is a lateral aberration diagram of the zoom lens system according to Numerical Example 4 at a telephoto limit in a basic state where image blur compensation is not performed and in an image blur compensation state.

As shown in FIG. 13, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side.

The third lens unit G3, in order from the object side to the image side, comprises: a positive meniscus eighth lens element L8 with the convex surface facing the object side; a negative meniscus ninth lens element L9 with the convex surface facing the object side; a bi-convex tenth lens element L10; a negative meniscus eleventh lens element L11 with the convex surface facing the object side; a positive meniscus twelfth lens element L12 with the convex surface facing the object side; a bi-convex thirteenth lens element L13; a negative meniscus fourteenth lens element L14 with the convex surface facing the image side; and a bi-convex fifteenth lens element L15. Among these, the eleventh lens element L11 and the twelfth lens element L12 are cemented with each other, and the thirteenth lens element L13 and the fourteenth lens element L14 are cemented with each other. The ninth lens element L9 has an aspheric image side surface, and the thirteenth lens element L13 has an aspheric object side surface. An aperture diaphragm A is provided on the object side of the eighth lens element L8.

The third lens unit G3, in order from the object side to the image side, comprises a 3A unit having positive optical power, a 3B unit having positive optical power, and a 3C unit having positive optical power. The eighth lens element L8, the ninth lens element L9, the tenth lens element L10, the eleventh lens element L11, and the twelfth lens element L12 correspond to the 3A unit, the thirteenth lens element L13 and the fourteenth lens element L14 correspond to the 3B unit, and the fifteenth lens element L15 corresponds to the 3C unit.

The fourth lens unit G4 comprises solely a negative meniscus sixteenth lens element L16 with the convex surface facing the object side. The sixteenth lens element L16 has an aspheric image side surface.

The fifth lens unit G5 comprises solely a negative meniscus seventeenth lens element L17 with the convex surface facing the image side.

The sixth lens unit G6 comprises solely a positive meniscus eighteenth lens element L18 with the convex surface facing the image side.

In the zoom lens system according to Embodiment 4, the thirteenth lens element L13 and the fourteenth lens element L14 corresponding to the 3B unit in the third lens unit G3 correspond to an image blur compensating lens unit described later which moves in a direction perpendicular to the optical axis to optically compensate image blur.

In the zoom lens system according to Embodiment 4, in zooming from the wide-angle limit to the telephoto limit at the time of image taking, the first lens unit G1, the third lens unit G3, the fourth lens unit G4, and the fifth lens unit G5 monotonically move to the object side, the second lens unit G2 moves with locus of a convex to the image side, and the sixth lens unit G6 is fixed with respect to the image surface S. That is, in zooming, the respective lens units individually move along the optical axis such that the interval between the first lens unit G1 and the second lens unit G2, the interval between the fourth lens unit G4 and the fifth lens unit G5, and the interval between the fifth lens unit G5 and the sixth lens unit G6 increase, the interval between the second lens unit G2 and the third lens unit G3 decreases, and the interval between the third lens unit G3 and the fourth lens unit G4 varies.

In the zoom lens system according to Embodiment 4, in focusing from the infinity in-focus condition to the close-object in-focus condition, the fourth lens unit G4 serving as a focusing lens unit moves to the image side along the optical axis in any zooming condition.

Embodiment 5

Figure 17:
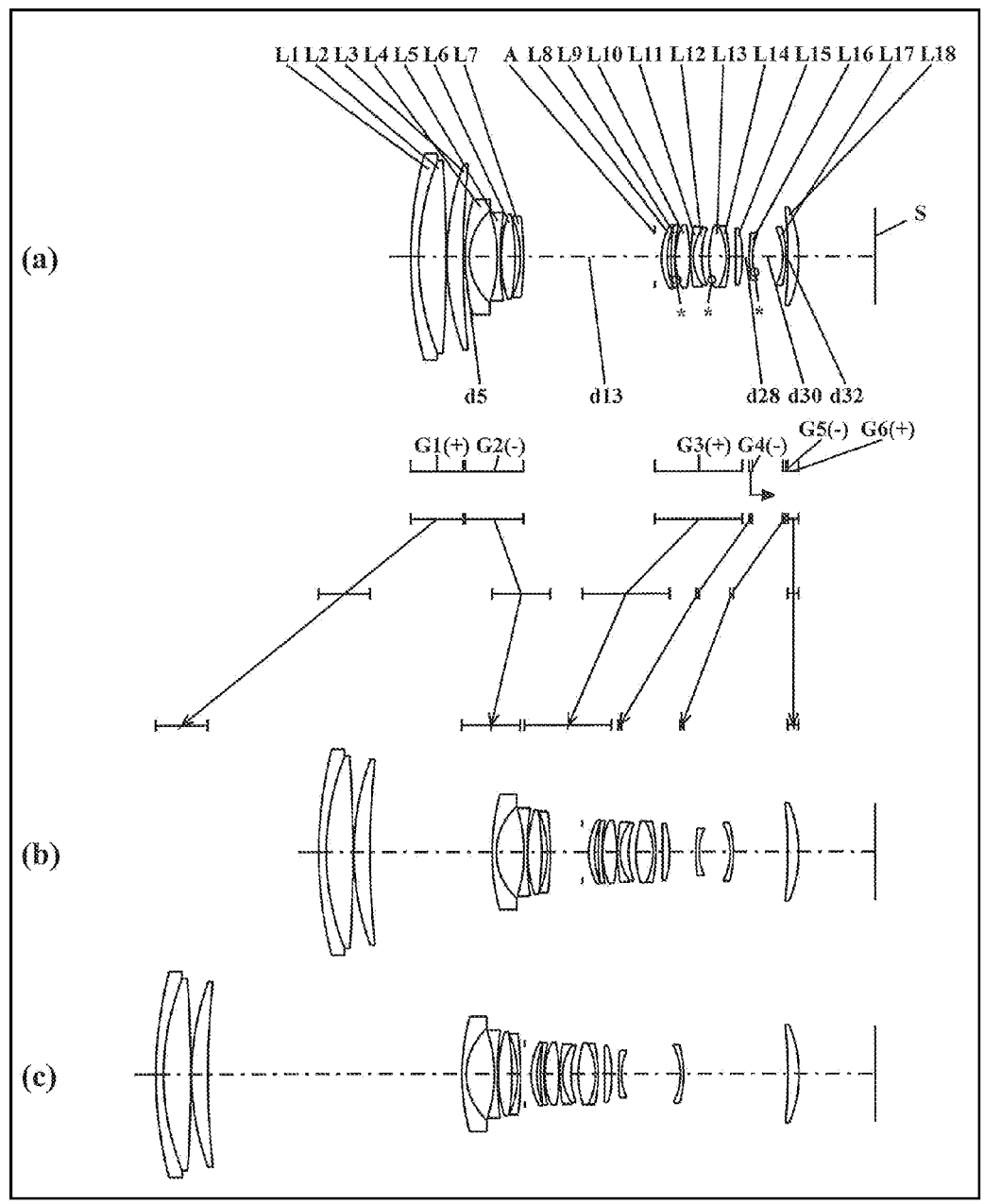
FIG. 17 is a lens arrangement diagram showing an infinity in-focus condition of a zoom lens system according to Embodiment 5 (Numerical Example 5)
Figure 18:
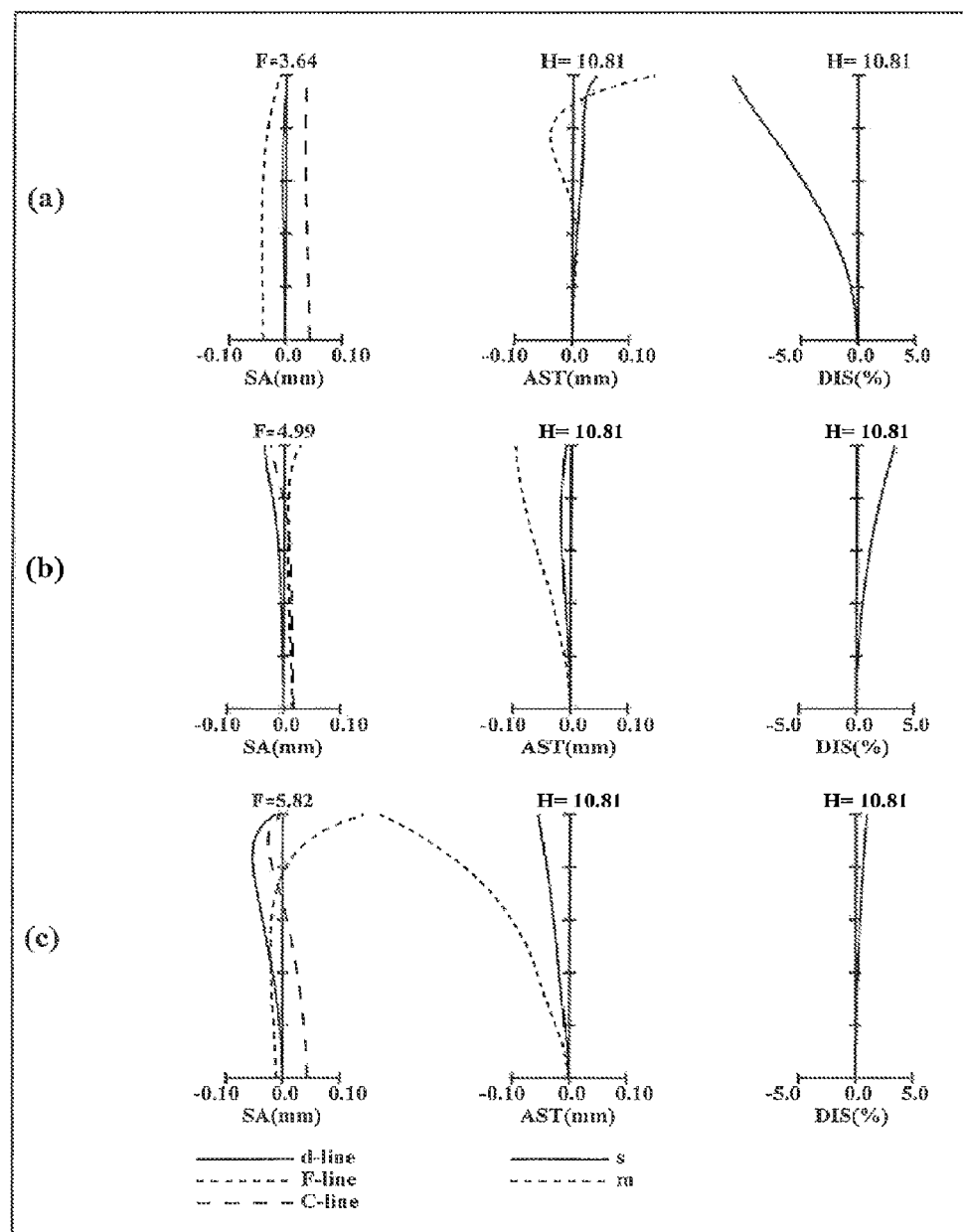
FIG. 18 is a longitudinal aberration diagram of an infinity in-focus condition of the zoom lens system according to Numerical Example 5.
Figure 19:
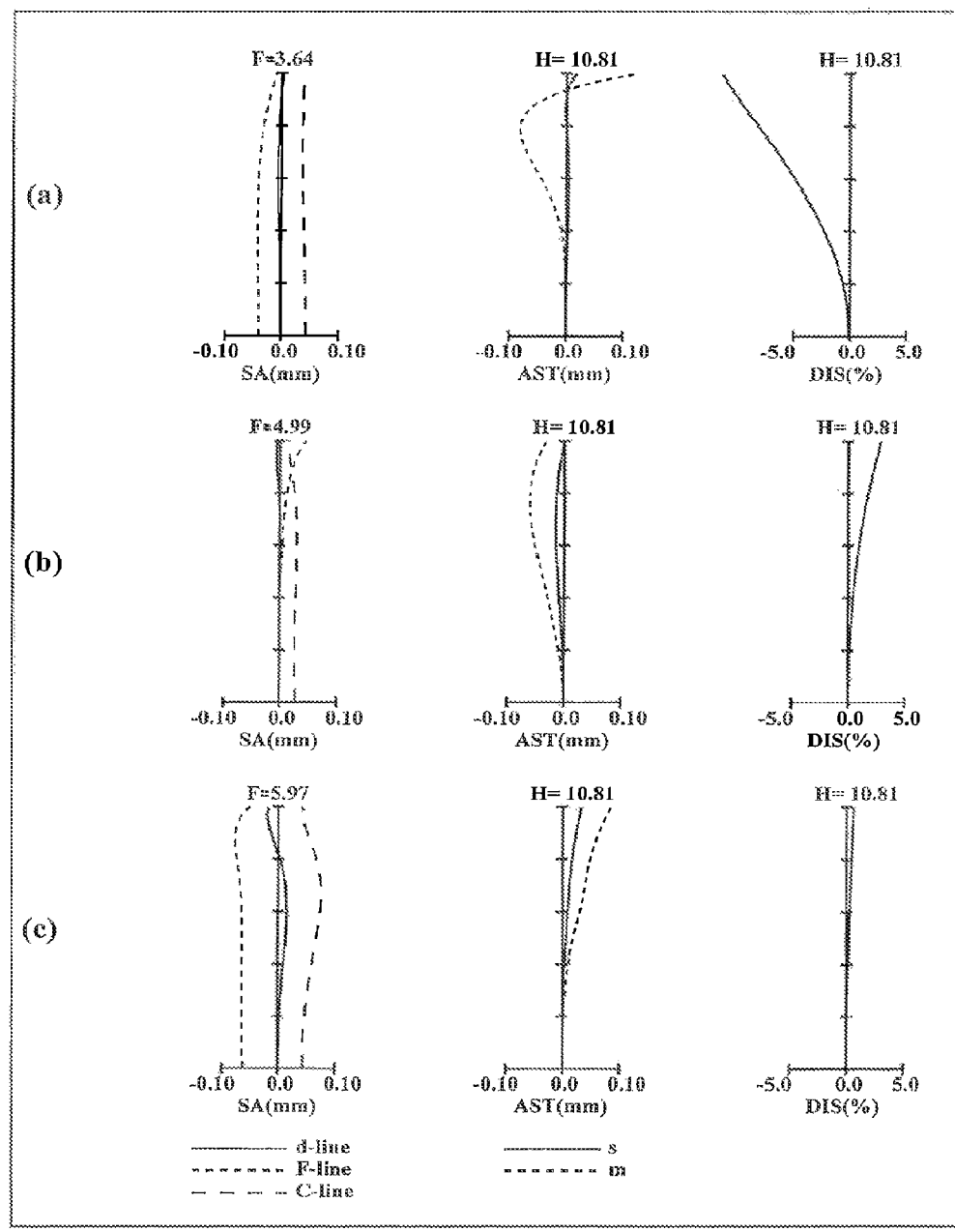
FIG. 19 is a longitudinal aberration diagram of a close-object in-focus condition of the zoom lens system according to Numerical Example 5.
Figure 20:
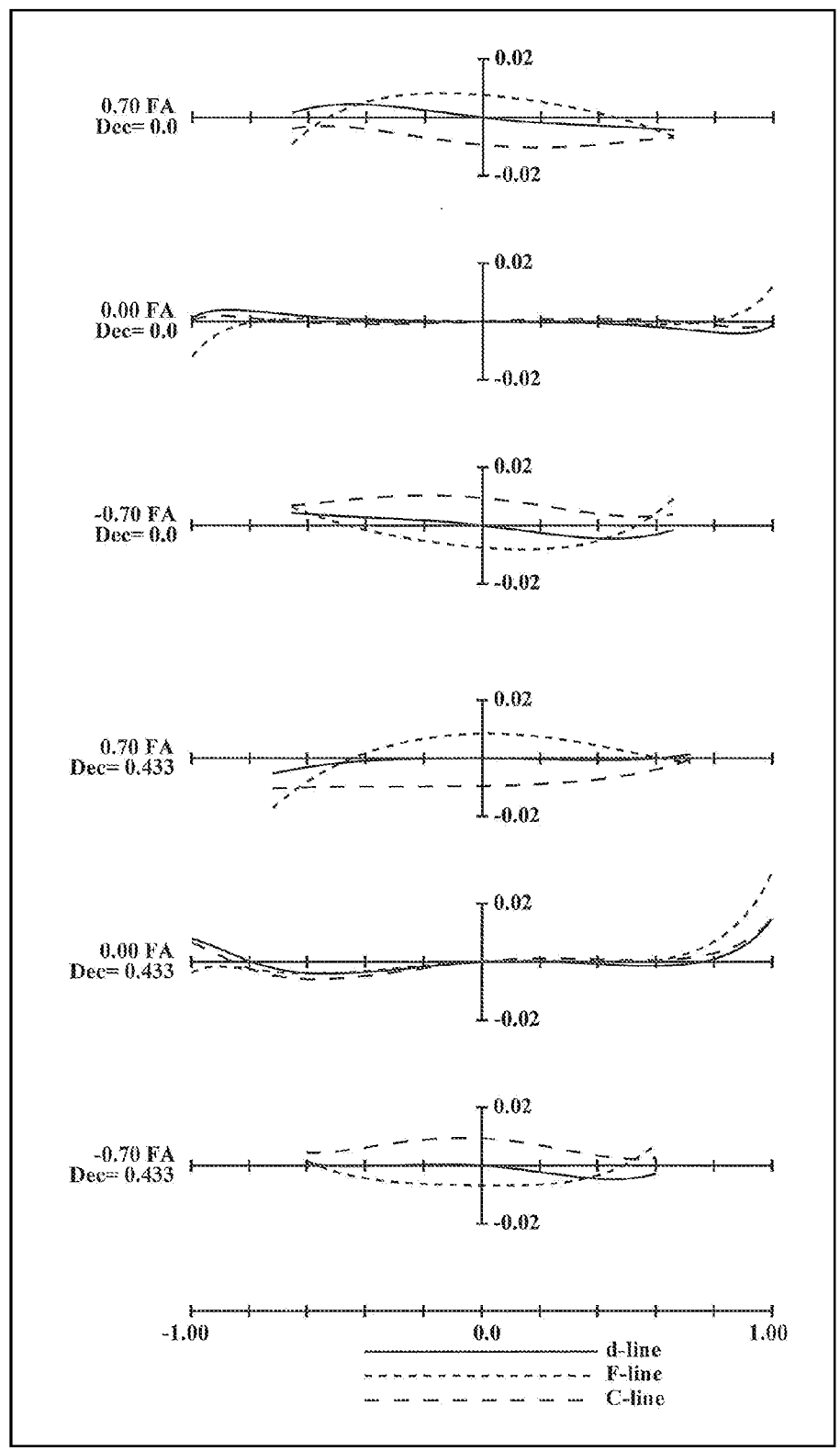
FIG. 20 is a lateral aberration diagram of the zoom lens system according to Numerical Example 5 at a telephoto limit in a basic state where image blur compensation is not performed and in an image blur compensation state.

As shown in FIG. 17, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side.

The third lens unit G3, in order from the object side to the image side, comprises: a positive meniscus eighth lens element L8 with the convex surface facing the object side; a negative meniscus ninth lens element L9 with the convex surface facing the object side; a bi-convex tenth lens element L10; a negative meniscus eleventh lens element L11 with the convex surface facing the object side; a positive meniscus twelfth lens element L12 with the convex surface facing the object side; a bi-convex thirteenth lens element L13; a negative meniscus fourteenth lens element L14 with the convex surface facing the image side; and a positive meniscus fifteenth lens element L15 with the convex surface facing the image side. Among these, the eleventh lens element L11 and the twelfth lens element L12 are cemented with each other, and the thirteenth lens element L13 and the fourteenth lens element L14 are cemented with each other. The ninth lens element L9 has an aspheric image side surface, and the thirteenth lens element L13 has an aspheric object side surface. An aperture diaphragm A is provided on the object side of the eighth lens element L8.

The third lens unit G3, in order from the object side to the image side, comprises a 3A unit having positive optical power, a 3B unit having positive optical power, and a 3C unit having positive optical power. The eighth lens element L8, the ninth lens element L9, the tenth lens element L10, the eleventh lens element L11, and the twelfth lens element L12 correspond to the 3A unit, the thirteenth lens element L13 and the fourteenth lens element L14 correspond to the 3B unit, and the fifteenth lens element L15 corresponds to the 3C unit.

The fourth lens unit G4 comprises solely a negative meniscus sixteenth lens element L16 with the convex surface facing the object side. The sixteenth lens element L16 has an aspheric image side surface.

The fifth lens unit G5 comprises solely a negative meniscus seventeenth lens element L17 with the convex surface facing the image side.

The sixth lens unit G6 comprises solely a positive meniscus eighteenth lens element L18 with the convex surface facing the image side.

In the zoom lens system according to Embodiment 5, the thirteenth lens element L13 and the fourteenth lens element L14 corresponding to the 3B unit in the third lens unit G3 correspond to an image blur compensating lens unit described later which moves in a direction perpendicular to the optical axis to optically compensate image blur.

In the zoom lens system according to Embodiment 5, in zooming from the wide-angle limit to the telephoto limit at the time of image taking, the first lens unit G1, the third lens unit G3, the fourth lens unit G4, and the fifth lens unit G5 monotonically move to the object side, the second lens unit G2 moves with locus of a convex to the image side, and the sixth lens unit G6 is fixed with respect to the image surface S. That is, in zooming, the respective lens units individually move along the optical axis such that the interval between the first lens unit G1 and the second lens unit G2, the interval between the fourth lens unit G4 and the fifth lens unit G5, and the interval between the fifth lens unit G5 and the sixth lens unit G6 increase, the interval between the second lens unit G2 and the third lens unit G3 decreases, and the interval between the third lens unit G3 and the fourth lens unit G4 varies.

In the zoom lens system according to Embodiment 5, in focusing from the infinity in-focus condition to the close-object in-focus condition, the fourth lens unit G4 serving as a focusing lens unit moves to the image side along the optical axis in any zooming condition.

Embodiment 6

Figure 21:
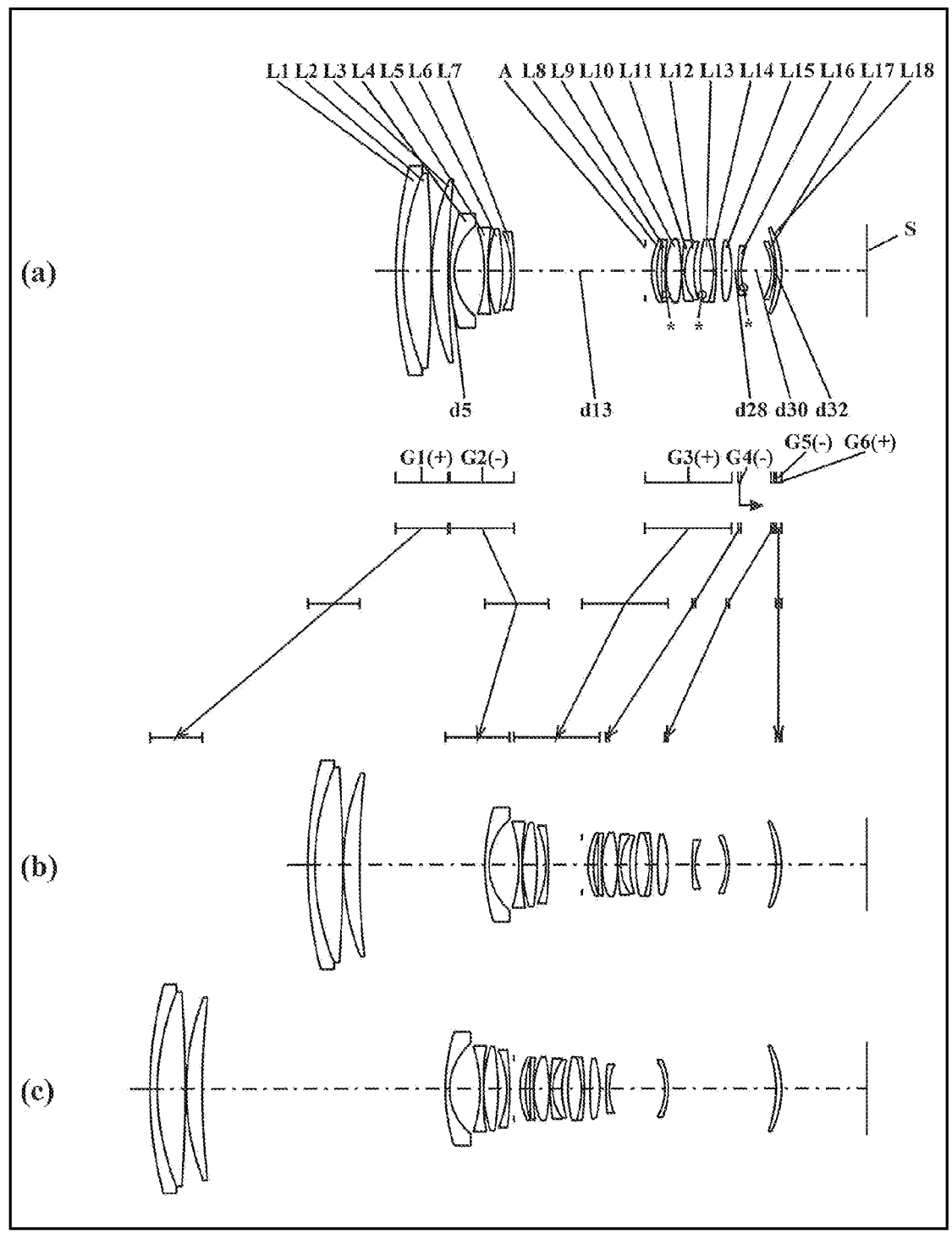
FIG. 21 is a lens arrangement diagram showing an infinity in-focus condition of a zoom lens system according to Embodiment 6 (Numerical Example 6)
Figure 22:
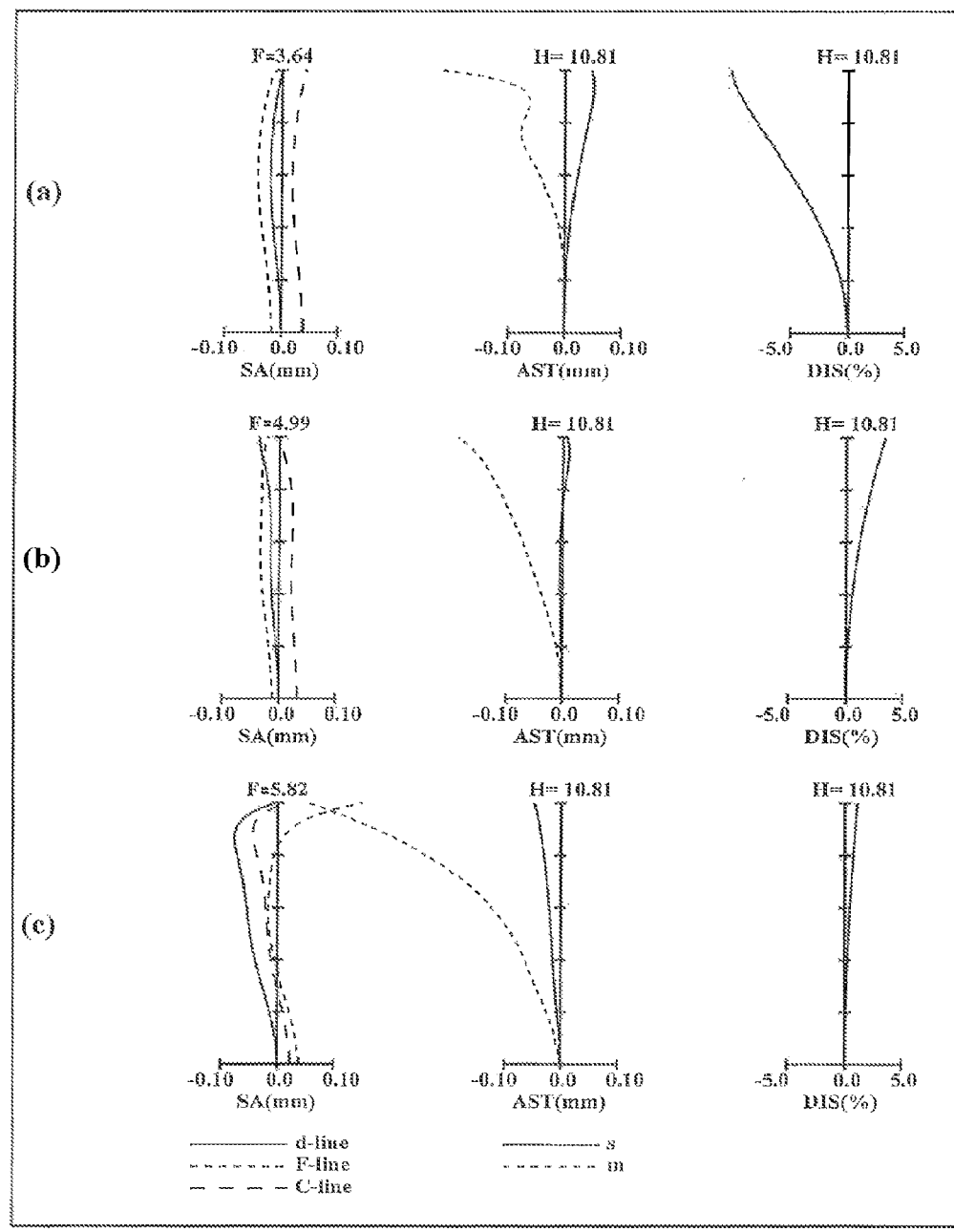
FIG. 22 is a longitudinal aberration diagram of an infinity in-focus condition of the zoom lens system according to Numerical Example 6.
Figure 23:
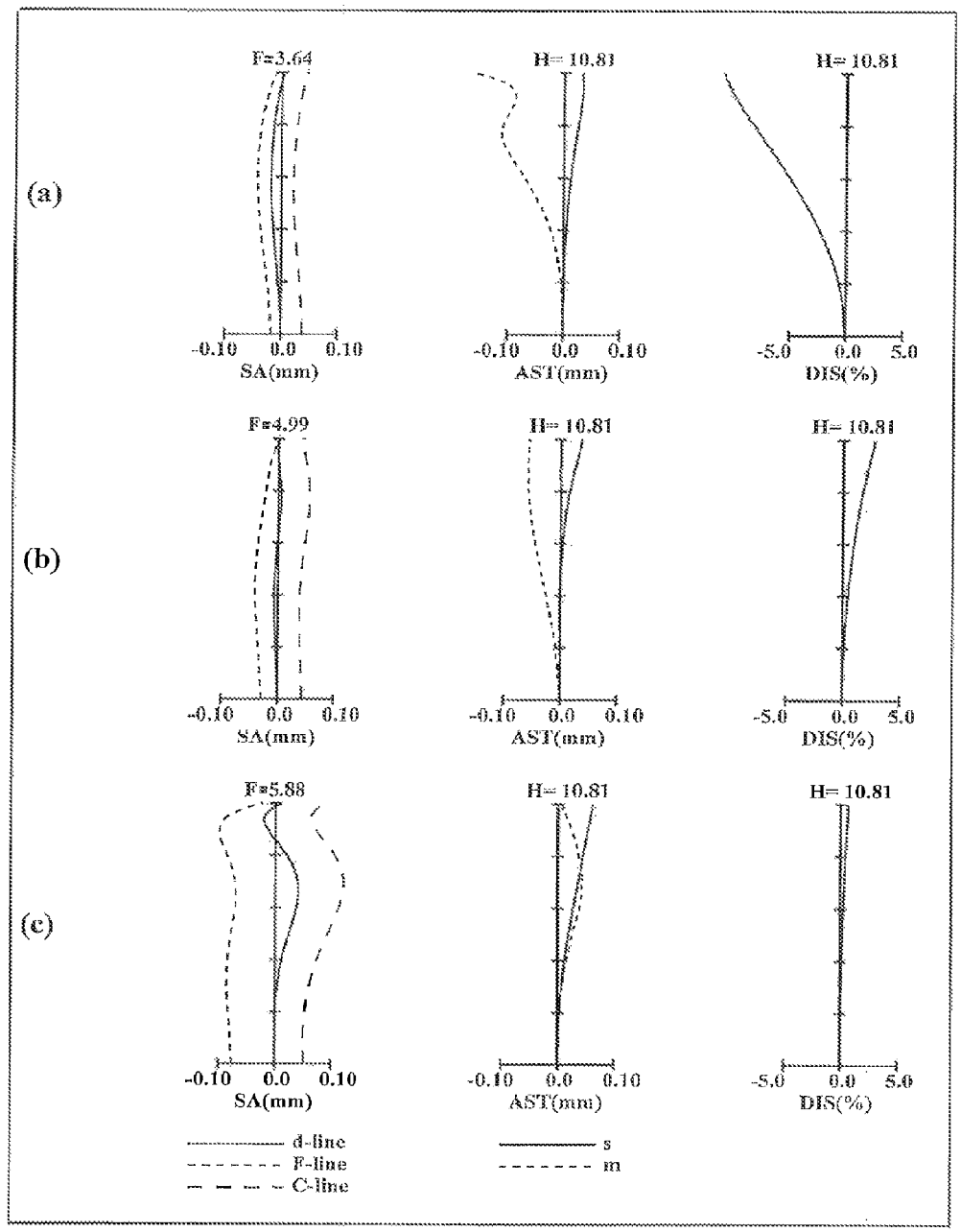
FIG. 23 is a longitudinal aberration diagram of a close-object in-focus condition of the zoom lens system according to Numerical Example 6.
Figure 24:
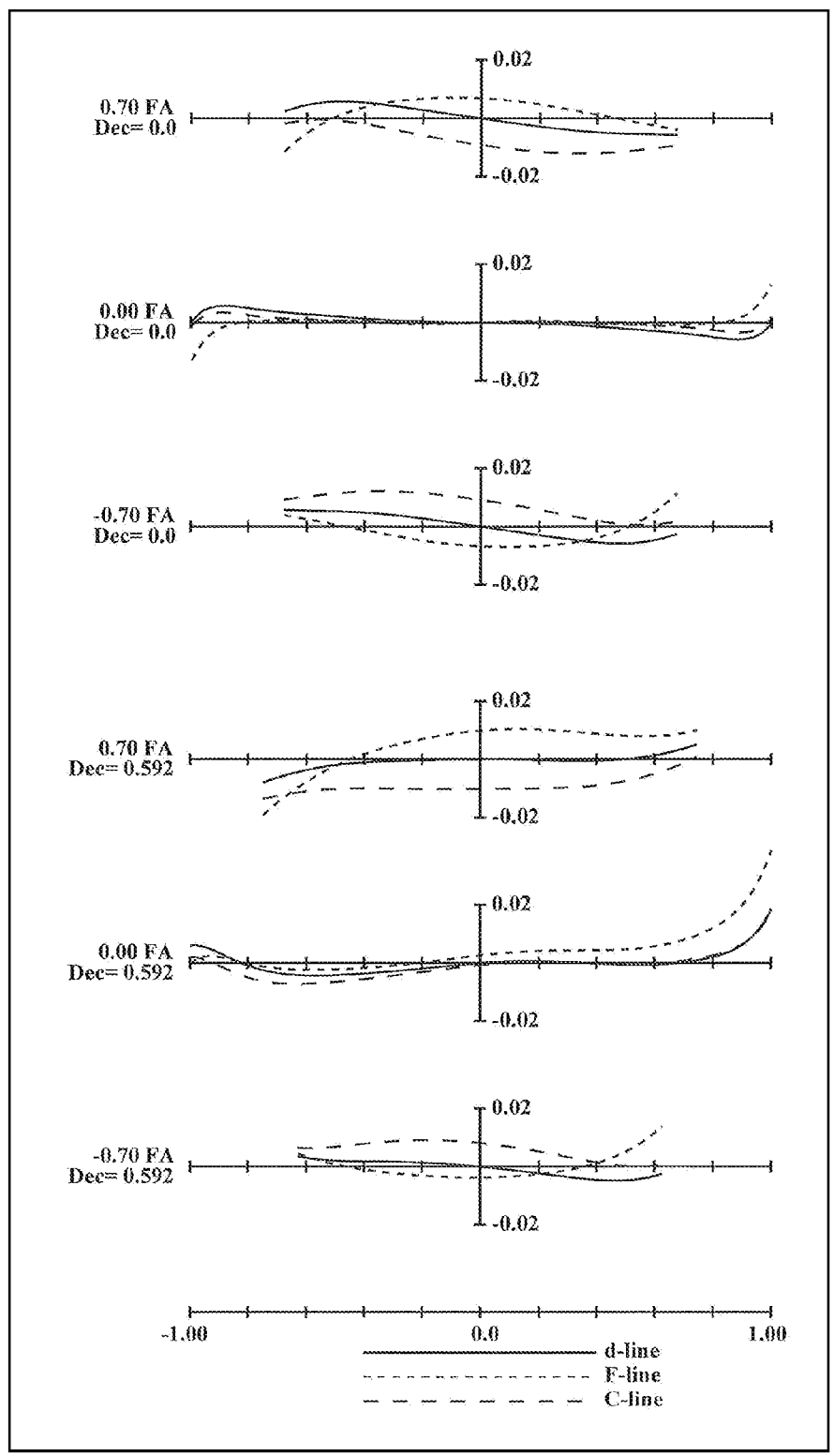
FIG. 24 is a lateral aberration diagram of the zoom lens system according to Numerical Example 6 at a telephoto limit in a basic state where image blur compensation is not performed and in an image blur compensation state.

As shown in FIG. 21, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side.

The third lens unit G3, in order from the object side to the image side, comprises: a positive meniscus eighth lens element L8 with the convex surface facing the object side; a negative meniscus ninth lens element L9 with the convex surface facing the object side; a bi-convex tenth lens element L10; a negative meniscus eleventh lens element L11 with the convex surface facing the object side; a positive meniscus twelfth lens element L12 with the convex surface facing the object side; a bi-convex thirteenth lens element L13; a negative meniscus fourteenth lens element L14 with the convex surface facing the image side; and a bi-convex fifteenth lens element L15. Among these, the eleventh lens element L11 and the twelfth lens element L12 are cemented with each other, and the thirteenth lens element L13 and the fourteenth lens element L14 are cemented with each other. The ninth lens element L9 has an aspheric image side surface, and the thirteenth lens element L13 has an aspheric object side surface. An aperture diaphragm A is provided on the object side of the eighth lens element L8.

The third lens unit G3, in order from the object side to the image side, comprises a 3A unit having positive optical power, a 3B unit having positive optical power, and a 3C unit having positive optical power. The eighth lens element L8, the ninth lens element L9, the tenth lens element L10, the eleventh lens element L11, and the twelfth lens element L12 correspond to the 3A unit, the thirteenth lens element L13 and the fourteenth lens element L14 correspond to the 3B unit, and the fifteenth lens element L15 corresponds to the 3C unit.

The fourth lens unit G4 comprises solely a negative meniscus sixteenth lens element L16 with the convex surface facing the object side. The sixteenth lens element L16 has an aspheric image side surface.

The fifth lens unit G5 comprises solely a negative meniscus seventeenth lens element L17 with the convex surface facing the image side.

The sixth lens unit G6 comprises solely a positive meniscus eighteenth lens element L18 with the convex surface facing the image side.

In the zoom lens system according to Embodiment 6, the thirteenth lens element L13 and the fourteenth lens element L14 corresponding to the 3B unit in the third lens unit G3 correspond to an image blur compensating lens unit described later which moves in a direction perpendicular to the optical axis to optically compensate image blur.

In the zoom lens system according to Embodiment 6, in zooming from the wide-angle limit to the telephoto limit at the time of image taking, the first lens unit G1, the third lens unit G3, the fourth lens unit G4, and the fifth lens unit G5 monotonically move to the object side, the second lens unit G2 moves with locus of a convex to the image side, and the sixth lens unit G6 is fixed with respect to the image surface S. That is, in zooming, the respective lens units individually move along the optical axis such that the interval between the first lens unit G1 and the second lens unit G2, the interval between the fourth lens unit G4 and the fifth lens unit G5, and the interval between the fifth lens unit G5 and the sixth lens unit G6 increase, the interval between the second lens unit G2 and the third lens unit G3 decreases, and the interval between the third lens unit G3 and the fourth lens unit G4 varies.

In the zoom lens system according to Embodiment 6, in focusing from the infinity in-focus condition to the close-object in-focus condition, the fourth lens unit G4 serving as a focusing lens unit moves to the image side along the optical axis in any zooming condition.

Embodiment 7

Figure 25:
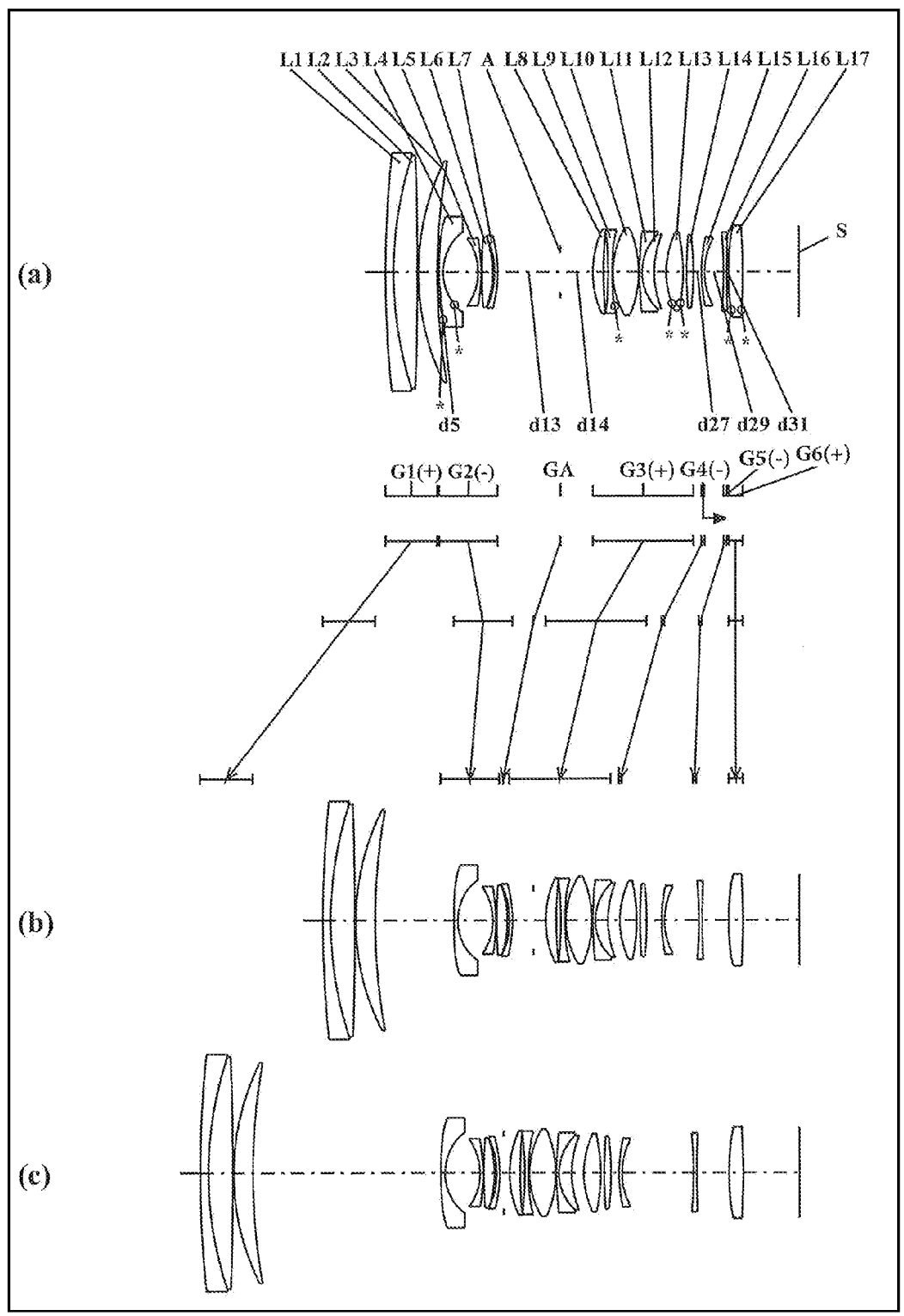
FIG. 25 is a lens arrangement diagram showing an infinity in-focus condition of a zoom lens system according to Embodiment 7 (Numerical Example 7)
Figure 26:
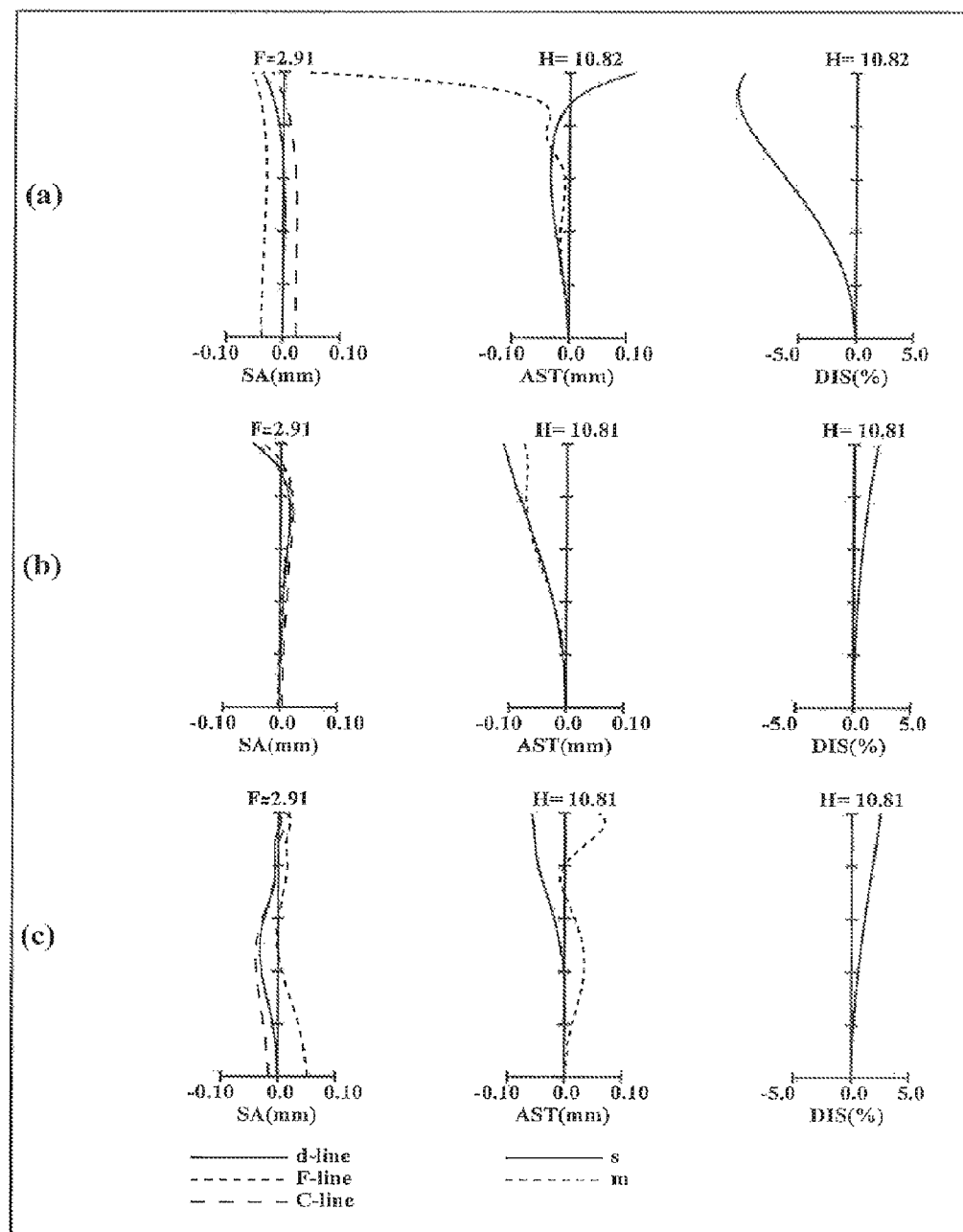
FIG. 26 is a longitudinal aberration diagram of an infinity in-focus condition of the zoom lens system according to Numerical Example 7.
Figure 27:
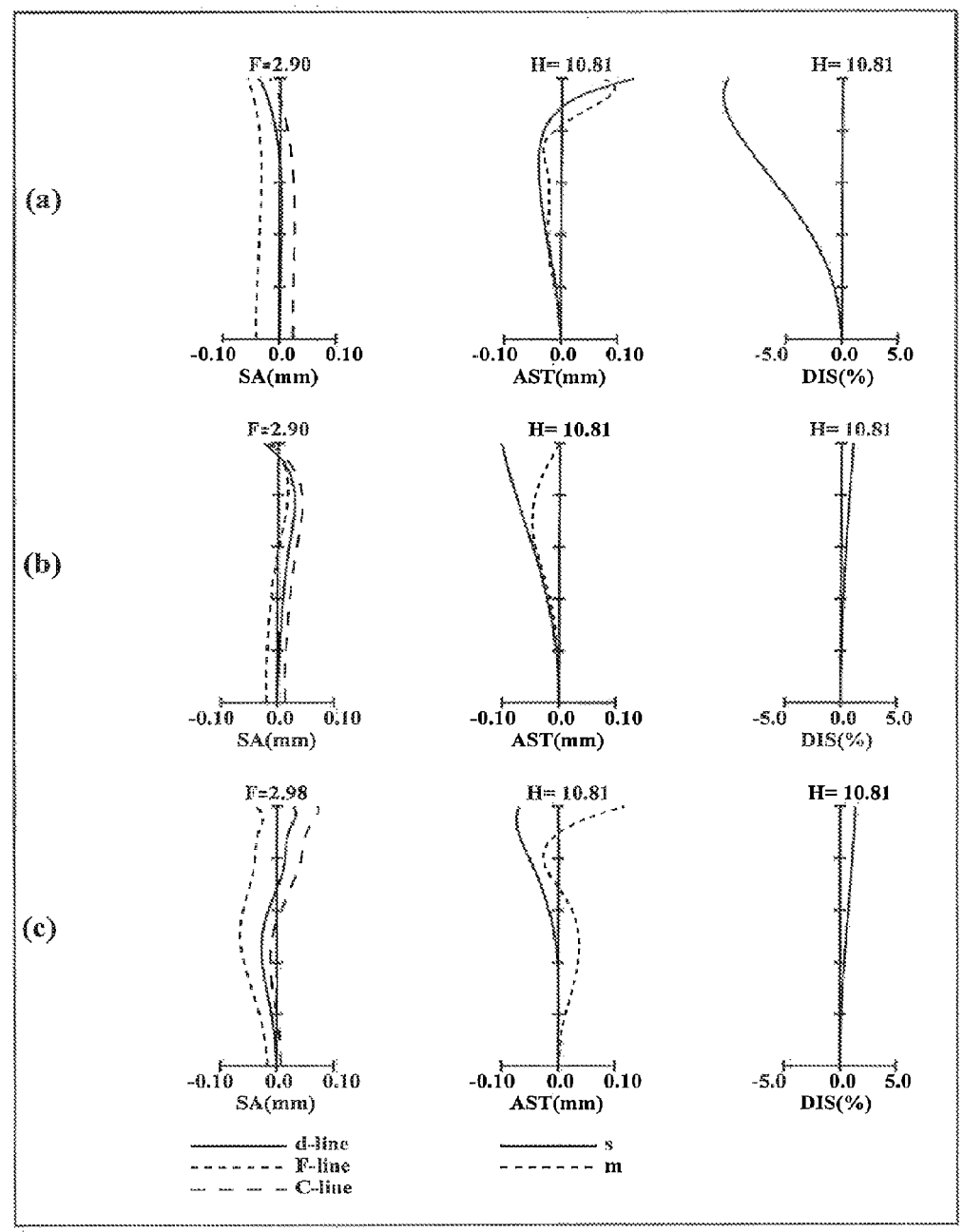
FIG. 27 is a longitudinal aberration diagram of a close-object in-focus condition of the zoom lens system according to Numerical Example 7.
Figure 28:
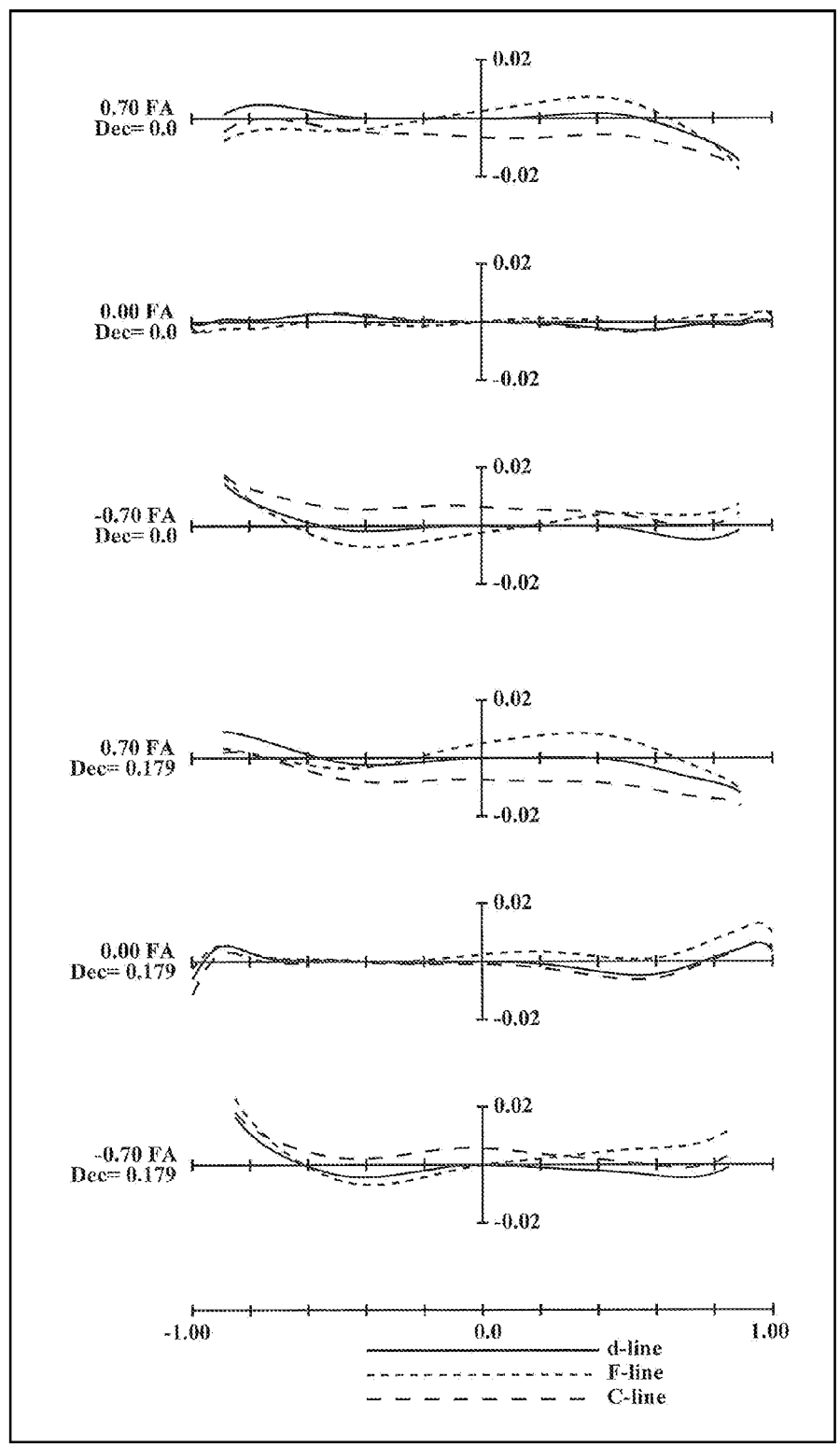
FIG. 28 is a lateral aberration diagram of the zoom lens system according to Numerical Example 7 at a telephoto limit in a basic state where image blur compensation is not performed and in an image blur compensation state.

As shown in FIG. 25, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

The second lens unit G2, in order from the object side to the image side, comprises: a negative meniscus fourth lens element L4 with the convex surface facing the object side; a negative meniscus fifth lens element L5 with the convex surface facing the image side; a bi-convex sixth lens element L6; and a negative meniscus seventh lens element L7 with the convex surface facing the image side. The fourth lens element L4 has an aspheric object side surface and an aspheric image side surface.

The diaphragm unit GA comprises solely an aperture diaphragm A.

The third lens unit G3, in order from the object side to the image side, comprises: a positive meniscus eighth lens element L8 with the convex surface facing the object side; a bi-concave ninth lens element L9; a bi-convex tenth lens element L10; a negative meniscus eleventh lens element L11 with the convex surface facing the object side; a positive meniscus twelfth lens element L12 with the convex surface facing the object side; a bi-convex thirteenth lens element L13; and a bi-convex fourteenth lens element L14. Among these, the eleventh lens element L11 and the twelfth lens element L12 are cemented with each other. The ninth lens element L9 has an aspheric image side surface, and the thirteenth lens element L13 has an aspheric object side surface and an aspheric image side surface.

The third lens unit G3, in order from the object side to the image side, comprises a 3A unit having positive optical power, a 3B unit having positive optical power, and a 3C unit having positive optical power. The eighth lens element L8, the ninth lens element L9, the tenth lens element L10, the eleventh lens element L11, and the twelfth lens element L12 correspond to the 3A unit, the thirteenth lens element L13 corresponds to the 3B unit, and the fourteenth lens element L14 corresponds to the 3C unit.

The fourth lens unit G4 comprises solely a negative meniscus fifteenth lens element L15 with the convex surface facing the object side.

The fifth lens unit G5 comprises solely a bi-concave sixteenth lens element L16.

The sixth lens unit G6 comprises solely a bi-convex seventeenth lens element L17. The seventeenth lens element L17 has an aspheric object side surface and an aspheric image side surface.

In the zoom lens system according to Embodiment 7, the thirteenth lens element L13 corresponding to the 3B unit in the third lens unit G3 corresponds to an image blur compensating lens unit described later which moves in a direction perpendicular to the optical axis to optically compensate image blur.

In the zoom lens system according to Embodiment 7, in zooming from the wide-angle limit to the telephoto limit at the time of image taking, the first lens unit G1, the diaphragm unit GA, the third lens unit G3, the fourth lens unit G4, and the fifth lens unit G5 monotonically move to the object side, the second lens unit G2 moves with locus of a slight convex to the image side, and the sixth lens unit G6 is fixed with respect to the image surface S. That is, in zooming, the respective lens units individually move along the optical axis such that the interval between the first lens unit G1 and the second lens unit G2, the interval between the fourth lens unit G4 and the fifth lens unit G5, and the interval between the fifth lens unit G5 and the sixth lens unit G6 increase, the interval between the second lens unit G2 and the diaphragm unit GA and the interval between the diaphragm unit GA and the third lens unit G3 decrease, and the interval between the third lens unit G3 and the fourth lens unit G4 varies.

In the zoom lens system according to Embodiment 7, in focusing from the infinity in-focus condition to the close-object in-focus condition, the fourth lens unit G4 serving as a focusing lens unit moves to the image side along the optical axis in any zooming condition.

Embodiment 8

Figure 29:
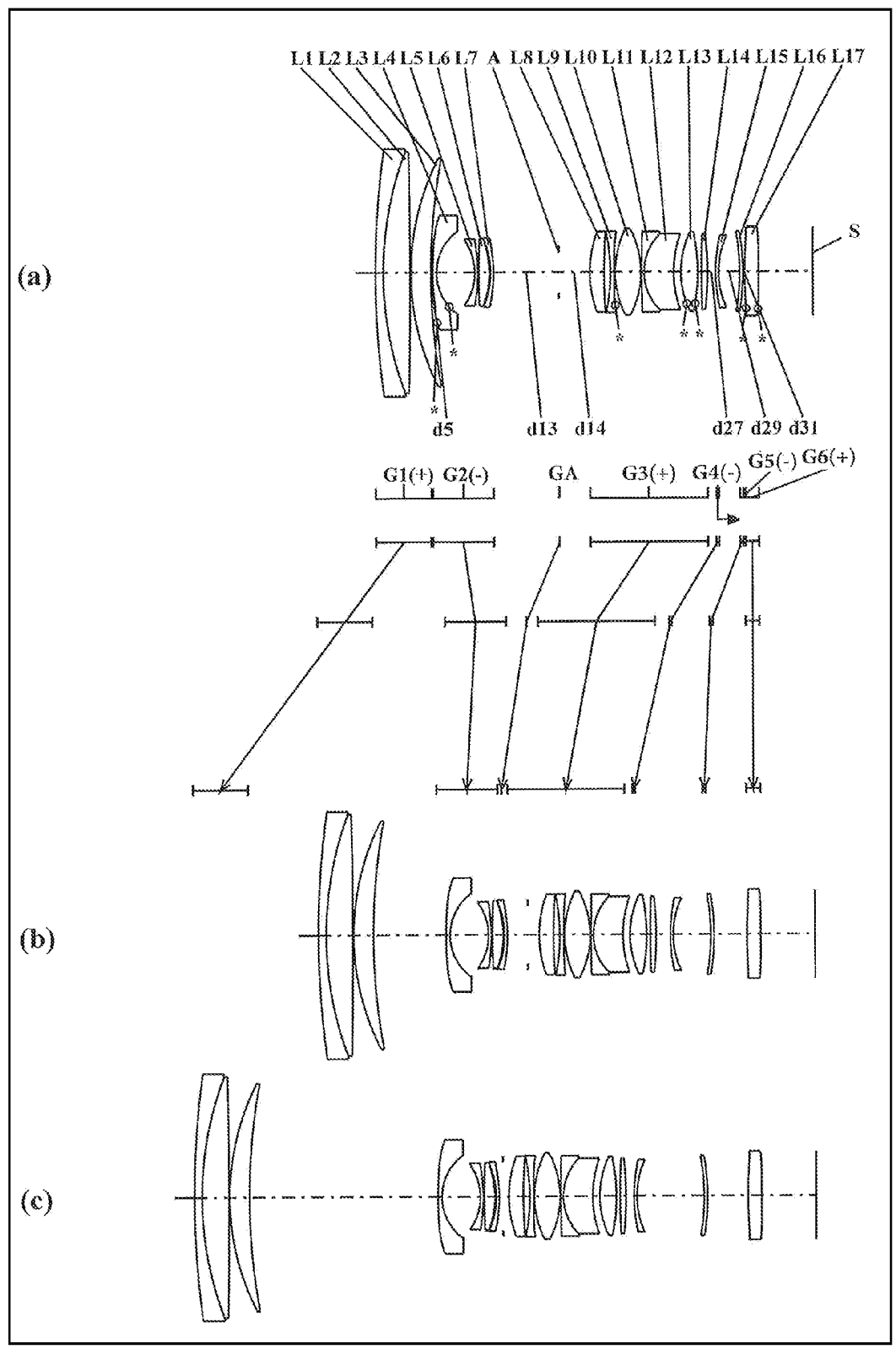
FIG. 29 is a lens arrangement diagram showing an infinity in-focus condition of a zoom lens system according to Embodiment 8 (Numerical Example 8)
Figure 30:
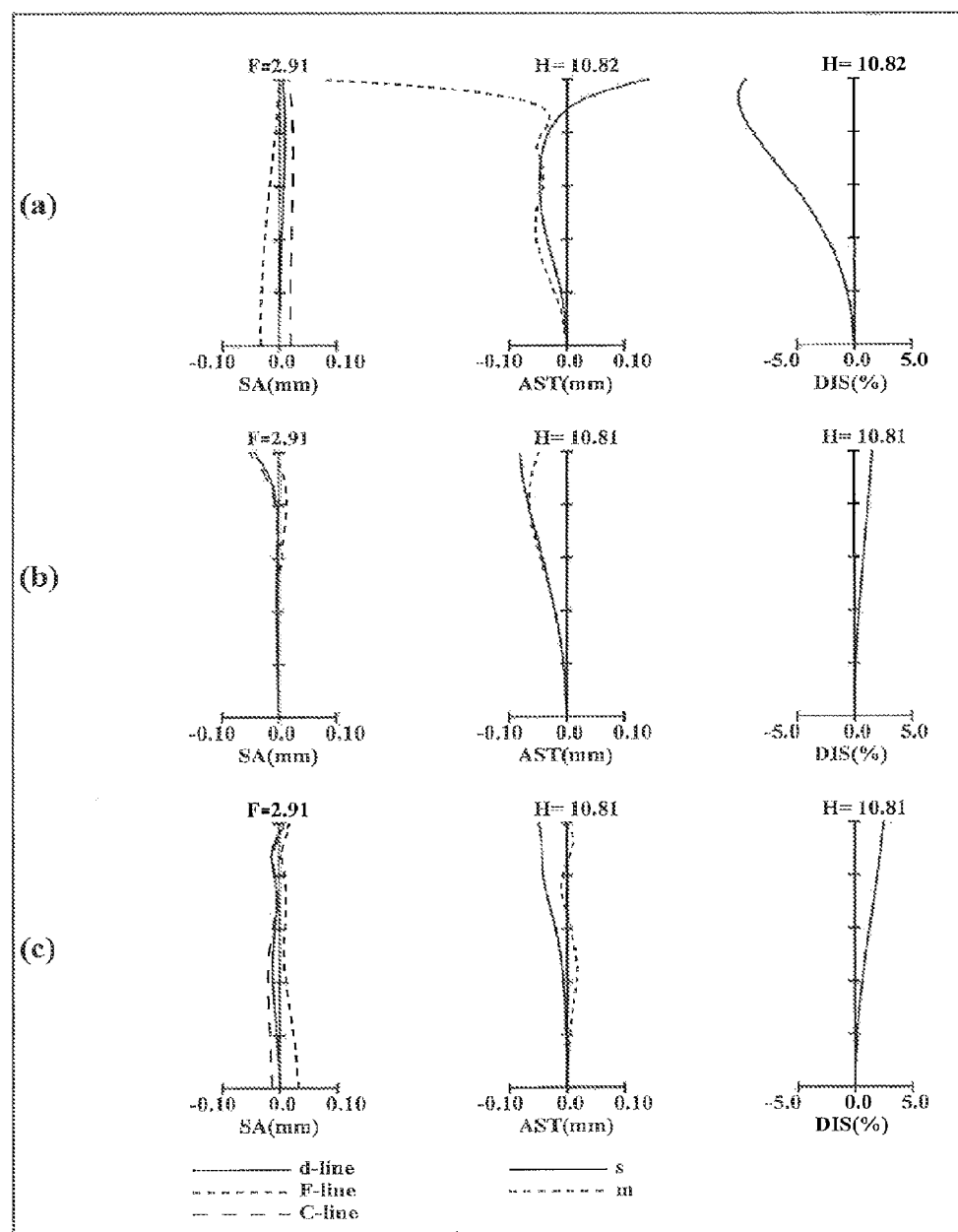
FIG. 30 is a longitudinal aberration diagram of an infinity in-focus condition of the zoom lens system according to Numerical Example 8.
Figure 31:
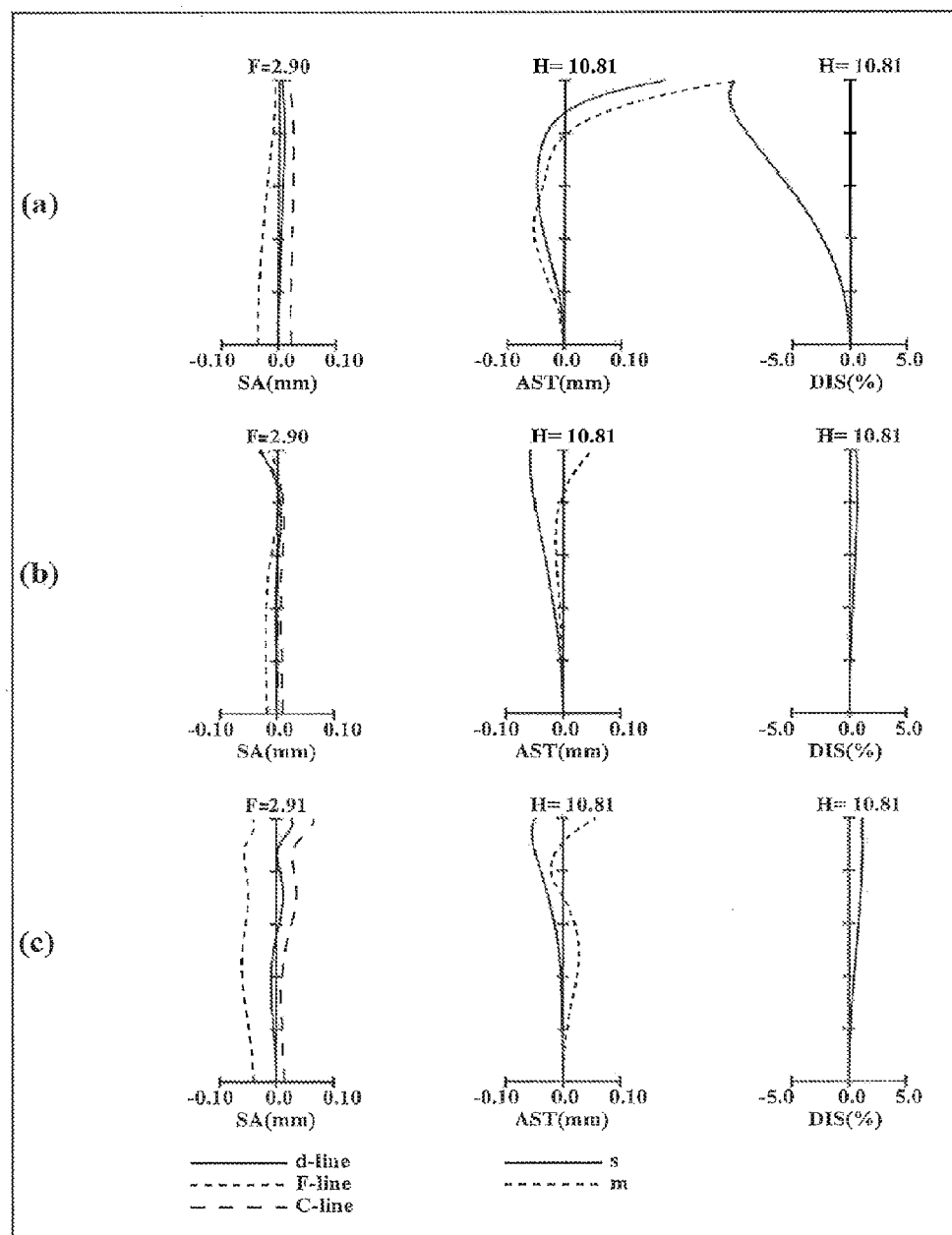
FIG. 31 is a longitudinal aberration diagram of a close-object in-focus condition of the zoom lens system according to Numerical Example 8.
Figure 32:
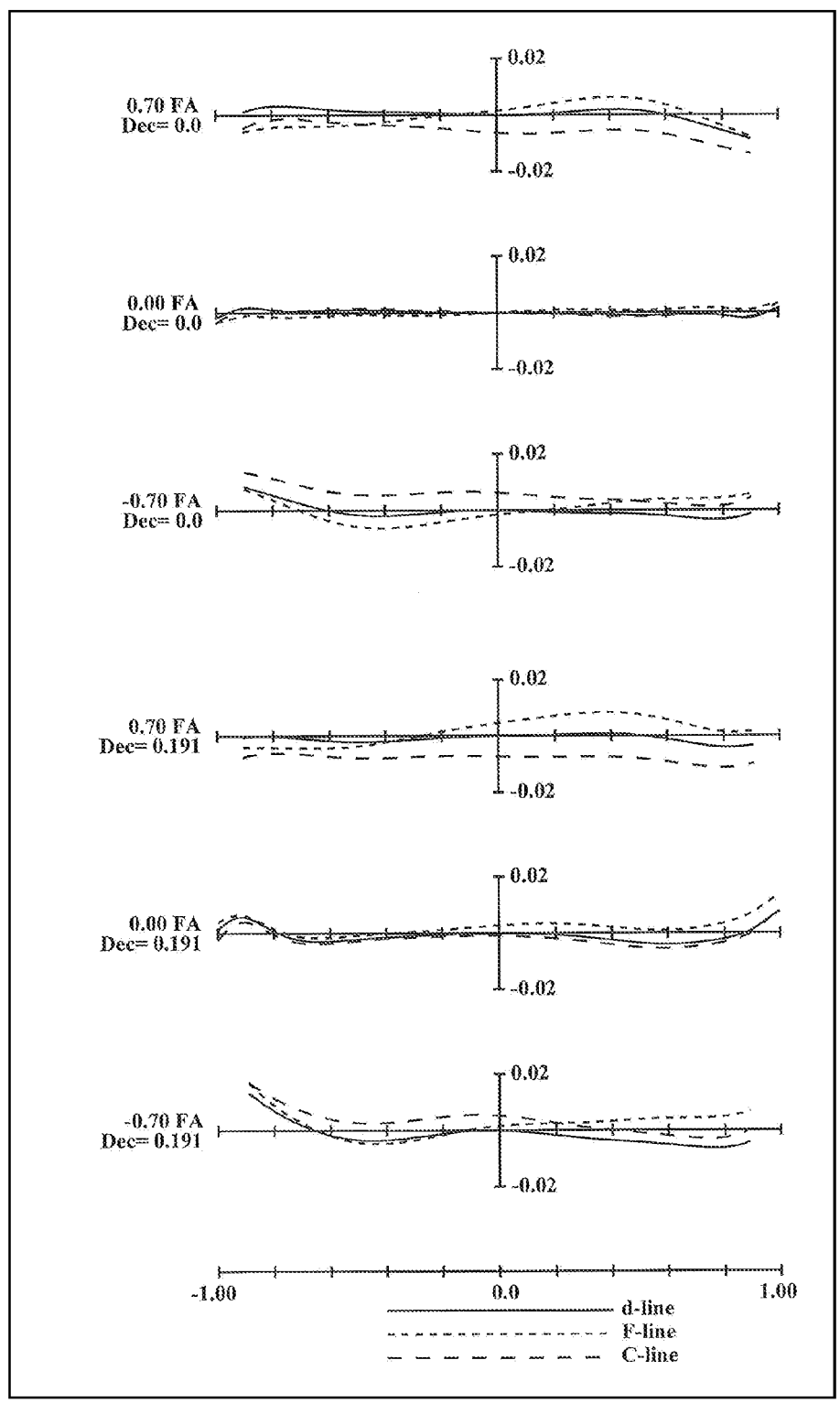
FIG. 32 is a lateral aberration diagram of the zoom lens system according to Numerical Example 8 at a telephoto limit in a basic state where image blur compensation is not performed and in an image blur compensation state.

As shown in FIG. 29, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

The second lens unit G2, in order from the object side to the image side, comprises: a negative meniscus fourth lens element L4 with the convex surface facing the object side; a negative meniscus fifth lens element L5 with the convex surface facing the image side; a bi-convex sixth lens element L6; and a negative meniscus seventh lens element L7 with the convex surface facing the image side. The fourth lens element L4 has an aspheric object side surface and an aspheric image side surface.

The diaphragm unit GA comprises solely an aperture diaphragm A.

The third lens unit G3, in order from the object side to the image side, comprises: a positive meniscus eighth lens element L8 with the convex surface facing the object side; a bi-concave ninth lens element L9; a bi-convex tenth lens element L10; a negative meniscus eleventh lens element L11 with the convex surface facing the object side; a positive meniscus twelfth lens element L12 with the convex surface facing the object side; a bi-convex thirteenth lens element L13; and a bi-convex fourteenth lens element L14. Among these, the eleventh lens element L11 and the twelfth lens element L12 are cemented with each other. The ninth lens element L9 has an aspheric image side surface, and the thirteenth lens element L13 has an aspheric object side surface and an aspheric image side surface.

The third lens unit G3, in order from the object side to the image side, comprises a 3A unit having positive optical power, a 3B unit having positive optical power, and a 3C unit having positive optical power. The eighth lens element L8, the ninth lens element L9, the tenth lens element L10, the eleventh lens element L11, and the twelfth lens element L12 correspond to the 3A unit, the thirteenth lens element L13 corresponds to the 3B unit, and the fourteenth lens element L14 corresponds to the 3C unit.

The fourth lens unit G4 comprises solely a negative meniscus fifteenth lens element L15 with the convex surface facing the object side.

The fifth lens unit G5 comprises solely a negative meniscus sixteenth lens element L16 with the convex surface facing the image side.

The sixth lens unit G6 comprises solely a bi-convex seventeenth lens element L17. The seventeenth lens element L17 has an aspheric object side surface and an aspheric image side surface.

In the zoom lens system according to Embodiment 8, the thirteenth lens element L13 corresponding to the 3B unit in the third lens unit G3 corresponds to an image blur compensating lens unit described later which moves in a direction perpendicular to the optical axis to optically compensate image blur.

In the zoom lens system according to Embodiment 8, in zooming from the wide-angle limit to the telephoto limit at the time of image taking, the first lens unit G1, the diaphragm unit GA, the third lens unit G3, the fourth lens unit G4, and the fifth lens unit G5 monotonically move to the object side, the second lens unit G2 moves with locus of a slight convex to the image side, and the sixth lens unit G6 is fixed with respect to the image surface S. That is, in zooming, the respective lens units individually move along the optical axis such that the interval between the first lens unit G1 and the second lens unit G2, the interval between the fourth lens unit G4 and the fifth lens unit G5, and the interval between the fifth lens unit G5 and the sixth lens unit G6 increase, the interval between the second lens unit G2 and the diaphragm unit GA and the interval between the diaphragm unit GA and the third lens unit G3 decrease, and the interval between the third lens unit G3 and the fourth lens unit G4 varies.

In the zoom lens system according to Embodiment 8, in focusing from the infinity in-focus condition to the close-object in-focus condition, the fourth lens unit G4 serving as a focusing lens unit moves to the image side along the optical axis in any zooming condition.

Each of the zoom lens systems according to Embodiments 1 to 8, in order from the object side to the image side, comprises the first lens unit G1 having positive optical power, the second lens unit G2 having negative optical power, the third lens unit G3 having positive optical power, the fourth lens unit G4 having negative optical power, the fifth lens unit G5 having negative optical power, and the sixth lens unit G6 having positive optical power. Therefore, the zoom lens system can have high optical performance in each zooming condition.

In the zoom lens systems according to Embodiments 1, 2, 7 and 8, the aperture diaphragm A is provided between the second lens unit G2 and the third lens unit G3, and moves along the optical axis independently from the respective lens units in zooming from the wide-angle limit to the telephoto limit at the time of image taking Thus, size reduction of the first lens unit G1 is realized.

Each of the zoom lens systems according to Embodiments 1 to 8 includes the image blur compensating lens unit which moves in the direction perpendicular to the optical axis in order to move the image position in the direction perpendicular to the optical axis. The image blur compensating lens unit compensates image point movement caused by vibration of the entire system, that is, optically compensates image blur caused by hand blurring, vibration and the like.

The image blur compensating lens unit moves in the direction perpendicular to the optical axis when compensating image point movement caused by vibration of the entire system. Thus, compensation of image blur can be performed in the state that size increase in the entire zoom lens system is suppressed to realize a compact construction and that excellent imaging characteristics such as small decentering coma aberration and small decentering astigmatism are maintained.

The image blur compensating lens unit may be a single lens unit. When a single lens unit is composed of a plurality of lens elements, the image blur compensating lens unit may be any one lens element or a plurality of adjacent lens elements among the plurality of lens elements.

In the zoom lens systems according to Embodiments 1 to 8, the third lens unit G3, in order from the object side to the image side, comprises the 3A unit having positive optical power, the 3B unit having positive optical power, and the 3C unit having positive optical power. The 3B unit is an image blur compensating lens unit which moves in the direction perpendicular to the optical axis to optically compensate image blur. Therefore, occurrence of aberration can be reduced when a tilt error of the 3B unit (i.e., the image blur compensating lens unit) occurs, which facilitates production of the zoom lens system.

In the zoom lens systems according to Embodiments 1 to 8, the fourth lens unit G4 is a focusing lens unit which moves along the optical axis to the image side in focusing from the infinity in-focus condition to the close-object in-focus condition. Therefore, the outer diameter of the fourth lens unit G4 can be reduced, which makes weight reduction of the lens unit possible. Thus, a compact actuator can be used, which results in faster movement of the focusing lens unit.

In the zoom lens systems according to Embodiments 1 to 8, in zooming from the wide-angle limit to the telephoto limit at the time of image taking, the second lens unit G2 moves with respect to the image surface S with locus of a convex to the image side. Therefore, various aberrations in the intermediate focal length, particularly coma aberration and spherical aberration, can be appropriately compensated.

In the zoom lens systems according to Embodiments 1 to 8, in zooming from the wide-angle limit to the telephoto limit at the time of image taking, the sixth lens unit G6 is fixed with respect to the image surface S. Thus, dirt such as dust is prevented from entering into the lens system.

In the zoom lens systems according to Embodiments 1 and 2, the fifth lens unit G5, in order from the object side to the image side, comprises the lens element having negative optical power, and the lens element having positive optical power. Thus, particularly spherical aberration at the telephoto limit can be appropriately compensated.

As described above, Embodiments 1 to 8 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for beneficial conditions that a zoom lens system like the zoom lens systems according to Embodiments 1 to 8 can satisfy. Here, a plurality of beneficial conditions is set forth for the zoom lens system according to each embodiment. A construction that satisfies all the plurality of conditions is most effective for the zoom lens system. However, when an individual condition is satisfied, a zoom lens system having the corresponding effect is obtained.

For example, in a zoom lens system like the zoom lens systems according to Embodiments 1 to 8, which comprises, in order from the object side to the image side, a first lens unit having positive optical power, a second lens unit having negative optical power, a third lens unit having positive optical power, a fourth lens unit having negative optical power, a fifth lens unit having negative optical power, and a sixth lens unit having positive optical power (this lens configuration is referred to as a basic configuration of the embodiments, hereinafter), the following condition (1) is satisfied:

$$3.5 < |f_6/f_2| < 15.5 \tag{1}$$

where $f_2$ is the focal length of the second lens unit, and
$f_6$ is the focal length of the sixth lens unit.

The condition (1) sets forth the focal length of the second lens unit and the focal length of the sixth lens unit. When the value goes below the lower limit of the condition (1), the overall length of the lens system is increased. When the value exceeds the upper limit of the condition (1), aberration sensitivity is increased when the second lens unit is decentered, which results in increased production difficulty. In addition, the angle of incident light on the peripheral portion of the image surface becomes excessively large, which causes shading.

When at least one of the following conditions (1)' and (1)" is satisfied, the above-mentioned effect is achieved more successfully.

$$3.6 < |f_6/f_2| \tag{1}'$$

$$|f_6/f_2| < 7.5 \tag{1}''$$

For example, in a zoom lens system, like the zoom lens systems according to Embodiments 1, 2, 7 and 8, which has the basic configuration and in which an aperture diaphragm is provided between the second lens unit and the third lens unit and moves along the optical axis independently from the respective lens units in zooming from the wide-angle limit to the telephoto limit at the time of image taking, it is beneficial to satisfy the following condition (2):

$$0.5 < ds_W/f_W < 1.2 \tag{2}$$

where $ds_W$ is the optical axial distance between the aperture diaphragm and the most object side surface of the third lens unit at the wide-angle limit, and
$f_W$ is the focal length of the zoom lens system in the infinity in-focus condition at the wide-angle limit.

The condition (2) sets forth the distance between the aperture diaphragm and the third lens unit at the telephoto limit. When the value goes below the lower limit of the condition (2), the distance between the aperture diaphragm and the first lens unit increases, and the diameter of the first lens unit increases. When the value exceeds the upper limit of the condition (2), the distance between the aperture diaphragm and the third lens unit increases, and the diameter of the third lens unit increases.

When at least one of the following conditions (2)' and (2)" is satisfied, the above-mentioned effect is achieved more successfully.

$$0.6 < ds_W/f_W \tag{2}'$$

$$ds_W/f_W < 1.0 \tag{2}''$$

For example, in a zoom lens system, like the zoom lens systems according to Embodiments 1 to 8, which has the basic configuration and in which the third lens unit, in order from the object side to the image side, comprises a 3A unit having positive optical power, a 3B unit having positive optical power, and a 3C unit having positive optical power, and the 3B unit is an image blur compensating lens unit which moves in the direction perpendicular to the optical axis to optically compensate image blur, it is beneficial to satisfy the following condition (3):

$$0.5 < f_{3C}/f_{3B} < 6.0 \tag{3}$$

where $f_{3C}$ is the focal length of the 3C unit, and
$f_{3B}$ is the focal length of the 3B unit.

The condition (3) sets forth the focal length of the 3C unit and the focal length of the 3B unit. When the value goes below the lower limit of the condition (3), the amount of movement of the 3B unit is increased when compensation of image blur is performed. When the value exceeds the upper limit of the condition (3), the amount of aberration is increased when compensation of image blur is performed.

When at least one of the following conditions (3)' and (3)" is satisfied, the above-mentioned effect is achieved more successfully.

$$0.8 < f_{3C}/f_{3B} \qquad (3)'$$

$$f_{3C}/f_{3B} < 5.0 \qquad (3)''$$

For example, in a zoom lens system, like the zoom lens systems according to Embodiments 1 to 8, which has the basic configuration and in which the fourth lens unit is a focusing lens unit which moves along the optical axis to the image side in focusing from the infinity in-focus condition to the close-object in-focus condition, it is beneficial to satisfy the following condition (4):

$$1.0 < \beta_{4W} < 2.5 \qquad (4)$$

where $\beta_{4W}$ is the paraxial magnification of the fourth lens unit in the infinity in-focus condition at the wide-angle limit.

The condition (4) sets forth the paraxial magnification of the fourth lens unit in the infinity in-focus condition at the wide-angle limit. When the value goes below the lower limit of the condition (4), the amount of movement of the fourth lens unit is increased in focusing, and the overall length of the lens system is increased. When the value exceeds the upper limit of the condition (4), aberration occurs greatly in focusing.

When at least one of the following conditions (4)' and (4)" is satisfied, the above-mentioned effect is achieved more successfully.

$$1.3 < \beta_{4W} \qquad (4)'$$

$$\beta_{4W} < 2.1 \qquad (4)''$$

For example, a zoom lens system, like the zoom lens systems according to Embodiments 1 to 8, which has the basic configuration and in which the second lens unit moves with respect to the image surface with locus of a convex to the image side in zooming from the wide-angle limit to the telephoto limit at the time of image taking, it is beneficial to satisfy the following condition (5):

$$0.15 < (Ts_W - Ts_M)/f_W < 1.30 \qquad (5)$$

where $Ts_W$ is the optical axial distance from the most object side surface of the second lens unit to the image surface at the wide-angle limit, $Ts_M$ is the optical axial distance from the most object side surface of the second lens unit to the image surface at the middle position, and $f_W$ is the focal length of the zoom lens system in the infinity in-focus condition at the wide-angle limit.

The middle position is a position at which the zoom lens system has a focal length defined by the following formula:

$$f_M = \sqrt{(f_W * f_T)}$$

where $f_M$ is the focal length of the zoom lens system in the infinity in-focus condition at the middle position, $f_W$ is the focal length of the zoom lens system in the infinity in-focus condition at the wide-angle limit, and $f_T$ is the focal length of the zoom lens system in the infinity in-focus condition at the telephoto limit.

The condition (5) sets forth the difference between the distance from the most object side surface of the second lens unit to the image surface at the wide-angle limit, and the distance from the most object side surface of the second lens unit to the image surface at the middle position. When the value goes below the lower limit of the condition (5), coma aberration occurs at the middle position. When the value exceeds the upper limit of the condition (5), spherical aberration occurs at the middle position.

When at least one of the following conditions (5)' and (5)" is satisfied, the above-mentioned effect is achieved more successfully.

$$0.20 < (Ts_W - Ts_M)/f_W \qquad (5)'$$

$$(Ts_W - Ts_M)/f_W < 1.10 \qquad (5)''$$

The individual lens units constituting the zoom lens systems according to Embodiments 1 to 8 are each composed exclusively of refractive type lens elements that deflect incident light by refraction (that is, lens elements of a type in which deflection is achieved at the interface between media having different refractive indices). However, the present disclosure is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved. Thus, such a configuration is beneficial.

Embodiment 9

Figure 33:
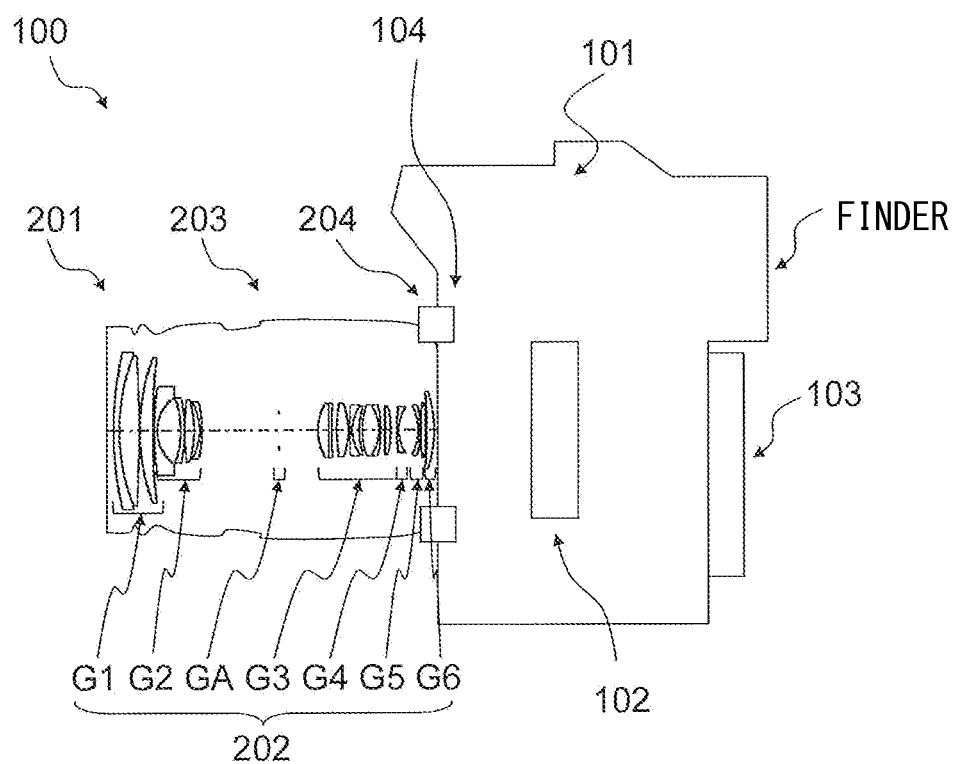
FIG. 33 is a schematic construction diagram of an interchangeable-lens type digital camera system according to Embodiment 9.

FIG. 33 is a schematic construction diagram of an interchangeable-lens type digital camera system according to Embodiment 9.

The interchangeable-lens type digital camera system 100 according to Embodiment 9 includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a zoom lens system 202 according to any of Embodiments 1 to 8; a lens barrel 203 which holds the zoom lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 33, the zoom lens system according to Embodiment 1 is employed as the zoom lens system 202.

In Embodiment 9, since the zoom lens system 202 according to any of Embodiments 1 to 8 is employed, a compact interchangeable lens apparatus having excellent imaging performance can be realized at low cost. Moreover, size reduction and cost reduction of the entire camera system 100 according to Embodiment 9 can be achieved. In the zoom lens systems according to Embodiments 1 to 8, the entire zooming range need not be used. That is, in accordance with a desired zooming range, a range where satisfactory optical performance is obtained may exclusively be used. Then, the zoom lens system may be used as one having a lower magnification than the zoom lens systems described in Embodiments 1 to 8.

As described above, Embodiment 9 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the zoom lens systems according to Embodiments 1 to 8 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1 + \sqrt{1 - (1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is a n-th order aspherical coefficient.

FIGS. 2, 6, 10, 14, 18, 22, 26 and 30 are longitudinal aberration diagrams of an infinity in-focus condition of the zoom lens systems according to Numerical Examples 1 to 8, respectively.

FIGS. 3, 7, 11, 15, 19, 23, 27 and 31 are longitudinal aberration diagrams of a close-object in-focus condition of the zoom lens systems according to Numerical Examples 1 to 8, respectively. Each object distance in Numerical Examples 1 to 8 is as follows.

| Numerical Example | Object distance (mm) |
|---|---|
| 1 | 1000 |
| 2 | 1000 |
| 3 | 1000 |
| 4 | 1000 |
| 5 | 1000 |
| 6 | 1000 |
| 7 | 500 |
| 8 | 500 |

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 4, 8, 12, 16, 20, 24, 28 and 32 are lateral aberration diagrams of the zoom lens systems at a telephoto limit according to Numerical Examples 1 to 8, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the 3B unit serving as the image blur compensating lens unit (Numerical Examples 1 to 6: the thirteenth lens element L13 and the fourteenth lens element L14 in the third lens unit G3, Numerical Examples 7-8: the thirteenth lens element L13 in the third lens unit G3) is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the third lens unit G3.

In the zoom lens system according to each Numerical Example, the amount of movement of the image blur compensating lens unit in a direction perpendicular to the optical axis in an image blur compensation state at a telephoto limit is as follows.

| Numerical Example | Amount of movement (mm) |
|---|---|
| 1 | 0.4129 |
| 2 | 0.4125 |
| 3 | 0.4837 |
| 4 | 0.5681 |
| 5 | 0.4329 |
| 6 | 0.5919 |
| 7 | 0.1793 |
| 8 | 0.1915 |

When the shooting distance is infinity, at a telephoto limit, the amount of image decentering in a case that the zoom lens system inclines by a predetermined angle is equal to the amount of image decentering in a case that the image blur compensating lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to a predetermined angle without degrading the imaging characteristics.

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows the various data in an infinity in-focus condition. Table 4 shows the various data in a close-object in-focus condition.

TABLE 1

(Surface data)

| Surface number | r | d | nd | vd |
|---|---|---|---|---|
| Object surface | ∞ | | | |
| 1 | 105.35210 | 1.80000 | 1.69895 | 30.0 |
| 2 | 62.64560 | 6.20090 | 1.43700 | 95.1 |
| 3 | −397.51920 | 0.20000 | | |
| 4 | 63.82360 | 3.94270 | 1.59282 | 68.6 |
| 5 | 201.71420 | Variable | | |
| 6 | 96.51260 | 1.00000 | 1.88300 | 40.8 |
| 7 | 12.47840 | 7.33480 | | |
| 8* | −28.06390 | 1.00000 | 1.77200 | 50.0 |
| 9* | −98.31310 | 0.20000 | | |
| 10 | 91.98080 | 2.89590 | 1.92286 | 20.9 |
| 11 | −32.50140 | 1.76260 | | |
| 12 | −17.06200 | 0.70000 | 1.77250 | 49.6 |
| 13 | −38.50660 | Variable | | |
| 14(Diaphragm) | ∞ | Variable | | |
| 15 | 16.77610 | 3.39390 | 1.58144 | 40.9 |
| 16 | 5986.57370 | 0.80000 | 1.77200 | 50.0 |
| 17* | 491.25280 | 1.55850 | | |
| 18 | 51.84430 | 3.43290 | 1.49700 | 81.6 |
| 19 | −26.05530 | 0.65520 | | |
| 20 | 522.12710 | 0.60910 | 1.90366 | 31.3 |
| 21 | 12.88130 | 2.17700 | 1.51680 | 64.2 |
| 22 | 24.55750 | 0.90310 | | |
| 23* | 21.25310 | 5.21900 | 1.52500 | 70.3 |
| 24 | −14.39430 | 0.60000 | 1.59551 | 39.2 |
| 25 | −31.37740 | 1.21060 | | |
| 26 | −634.59720 | 1.77180 | 1.51823 | 59.0 |
| 27 | −29.06530 | Variable | | |
| 28 | 51.73670 | 0.60000 | 1.55332 | 71.7 |
| 29* | 11.83360 | Variable | | |
| 30 | −15.97280 | 0.60000 | 1.77250 | 49.6 |
| 31 | −36.84410 | 0.20000 | | |
| 32 | 112.03320 | 1.36430 | 1.72825 | 28.3 |
| 33 | −129.48670 | Variable | | |
| 34 | −133.45960 | 2.39610 | 1.74950 | 35.0 |
| 35 | −35.08460 | (BF) | | |
| Image surface | ∞ | | | |

TABLE 2

(Aspherical data)

Surface No. 8
K = 0.00000E+00, A4 = 5.51279E−05, A6 = −5.81384E−07,
A8 = −1.58186E−10 A10 = 9.96757E−13
Surface No. 9
K = 0.00000E+00, A4 = 2.18841E−05, A6 = −6.64572E−07,
A8 = 0.00000E+00 A10 = 0.00000E+00
Surface No. 17
K = 0.00000E+00, A4 = 5.30316E−05, A6 = 2.63684E−08,
A8 = 4.12965E−10 A10 = −2.28732E−12
Surface No. 23
K = 0.00000E+00, A4 = −2.98927E−05, A6 = −1.45365E−08,
A8 = 0.00000E+00 A10 = 0.00000E+00
Surface No. 29
K = 0.00000E+00, A4 = −2.83493E−05, A6 = 1.25456E−07,
A8 = −8.37230E−09 A10 = 8.44871E−11

TABLE 3

(Various data in an infinity in-focus condition)

| Zooming ratio | 19.23083 | | |
|---|---|---|---|
| | Wide-angle limit | Middle position | Telephoto limit |
| Focal length | 12.4800 | 54.7239 | 240.0000 |
| F-number | 3.64038 | 5.72029 | 6.55288 |
| Half view angle | 44.1636 | 10.8531 | 2.5897 |
| Image height | 10.8150 | 10.8150 | 10.8150 |
| Overall length of lens system | 113.7994 | 137.2772 | 188.7954 |
| BF | 14.50800 | 14.50800 | 14.50800 |
| d5 | 0.4500 | 31.9868 | 67.2115 |
| d13 | 23.9411 | 6.2476 | 1.0000 |
| d14 | 11.8655 | 1.5000 | 1.5000 |
| d27 | 1.8889 | 6.8936 | 1.6020 |
| d29 | 6.1681 | 6.9778 | 13.0755 |
| d33 | 0.4500 | 14.6346 | 35.3696 |

Zoom lens unit data

| Lens unit | Initial surface No. | Focal length |
|---|---|---|
| 1 | 1 | 101.14497 |
| 2 | 6 | −14.45218 |
| 3 | 15 | 19.47259 |
| 4 | 28 | −27.87827 |
| 5 | 30 | −68.61370 |
| 6 | 34 | 62.84949 |

TABLE 4

(Various data in a close-object in-focus condition)

| | Wide-angle limit | Middle position | Telephoto limit |
|---|---|---|---|
| Object distance | 1000.0000 | 1000.0000 | 1000.0000 |
| BF | 14.50800 | 14.50800 | 14.50800 |
| d5 | 0.4500 | 31.9868 | 67.2115 |
| d13 | 23.9411 | 6.2476 | 1.0000 |
| d14 | 11.8655 | 1.5000 | 1.5000 |
| d27 | 1.9528 | 7.4848 | 5.5517 |
| d29 | 6.1041 | 6.3866 | 9.1257 |
| d33 | 0.4500 | 14.6346 | 35.3696 |

Numerical Example 2

The zoom lens system of Numerical Example 2 corresponds to Embodiment 2 shown in FIG. 5. Table 5 shows the surface data of the zoom lens system of Numerical Example 2. Table 6 shows the aspherical data. Table 7 shows the various data in an infinity in-focus condition. Table 8 shows the various data in a close-object in-focus condition.

TABLE 5

(Surface data)

| Surface number | r | d | nd | vd |
|---|---|---|---|---|
| Object surface | ∞ | | | |
| 1 | 98.25810 | 1.80000 | 1.69895 | 30.0 |
| 2 | 59.66840 | 6.56190 | 1.43700 | 95.1 |
| 3 | −497.63180 | 0.20000 | | |
| 4 | 62.48830 | 3.90980 | 1.59282 | 68.6 |
| 5 | 193.23860 | Variable | | |
| 6 | 57.75970 | 1.00000 | 1.88300 | 40.8 |
| 7 | 12.27720 | 7.44040 | | |
| 8* | −29.38520 | 1.00000 | 1.80998 | 40.9 |
| 9* | 101.00250 | 0.20000 | | |
| 10 | 51.10010 | 3.22380 | 1.92286 | 20.9 |
| 11 | −33.53880 | 1.46470 | | |
| 12 | −17.82810 | 0.70000 | 1.80420 | 46.5 |
| 13 | −37.05810 | Variable | | |
| 14(Diaphragm) | ∞ | Variable | | |
| 15 | 17.58940 | 6.00610 | 1.59551 | 39.2 |
| 16 | −409.18210 | 0.80000 | 1.80998 | 40.9 |
| 17* | ∞ | 1.49060 | | |
| 18 | 57.25350 | 2.87510 | 1.49700 | 81.6 |
| 19 | −24.43040 | 0.11870 | | |
| 20 | −114.55590 | 0.60000 | 1.90366 | 31.3 |
| 21 | 14.85000 | 2.14990 | 1.51823 | 59.0 |
| 22 | 36.70930 | 0.51870 | | |
| 23* | 22.37060 | 4.81650 | 1.52500 | 70.3 |
| 24 | −15.29860 | 0.60000 | 1.60342 | 38.0 |
| 25 | −32.69940 | 1.29390 | | |
| 26 | −570.97450 | 1.81540 | 1.51742 | 52.1 |
| 27 | −26.91010 | Variable | | |
| 28 | 71.88050 | 0.60000 | 1.55332 | 71.7 |
| 29* | 11.91810 | Variable | | |
| 30 | −17.11980 | 0.60000 | 1.72916 | 54.7 |
| 31 | −39.95540 | 0.20000 | | |
| 32 | 42.94640 | 1.82980 | 1.90366 | 31.3 |
| 33 | −1119.37220 | Variable | | |
| 34 | 369.32240 | 1.33980 | 1.48749 | 70.4 |
| 35 | −136.08810 | (BF) | | |
| Image surface | ∞ | | | |

TABLE 6

(Aspherical data)

Surface No.8
K = 0.00000E+00, A4 = 1.31872E−05, A6 = −1.60235E−07, A8 = −1.01682E−09 A10 = 7.24155E−12
Surface No.9
K = 0.00000E+00, A4 = −7.53265E−06, A6 = −2.33663E−07, A8 = 0.00000E+00 A10 = 0.00000E+00
Surface No.17
K = 0.00000E+00, A4 = 5.41837E−05, A6 = 5.53098E−08, A8 = 8.28082E−11 A10 = −3.39798E−13
Surface No.23
K = 0.00000E+00, A4 = −2.79144E−05, A6 = −8.65744E−09, A8 = 0.00000E+00 A10 = 0.00000E+00
Surface No.29
K = 0.00000E+00, A4 = −3.35207E−05, A6 = 2.37928E−08, A8 = −5.65197E−09 A10 = 4.49193E−11

TABLE 7

(Various data in an infinity in-focus condition)

| Zooming ratio | 19.23081 | | |
|---|---|---|---|
| | Wide-angle limit | Middle position | Telephoto limit |
| Focal length | 12.4801 | 54.7286 | 240.0022 |
| F-number | 3.64042 | 5.72066 | 6.55290 |
| Half view angle | 44.0328 | 10.9710 | 2.5801 |
| Image height | 10.8150 | 10.8150 | 10.8150 |
| Overall length of lens system | 118.3307 | 135.8904 | 193.1763 |
| BF | 13.70000 | 13.70000 | 13.70000 |
| d5 | 0.4500 | 31.3121 | 65.8955 |
| d13 | 26.2890 | 4.8992 | 0.9999 |
| d14 | 10.7267 | 1.5040 | 1.5000 |
| d27 | 1.5985 | 8.2555 | 1.6011 |
| d29 | 9.9609 | 10.1444 | 14.5932 |
| d33 | 0.4499 | 10.9193 | 39.7302 |

Zoom lens unit data

| Lens unit | Initial surface No. | Focal length |
|---|---|---|
| 1 | 1 | 100.00599 |
| 2 | 6 | −13.61143 |
| 3 | 15 | 19.39662 |
| 4 | 28 | −25.91280 |
| 5 | 30 | −557.53071 |
| 6 | 34 | 204.17083 |

TABLE 8

(Various data in a close-object in-focus condition)

| | Wide-angle limit | Middle position | Telephoto limit |
|---|---|---|---|
| Object distance | 1000.0000 | 1000.0000 | 1000.0000 |
| BF | 13.70000 | 13.70000 | 13.70000 |
| d5 | 0.4500 | 31.3121 | 65.8955 |
| d13 | 26.2890 | 4.8992 | 0.9999 |
| d14 | 10.7267 | 1.5040 | 1.5000 |
| d27 | 1.6501 | 8.8523 | 5.2336 |
| d29 | 9.9094 | 9.5476 | 10.9608 |
| d33 | 0.4499 | 10.9193 | 39.7302 |

Numerical Example 3

The zoom lens system of Numerical Example 3 corresponds to Embodiment 3 shown in FIG. 9. Table 9 shows the surface data of the zoom lens system of Numerical Example 3. Table 10 shows the aspherical data. Table 11 shows the various data in an infinity in-focus condition. Table 12 shows the various data in a close-object in-focus condition.

TABLE 9

(Surface data)

| Surface number | r | d | nd | vd |
|---|---|---|---|---|
| Object surface | ∞ | | | |
| 1 | 95.87260 | 1.80000 | 1.68893 | 31.2 |
| 2 | 56.46380 | 6.11150 | 1.49700 | 81.6 |
| 3 | −499.07370 | 0.20000 | | |
| 4 | 62.87330 | 3.61620 | 1.49700 | 81.6 |
| 5 | 190.29600 | Variable | | |
| 6 | 48.94690 | 1.00000 | 1.88300 | 40.8 |
| 7 | 13.94830 | 6.25190 | | |
| 8 | −46.93480 | 0.70000 | 1.83481 | 42.7 |
| 9 | 62.72270 | 0.20000 | | |
| 10 | 28.83120 | 2.90590 | 1.94595 | 18.0 |
| 11 | −193.36590 | 2.02880 | | |
| 12 | −21.49080 | 0.70000 | 1.80420 | 46.5 |
| 13 | −62.23230 | Variable | | |
| 14(Diaphragm) | ∞ | 1.50000 | | |
| 15 | 15.74690 | 1.40400 | 1.92286 | 20.9 |
| 16 | 22.24900 | 0.67690 | | |

TABLE 9-continued (Surface data)

| Surface number | r | d | nd | vd |
|---|---|---|---|---|
| 17 | 45.70860 | 0.80000 | 1.80998 | 40.9 |
| 18* | 31.15860 | 0.20000 | | |
| 19 | 16.97020 | 3.42900 | 1.48749 | 70.4 |
| 20 | −44.43150 | 0.20000 | | |
| 21 | 39.75760 | 0.60000 | 1.80518 | 25.5 |
| 22 | 10.93730 | 2.05360 | 1.48749 | 70.4 |
| 23 | 18.67200 | 1.53440 | | |
| 24* | 24.14370 | 4.60660 | 1.52500 | 70.3 |
| 25 | −15.41210 | 0.60000 | 1.56732 | 42.8 |
| 26 | −37.60110 | 1.47800 | | |
| 27 | 102.87280 | 1.82000 | 1.51823 | 59.0 |
| 28 | −30.17850 | Variable | | |
| 29 | 72.46470 | 0.70000 | 1.52500 | 70.3 |
| 30* | 12.83920 | Variable | | |
| 31 | −14.96970 | 0.70000 | 1.59282 | 68.6 |
| 32 | −26.84930 | Variable | | |
| 33 | −99.78090 | 3.12200 | 1.71736 | 29.5 |
| 34 | −31.86000 | (BF) | | |
| Image surface | ∞ | | | |

TABLE 10

(Aspherical data)

Surface No.18
K = 0.00000E+00, A4 = 4.95875E−05, A6 = 9.01806E−08, A8 = −2.48303E−10 A10 = 4.55887E−12
Surface No.24
K = 0.00000E+00, A4 = −2.41997E−05, A6 = 0.00000E+00, A8 = 0.00000E+00 A10 = 0.00000E+00
Surface No.30
K = 0.00000E+00, A4 = −2.17117E−05, A6 = −9.96190E−08, A8 = 0.00000E+00 A10 = 0.00000E+00

TABLE 11

(Various data in an infinity in-focus condition)

| Zooming ratio | 16.48339 | | |
|---|---|---|---|
| | Wide-angle limit | Middle position | Telephoto limit |
| Focal length | 14.5600 | 59.1134 | 239.9977 |
| F-number | 3.64005 | 5.72043 | 6.55272 |
| Half view angle | 39.7670 | 10.0946 | 2.5655 |
| Image height | 10.8150 | 10.8150 | 10.8150 |
| Overall length of lens system | 110.0003 | 136.5146 | 180.0000 |
| BF | 18.81900 | 18.81900 | 18.81900 |
| d5 | 0.4500 | 30.3728 | 64.1617 |
| d13 | 31.3272 | 7.5758 | 1.0000 |
| d28 | 1.5536 | 6.2259 | 1.6000 |
| d30 | 6.4616 | 6.9293 | 13.9918 |
| d32 | 0.4500 | 15.6534 | 29.4894 |

Zoom lens unit data

| Lens unit | Initial surface No. | Focal length |
|---|---|---|
| 1 | 1 | 99.70766 |
| 2 | 6 | −14.35792 |
| 3 | 14 | 18.25371 |
| 4 | 29 | −29.84199 |
| 5 | 31 | −58.35108 |
| 6 | 33 | 64.01667 |

TABLE 12

(Various data in a close-object in-focus condition)

| | Wide-angle limit | Middle position | Telephoto limit |
|---|---|---|---|
| Object distance | 1000.0000 | 1000.0000 | 1000.0000 |
| BF | 18.81900 | 18.81900 | 18.81900 |
| d5 | 0.4500 | 30.3728 | 64.1617 |
| d13 | 31.3272 | 7.5758 | 1.0000 |
| d28 | 1.6277 | 6.8570 | 6.2063 |
| d30 | 6.3875 | 6.2982 | 9.3854 |
| d32 | 0.4500 | 15.6534 | 29.4894 |

Numerical Example 4

The zoom lens system of Numerical Example 4 corresponds to Embodiment 4 shown in FIG. 13. Table 13 shows the surface data of the zoom lens system of Numerical Example 4. Table 14 shows the aspherical data. Table 15 shows the various data in an infinity in-focus condition. Table 16 shows the various data in a close-object in-focus condition.

TABLE 13

(Surface data)

| Surface number | r | d | nd | vd |
|---|---|---|---|---|
| Object surface | ∞ | | | |
| 1 | 95.96630 | 1.80000 | 1.68893 | 31.2 |
| 2 | 56.87540 | 6.84810 | 1.49700 | 81.6 |
| 3 | −523.57190 | 0.20000 | | |
| 4 | 64.07260 | 3.68230 | 1.49700 | 81.6 |
| 5 | 192.74060 | Variable | | |
| 6 | 45.16420 | 1.00000 | 1.88300 | 40.8 |
| 7 | 14.36030 | 6.92730 | | |
| 8 | −44.64470 | 0.70000 | 1.83481 | 42.7 |
| 9 | 53.96410 | 0.20000 | | |
| 10 | 29.61670 | 3.15930 | 1.94595 | 18.0 |
| 11 | −140.89780 | 2.83350 | | |
| 12 | −20.59430 | 0.70000 | 1.80420 | 46.5 |
| 13 | −58.34400 | Variable | | |
| 14(Diaphragm) | ∞ | 1.50000 | | |
| 15 | 16.61690 | 1.40240 | 1.92286 | 20.9 |
| 16 | 22.05450 | 1.00600 | | |
| 17 | 84.84020 | 0.80000 | 1.77200 | 50.0 |
| 18* | 52.81340 | 0.20000 | | |
| 19 | 18.30570 | 3.65060 | 1.48749 | 70.4 |
| 20 | −35.77840 | 0.20000 | | |
| 21 | 61.41940 | 0.60000 | 1.76182 | 26.6 |
| 22 | 11.34980 | 2.30500 | 1.48749 | 70.4 |
| 23 | 21.65900 | 1.41300 | | |
| 24* | 28.68950 | 3.97980 | 1.52500 | 70.3 |
| 25 | −16.36100 | 0.60000 | 1.54814 | 45.8 |
| 26 | −50.90290 | 1.43140 | | |
| 27 | 71.48130 | 2.21660 | 1.51742 | 52.1 |
| 28 | −27.20190 | Variable | | |
| 29 | 81.94760 | 0.70000 | 1.52500 | 70.3 |
| 30* | 14.30740 | Variable | | |
| 31 | −14.09210 | 0.70000 | 1.59282 | 68.6 |
| 32 | −20.54580 | Variable | | |
| 33 | −35.10710 | 1.36270 | 1.92286 | 20.9 |
| 34 | −26.30520 | (BF) | | |
| Image surface | ∞ | | | |

TABLE 14

(Aspherical data)

Surface No.18
K = 0.00000E+00, A4 = 5.12780E−05, A6 = 9.07440E−08, A8 = −4.56669E−10 A10 = 5.08991E−12

TABLE 14-continued (Aspherical data)

Surface No.24

K = 0.00000E+00, A4 = −1.64653E−05, A6 = 0.00000E+00, A8 = 0.00000E+00 A10 = 0.00000E+00

Surface No.30

K = 0.00000E+00, A4 = −1.95053E−05, A6 = −7.39585E−08, A8 = 0.00000E+00 A10 = 0.00000E+00

TABLE 15

(Various data in an infinity in-focus condition)

Zooming ratio 16.48355

| | Wide-angle limit | Middle position | Telephoto limit |
|---|---|---|---|
| Focal length | 14.5600 | 59.1136 | 240.0006 |
| F-number | 3.64034 | 5.72056 | 6.55286 |
| Half view angle | 39.6355 | 10.0724 | 2.5618 |
| Image height | 10.8150 | 10.8150 | 10.8150 |
| Overall length of lens system | 114.8680 | 141.7919 | 185.0009 |
| BF | 20.74400 | 20.74400 | 20.74400 |
| d5 | 0.4500 | 33.1280 | 64.5054 |
| d13 | 32.0705 | 8.0673 | 1.0000 |
| d28 | 1.6000 | 6.0535 | 1.5864 |
| d30 | 7.4357 | 7.5517 | 14.2107 |
| d32 | 0.4500 | 14.1292 | 30.8358 |

Zoom lens unit data

| Lens unit | Initial surface No. | Focal length |
|---|---|---|
| 1 | 1 | 101.25112 |
| 2 | 6 | −14.11057 |
| 3 | 14 | 18.76936 |
| 4 | 29 | −33.13437 |
| 5 | 31 | −78.86057 |
| 6 | 33 | 105.82716 |

TABLE 16

(Various data in a close-object in-focus condition)

| | Wide-angle limit | Middle position | Telephoto limit |
|---|---|---|---|
| Object distance | 1000.0000 | 1000.0000 | 1000.0000 |
| BF | 20.74400 | 20.74400 | 20.74400 |
| d5 | 0.4500 | 33.1280 | 64.5054 |
| d13 | 32.0705 | 8.0673 | 1.0000 |
| d28 | 1.6745 | 6.7290 | 6.2916 |
| d30 | 7.3612 | 6.8762 | 9.5055 |
| d32 | 0.4500 | 14.1292 | 30.8358 |

Numerical Example 5

The zoom lens system of Numerical Example 5 corresponds to Embodiment 5 shown in FIG. 17. Table 17 shows the surface data of the zoom lens system of Numerical Example 5. Table 18 shows the aspherical data. Table 19 shows the various data in an infinity in-focus condition. Table 20 shows the various data in a close-object in-focus condition.

TABLE 17

(Surface data)

| Surface number | r | d | nd | vd |
|---|---|---|---|---|
| Object surface | ∞ | | | |
| 1 | 95.71330 | 1.80000 | 1.72825 | 28.3 |
| 2 | 60.36940 | 6.35540 | 1.43700 | 95.1 |
| 3 | −345.33170 | 0.20000 | | |
| 4 | 62.10270 | 3.84320 | 1.59282 | 68.6 |
| 5 | 198.42930 | Variable | | |
| 6 | 51.14930 | 1.00000 | 1.88300 | 40.8 |
| 7 | 14.44050 | 6.55350 | | |
| 8 | −32.89640 | 0.70000 | 1.80420 | 46.5 |
| 9 | 76.08850 | 0.20000 | | |
| 10 | 33.58340 | 3.22670 | 1.94595 | 18.0 |
| 11 | −61.97350 | 1.33260 | | |
| 12 | −23.40060 | 0.70000 | 1.90366 | 31.3 |
| 13 | −80.22440 | Variable | | |
| 14(Diaphragm) | ∞ | 1.50000 | | |
| 15 | 15.22880 | 1.37980 | 1.92286 | 20.9 |
| 16 | 20.95170 | 0.85640 | | |
| 17 | 56.71130 | 0.80000 | 1.80998 | 40.9 |
| 18* | 37.55420 | 0.20000 | | |
| 19 | 18.08380 | 3.36100 | 1.48749 | 70.4 |
| 20 | −38.78720 | 0.20000 | | |
| 21 | 42.18230 | 0.60000 | 1.80518 | 25.5 |
| 22 | 11.15930 | 2.01060 | 1.48749 | 70.4 |
| 23 | 19.23320 | 1.71340 | | |
| 24* | 22.59140 | 4.07720 | 1.52500 | 70.3 |
| 25 | −15.17170 | 0.60000 | 1.56732 | 42.8 |
| 26 | −34.61350 | 1.59610 | | |
| 27 | −345.12130 | 1.66090 | 1.51823 | 59.0 |
| 28 | −25.10140 | Variable | | |
| 29 | 62.69400 | 0.70000 | 1.52500 | 70.3 |
| 30* | 12.43960 | Variable | | |
| 31 | −14.26850 | 0.70000 | 1.59282 | 68.6 |
| 32 | −26.40620 | Variable | | |
| 33 | −103.24790 | 2.61560 | 1.69895 | 30.0 |
| 34 | −29.17870 | (BF) | | |
| Image surface | ∞ | | | |

TABLE 18

(Aspherical data)

Surface No. 18

K = 0.00000E+00, A4 = 5.46420E−05, A6 = 1.05384E−07, A8 = −1.66369E−10 A10 = 1.85982E−12

Surface No. 24

K = 0.00000E+00, A4 = −3.00831E−05, A6 = 0.00000E+00 A8 = 0.00000E+00 A10 = 0.00000E+00

Surface No. 30

K = 0.00000E+00, A4 = −2.19909E−05, A6 = −1.24526E−07, A8 = 0.00000E+00 A10 = 0.00000E+00

TABLE 19

(Various data in an infinity in-focus condition)

Zooming ratio 14.50544

| | Wide-angle limit | Middle position | Telephoto limit |
|---|---|---|---|
| Focal length | 14.5601 | 55.4438 | 211.2007 |
| F-number | 3.64048 | 4.99258 | 5.82476 |
| Half view angle | 39.8202 | 10.6933 | 2.9049 |
| Image height | 10.8150 | 10.8150 | 10.8150 |
| Overall length of lens system | 109.0119 | 130.7805 | 169.0612 |
| BF | 17.78500 | 17.78500 | 17.78500 |
| d5 | 0.4500 | 28.5592 | 59.7883 |
| d13 | 31.0760 | 7.6010 | 1.0000 |

TABLE 19-continued (Various data in an infinity in-focus condition)

| | | | |
|---|---|---|---|
| d28 | 1.6000 | 6.1696 | 1.5951 |
| d30 | 7.1690 | 7.3746 | 13.8411 |
| d32 | 0.4500 | 12.8088 | 24.5691 |

Zoom lens unit data

| Lens unit | Initial surface No. | Focal length |
|---|---|---|
| 1 | 1 | 94.53741 |
| 2 | 6 | −14.54130 |
| 3 | 14 | 18.13950 |
| 4 | 29 | −29.70178 |
| 5 | 31 | −53.51129 |
| 6 | 33 | 57.35872 |

TABLE 20

(Various data in a close-object in-focus condition)

| | Wide-angle limit | Middle position | Telephoto limit |
|---|---|---|---|
| Object distance | 1000.0000 | 1000.0000 | 1000.0000 |
| BF | 17.78500 | 17.78500 | 17.78500 |
| d5 | 0.4500 | 28.5592 | 59.7883 |
| d13 | 31.0760 | 7.6010 | 1.0000 |
| d28 | 1.6760 | 6.8000 | 5.8869 |
| d30 | 7.0929 | 6.7441 | 9.5493 |
| d32 | 0.4500 | 12.8088 | 24.5691 |

Numerical Example 6

The zoom lens system of Numerical Example 6 corresponds to Embodiment 6 shown in FIG. 21. Table 21 shows the surface data of the zoom lens system of Numerical Example 6. Table 22 shows the aspherical data. Table 23 shows the various data in an infinity in-focus condition. Table 24 shows the various data in a close-object in-focus condition.

TABLE 21

(Surface data)

| Surface number | r | d | nd | vd |
|---|---|---|---|---|
| Object surface | ∞ | | | |
| 1 | 100.10600 | 1.80000 | 1.72825 | 28.3 |
| 2 | 61.77980 | 6.84610 | 1.43700 | 95.1 |
| 3 | −325.53280 | 0.20000 | | |
| 4 | 61.49780 | 3.93670 | 1.59282 | 68.6 |
| 5 | 196.38630 | Variable | | |
| 6 | 47.49150 | 1.00000 | 1.88300 | 40.8 |
| 7 | 14.70230 | 7.32560 | | |
| 8 | −32.87410 | 0.70000 | 1.80420 | 46.5 |
| 9 | 63.18990 | 0.20000 | | |
| 10 | 33.01960 | 3.55460 | 1.94595 | 18.0 |
| 11 | −58.96660 | 2.12730 | | |
| 12 | −22.37940 | 0.70000 | 1.90366 | 31.3 |
| 13 | −77.30020 | Variable | | |
| 14(Diaphragm) | ∞ | 1.50000 | | |
| 15 | 17.12760 | 1.32130 | 1.92286 | 20.9 |
| 16 | 23.23610 | 1.11050 | | |
| 17 | 135.05370 | 0.80000 | 1.77200 | 50.0 |
| 18* | 69.75360 | 0.20000 | | |
| 19 | 18.80290 | 3.77690 | 1.48749 | 70.4 |
| 20 | −34.77110 | 0.20000 | | |
| 21 | 55.54330 | 0.60000 | 1.80518 | 25.5 |
| 22 | 11.81610 | 2.26300 | 1.48749 | 70.4 |
| 23 | 22.15110 | 1.45390 | | |
| 24* | 30.11060 | 3.31440 | 1.52500 | 70.3 |

TABLE 21-continued (Surface data)

| Surface number | r | d | nd | vd |
|---|---|---|---|---|
| 25 | −23.74610 | 0.60000 | 1.51742 | 52.1 |
| 26 | −69.41580 | 1.43030 | | |
| 27 | 58.44510 | 2.46270 | 1.51823 | 59.0 |
| 28 | −25.81810 | Variable | | |
| 29 | 72.41410 | 0.70000 | 1.52500 | 70.3 |
| 30* | 13.88050 | Variable | | |
| 31 | −13.55290 | 0.70000 | 1.59282 | 68.6 |
| 32 | −19.20530 | Variable | | |
| 33 | −30.10170 | 1.33140 | 1.92286 | 20.9 |
| 34 | −23.63860 | (BF) | | |
| Image surface | ∞ | | | |

TABLE 22

(Aspherical data)

Surface No. 18

K = 0.00000E+00, A4 = 5.23312E−05, A6 = 9.21158E−08,
A8 = −4.97643E−10 A10 = 4.53955E−12

Surface No. 24

K = 0.00000E+00, A4 = −1.55941E−05, A6 = 0.00000E+00,
A8 = 0.00000E+00 A10 = 0.00000E+00

Surface No. 30

K = 0.00000E+00, A4 = −2.04630E−05, A6 = −8.36585E−08,
A8 = 0.00000E+00 A10 = 0.00000E+00

TABLE 23

(Various data in an infinity in-focus condition)

Zooming ratio 14.50556

| | Wide-angle limit | Middle position | Telephoto limit |
|---|---|---|---|
| Focal length | 14.5600 | 55.4539 | 211.2016 |
| F-number | 3.64006 | 4.99211 | 5.82460 |
| Half view angle | 39.6409 | 10.6801 | 2.9009 |
| Image height | 10.8150 | 10.8150 | 10.8150 |
| Overall length of lens system | 114.9997 | 136.5926 | 175.0007 |
| BF | 20.80300 | 20.80300 | 20.80300 |
| d5 | 0.4500 | 30.5680 | 59.4364 |
| d13 | 32.1190 | 8.1117 | 1.0000 |
| d28 | 1.6000 | 5.9123 | 1.5856 |
| d30 | 7.4237 | 7.5518 | 13.6542 |
| d32 | 0.4500 | 11.4913 | 26.3664 |

Zoom lens unit data

| Lens unit | Initial surface No. | Focal length |
|---|---|---|
| 1 | 1 | 95.28064 |
| 2 | 6 | −14.21943 |
| 3 | 14 | 18.62864 |
| 4 | 29 | −32.84364 |
| 5 | 31 | −81.43068 |
| 6 | 33 | 108.56518 |

TABLE 24

(Various data in a close-object in-focus condition)

|  | Wide-angle limit | Middle position | Telephoto limit |
|---|---|---|---|
| Object distance | 1000.0000 | 1000.0000 | 1000.0000 |
| BF | 20.80300 | 20.80300 | 20.80300 |
| d5 | 0.4500 | 30.5680 | 59.4364 |
| d13 | 32.1190 | 8.1117 | 1.0000 |
| d28 | 1.6738 | 6.5606 | 5.7980 |
| d30 | 7.3498 | 6.9035 | 9.4419 |
| d32 | 0.4500 | 11.4913 | 26.3664 |

Numerical Example 7

The zoom lens system of Numerical Example 7 corresponds to Embodiment 7 shown in FIG. 25. Table 25 shows the surface data of the zoom lens system of Numerical Example 7. Table 26 shows the aspherical data. Table 27 shows the various data in an infinity in-focus condition. Table 28 shows the various data in a close-object in-focus condition.

TABLE 25

(Surface data)

| Surface number | r | d | nd | vd |
|---|---|---|---|---|
| Object surface | ∞ | | | |
| 1 | 282.44890 | 2.00000 | 1.84666 | 23.8 |
| 2 | 93.75220 | 5.98140 | 1.72916 | 54.7 |
| 3 | −797.31610 | 0.20000 | | |
| 4 | 61.59120 | 4.77760 | 1.72916 | 54.7 |
| 5 | 155.18030 | Variable | | |
| 6* | 162.27490 | 1.00000 | 1.80998 | 40.9 |
| 7* | 12.93880 | 8.72100 | | |
| 8 | −14.36860 | 0.70000 | 1.61800 | 63.4 |
| 9 | −49.59270 | 0.20000 | | |
| 10 | 128.26380 | 2.69590 | 1.92286 | 20.9 |
| 11 | −26.19710 | 0.54460 | | |
| 12 | −19.94190 | 0.70000 | 2.00100 | 29.1 |
| 13 | −35.03920 | Variable | | |
| 14(Diaphragm) | ∞ | Variable | | |
| 15 | 25.12110 | 2.64710 | 2.00100 | 29.1 |
| 16 | 106.79340 | 1.14060 | | |
| 17 | −84.18940 | 1.00000 | 1.77200 | 50.0 |
| 18* | 77.83220 | 0.20010 | | |
| 19 | 21.16180 | 6.48230 | 1.49700 | 81.6 |
| 20 | −26.54690 | 0.20000 | | |
| 21 | 87.69960 | 0.60000 | 1.80518 | 25.5 |
| 22 | 12.73930 | 3.11840 | 1.43700 | 95.1 |
| 23 | 23.86640 | 2.98500 | | |
| 24* | 20.77500 | 4.22820 | 1.55332 | 71.7 |
| 25* | −42.99280 | 0.84680 | | |
| 26 | 110.33790 | 1.68360 | 1.49700 | 81.6 |
| 27 | −78.98650 | Variable | | |
| 28 | 39.75650 | 0.70000 | 1.71300 | 53.9 |
| 29 | 17.52600 | Variable | | |
| 30 | −107.47930 | 0.80000 | 1.69680 | 55.5 |
| 31 | 219.68610 | Variable | | |
| 32* | 80.30470 | 3.49560 | 1.68893 | 31.1 |
| 33* | −111.76820 | (BF) | | |
| Image surface | ∞ | | | |

TABLE 26

(Aspherical data)

Surface No. 6

K = 0.00000E+00, A4 = 2.92295E−05, A6 = −2.77938E−07,
A8 = 4.36039E−09 A10 = −2.86037E−11, A12 = 9.00389E−14,
A14 = −1.03590E−16

TABLE 26-continued (Aspherical data)

Surface No. 7

K = 0.00000E+00, A4 = −1.21297E−06, A6 = −2.42077E−07,
A8 = 2.98497E−09 A10 = 1.59841E−11, A12 = 0.00000E+00,
A14 = 0.00000E+00

Surface No. 18

K = 0.00000E+00, A4 = 3.55443E−05, A6 = 5.69761E−08,
A8 = −2.07667E−10 A10 = 1.79910E−12, A12 = 0.00000E+00,
A14 = 0.00000E+00

Surface No. 24

K = 0.00000E+00, A4 = −3.23626E−05, A6 = 1.51506E−07,
A8 = −2.18641E−09 A10 = 1.68982E−11, A12 = 0.00000E+00,
A14 = 0.00000E+00

Surface No. 25

K = 0.00000E+00, A4 = −1.60795E−06, A6 = 1.63238E−07,
A8 = −2.48749E−09 A10 = 1.93681E−11, A12 = 0.00000E+00,
A14 = 0.00000E+00

Surface No. 32

K = 0.00000E+00, A4 = 2.66227E−06, A6 = 1.52082E−07,
A8 = −4.23704E−10 A10 = 1.06768E−12, A12 = 0.00000E+00,
A14 = 0.00000E+00

Surface No. 33

K = 0.00000E+00, A4 = 2.26701E−06, A6 = 8.25159E−08,
A8 = 0.00000E+00 A10 = 0.00000E+00, A12 = 0.00000E+00,
A14 = 0.00000E+00

TABLE 27

(Various data in an infinity in-focus condition)

| Zooming ratio | 5.38446 | | |
|---|---|---|---|
|  | Wide-angle limit | Middle position | Telephoto limit |
| Focal length | 12.4801 | 28.9595 | 67.1984 |
| F-number | 2.91218 | 2.91228 | 2.91205 |
| Half view angle | 43.8372 | 20.0953 | 8.9244 |
| Image height | 10.8150 | 10.8150 | 10.8150 |
| Overall length of lens system | 102.8332 | 118.3778 | 148.9552 |
| BF | 13.82700 | 13.82700 | 13.82700 |
| d5 | 0.4500 | 19.6197 | 46.9149 |
| d13 | 15.6326 | 5.2869 | 1.0000 |
| d14 | 8.0000 | 3.0017 | 1.5000 |
| d27 | 2.1000 | 3.7588 | 2.0921 |
| d29 | 4.7260 | 8.6276 | 17.8921 |
| d31 | 0.4500 | 6.6080 | 8.0798 |

Zoom lens unit data

| Lens unit | Initial surface No. | Focal length |
|---|---|---|
| 1 | 1 | 100.90064 |
| 2 | 6 | −14.85327 |
| 3 | 15 | 20.56261 |
| 4 | 28 | −44.54325 |
| 5 | 30 | −103.47001 |
| 6 | 32 | 68.33662 |

TABLE 28

(Various data in a close-object in-focus condition)

|  | Wide-angle limit | Middle position | Telephoto limit |
|---|---|---|---|
| Object distance | 500.0000 | 500.0000 | 500.0000 |
| BF | 13.82700 | 13.82700 | 13.82700 |
| d5 | 0.4500 | 19.6197 | 46.9149 |
| d13 | 15.6326 | 5.2869 | 1.0000 |
| d14 | 8.0000 | 3.0017 | 1.5000 |
| d27 | 2.3773 | 4.6438 | 4.8960 |
| d29 | 4.4486 | 7.7426 | 15.0882 |
| d31 | 0.4500 | 6.6080 | 8.0798 |

Numerical Example 8

The zoom lens system of Numerical Example 8 corresponds to Embodiment 8 shown in FIG. 29. Table 29 shows the surface data of the zoom lens system of Numerical Example 8. Table 30 shows the aspherical data. Table 31 shows the various data in an infinity in-focus condition. Table 32 shows the various data in a close-object in-focus condition.

TABLE 29

(Surface data)

| Surface number | r | d | nd | vd |
|---|---|---|---|---|
| Object surface | ∞ | | | |
| 1 | 227.61690 | 2.00000 | 1.84666 | 23.8 |
| 2 | 86.81160 | 6.87020 | 1.72916 | 54.7 |
| 3 | −1546.01880 | 0.20000 | | |
| 4 | 63.95050 | 5.10230 | 1.72916 | 54.7 |
| 5 | 158.74650 | Variable | | |
| 6* | 113.18320 | 1.00000 | 1.80998 | 40.9 |
| 7* | 12.92370 | 9.79380 | | |
| 8 | −14.37730 | 0.70000 | 1.61800 | 63.4 |
| 9 | −50.65100 | 0.28040 | | |
| 10 | 193.10770 | 2.71420 | 1.92286 | 20.9 |
| 11 | −24.45220 | 0.31770 | | |
| 12 | −21.29610 | 0.70000 | 2.00100 | 29.1 |
| 13 | −42.76920 | Variable | | |
| 14(Diaphragm) | ∞ | Variable | | |
| 15 | 28.55430 | 3.71730 | 2.00100 | 29.1 |
| 16 | 127.42490 | 1.64310 | | |
| 17 | −48.11500 | 1.00000 | 1.77200 | 50.0 |
| 18* | 1749.95580 | 0.19990 | | |
| 19 | 24.12910 | 6.64610 | 1.49700 | 81.6 |
| 20 | −23.26960 | 0.20000 | | |
| 21 | 463.81640 | 0.60000 | 1.75520 | 27.5 |
| 22 | 13.63220 | 7.62990 | 1.43700 | 95.1 |
| 23 | 28.49360 | 1.80950 | | |
| 24* | 21.68160 | 4.28860 | 1.55332 | 71.7 |
| 25* | −48.99160 | 0.95240 | | |
| 26 | 226.24280 | 1.48990 | 1.49700 | 81.6 |
| 27 | −91.45470 | Variable | | |
| 28 | 42.51420 | 0.70000 | 1.72916 | 54.7 |
| 29 | 21.80840 | Variable | | |
| 30 | −56.43680 | 0.80000 | 1.59349 | 67.0 |
| 31 | −63.65110 | Variable | | |
| 32* | 135.10710 | 3.50000 | 1.68893 | 31.1 |
| 33* | −490.76620 | (BF) | | |
| Image surface | ∞ | | | |

TABLE 30

(Aspherical data)

Surface No. 6

K = 0.00000E+00, A4 = 1.80892E−05, A6 = −2.15932E−07,
A8 = 3.43296E−09 A10 = −2.27876E−11, A12 = 7.40419E−14,
A14 = −9.29925E−17

Surface No. 7

K = 0.00000E+00, A4 = −1.11122E−05, A6 = −3.22483E−07,
A8 = 3.77212E−09 A10 = −6.28073E−12, A12 = 0.00000E+00,
A14 = 0.00000E+00

Surface No. 18

K = 0.00000E+00, A4 = 3.16852E−05, A6 = 5.79090E−08,
A8 = −6.87722E−11 A10 = 1.45094E−12, A12 = 0.00000E+00,
A14 = 0.00000E+00

Surface No. 24

K = 0.00000E+00, A4 = −2.63349E−05, A6 = 8.77694E−08,
A8 = −1.58505E−09 A10 = 1.19450E−11, A12 = 0.00000E+00,
A14 = 0.00000E+00

Surface No. 25

K = 0.00000E+00, A4 = −1.39303E−06, A6 = 1.07626E−07,
A8 = −1.94758E−09 A10 = 1.41853E−11, A12 = 0.00000E+00,
A14 = 0.00000E+00

Surface No. 32

K = 0.00000E+00, A4 = 7.59943E−06, A6 = −1.33327E−07,
A8 = 9.60265E−11 A10 = −1.11965E−12, A12 = 0.00000E+00,
A14 = 0.00000E+00

Surface No. 33

K = 0.00000E+00, A4 = 1.03724E−05, A6 = −1.84573E−07,
A8 = 0.00000E+00 A10 = 0.00000E+00, A12 = 0.00000E+00,
A14 = 0.00000E+00

TABLE 31

(Various data in an infinity in-focus condition)

| Zooming ratio | 5.38460 | | |
|---|---|---|---|
| | Wide-angle limit | Middle position | Telephoto limit |
| Focal length | 12.4800 | 28.9583 | 67.1996 |
| F-number | 2.91212 | 2.91236 | 2.91207 |
| Half view angle | 43.7258 | 20.1921 | 8.9222 |
| Image height | 10.8150 | 10.8150 | 10.8150 |
| Overall length of lens system | 112.0649 | 127.2929 | 159.3963 |
| BF | 14.00000 | 14.00000 | 14.00000 |
| d5 | 0.4500 | 18.5943 | 48.3326 |
| d13 | 16.7621 | 5.2699 | 1.0000 |
| d14 | 8.0000 | 2.9236 | 1.5000 |
| d27 | 2.0983 | 3.6697 | 2.1023 |
| d29 | 5.4423 | 9.5520 | 17.2418 |
| d31 | 0.4560 | 8.4273 | 10.3639 |

Zoom lens unit data

| Lens unit | Initial surface No. | Focal length |
|---|---|---|
| 1 | 1 | 102.65920 |
| 2 | 6 | −14.54474 |
| 3 | 15 | 23.16166 |
| 4 | 28 | −62.29865 |
| 5 | 30 | −875.13741 |
| 6 | 32 | 154.12833 |

TABLE 32

(Various data in a close-object in-focus condition)

|  | Wide-angle limit | Middle position | Telephoto limit |
|---|---|---|---|
| Object distance | 500.0000 | 500.0000 | 500.0000 |
| BF | 14.00000 | 14.00000 | 14.00000 |
| d5 | 0.4500 | 18.5943 | 48.3326 |
| d13 | 16.7621 | 5.2699 | 1.0000 |
| d14 | 8.0000 | 2.9236 | 1.5000 |
| d27 | 2.4959 | 4.9150 | 6.4012 |
| d29 | 5.0446 | 8.3067 | 12.9429 |
| d31 | 0.4560 | 8.4273 | 10.3639 |

The following Table 33 shows the corresponding values to the individual conditions in the zoom lens systems of each of Numerical Examples.

TABLE 33

(Values corresponding to conditions)

| Condition | Numerical Example | | | | | | | |
|---|---|---|---|---|---|---|---|---|
|  | 1 | 2 | 3 | 4 | 5 | 6 | 7 | 8 |
| (1) $|f_6/f_2|$ | 4.35 | 15.00 | 4.46 | 7.50 | 3.94 | 7.63 | 4.60 | 10.60 |
| (2) $ds_W/f_W$ | 0.95 | 0.86 | — | — | — | — | 0.64 | 0.64 |
| (3) $f_{3C}/f_{3B}$ | 2.20 | 1.95 | 1.50 | 1.04 | 1.87 | 0.87 | 3.58 | 4.73 |
| (4) $\beta_{4W}$ | 1.79 | 2.02 | 1.85 | 1.80 | 1.84 | 1.81 | 1.49 | 1.37 |
| (5) $(Ts_W-Ts_M)/f_W$ | 0.65 | 1.07 | 0.23 | 0.40 | 0.44 | 0.59 | 0.29 | 0.23 |

The present disclosure is applicable to a digital still camera, a digital video camera, a camera for a mobile terminal device such as a smart-phone, a camera for a PDA (Personal Digital Assistance), a surveillance camera in a surveillance system, a Web camera, a vehicle-mounted camera or the like. In particular, the present disclosure is applicable to a photographing optical system where high image quality is required like in a digital still camera system or a digital video camera system.

Also, the present disclosure is applicable to, among the interchangeable lens apparatuses according to the present disclosure, an interchangeable lens apparatus having motorized zoom function, i.e., activating function for the zoom lens system by a motor, with which a digital video camera system is provided.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of art in the present disclosure, it is understood that various modifications, replacements, additions, omissions, and the like can be performed in the scope of the claims or in an equivalent scope thereof.

What is claimed is:

1. A zoom lens system, in order from an object side to an image side, comprising:
 a first lens unit having positive optical power;
 a second lens unit having negative optical power;
 a third lens unit having positive optical power;
 a fourth lens unit having negative optical power;
 a fifth lens unit having negative optical power;
 a sixth lens unit having positive optical power; and
 an aperture diaphragm between the second lens unit and the third lens unit,
 wherein
 the zoom lens system satisfies the following condition (1):

$$3.5<|f_6/f_2|<15.5 \qquad (1)$$

where
 $f_2$ is a focal length of the second lens unit, and
 $f_6$ is a focal length of the sixth lens unit, and
 the aperture diaphragm moves along an optical axis independently from the respective lens units in zooming from a wide-angle limit to a telephoto limit at a time of image taking, and
 the zoom lens system satisfies the following condition (2):

$$0.5<ds_W/f_W<1.2 \qquad (2)$$

where
 $ds_W$ is an optical axial distance between the aperture diaphragm and a most object side surface of the third lens unit at the wide-angle limit, and
 $f_W$ is a focal length of the zoom lens system in an infinity in-focus condition at the wide-angle limit.

2. The zoom lens system as claimed in claim 1, wherein the third lens unit, in order from the object side to the image side, comprises:
 a 3A unit having positive optical power;
 a 3B unit having positive optical power; and
 a 3C unit having positive optical power,
 the 3B unit is an image blur compensating lens unit which moves in a direction perpendicular to the optical axis to optically compensate image blur, and
 the zoom lens system satisfies the following condition (3):

$$0.5<f_{3C}/f_{3B}<6.0 \qquad (3)$$

where
 $f_{3C}$ is a focal length of the 3C unit, and
 $f_{3B}$ is a focal length of the 3B unit.

3. The zoom lens system as claimed in claim 1, wherein the fourth lens unit is a focusing lens unit which moves along the optical axis to the image side in focusing from the infinity in-focus condition to a close-object in-focus condition, and
 the zoom lens system satisfies the following condition (4):

$$1.0<\beta_{4W}<2.5 \qquad (4)$$

where
 $\beta_{4W}$ is a paraxial magnification of the fourth lens unit in the infinity in-focus condition at the wide-angle limit.

4. The zoom lens system as claimed in claim 1, wherein the second lens unit moves with respect to an image surface with locus of a convex to the image side in the zooming from the wide-angle limit to the telephoto limit at the time of image taking, and
 the zoom lens system satisfies the following condition (5):

$$0.15<(Ts_W-Ts_M)/f_W<1.30 \qquad (5)$$

where
 $Ts_W$ is an optical axial distance from a most object side surface of the second lens unit to the image surface at the wide-angle limit,
 $Ts_M$ is an optical axial distance from the most object side surface of the second lens unit to the image surface at a middle position,
 $f_W$ is the focal length of the zoom lens system in the infinity in-focus condition at the wide-angle limit, and the middle position is a position at which the zoom lens system has a focal length defined by the following formula:

$$f_M \sqrt{(f_W * f_T)}$$

where $f_M$ is a focal length of the zoom lens system in the infinity in-focus condition at the middle position, $f_W$ is the focal length of the zoom lens system in the infinity in-focus condition at the wide-angle limit, and $f_T$ is a focal length of the zoom lens system in the infinity in-focus condition at the telephoto limit.

5. The zoom lens system as claimed in claim 1, wherein the sixth lens unit is fixed with respect to an image surface in the zooming from the wide-angle limit to the telephoto limit at the time of image taking.

6. The zoom lens system as claimed in claim 1, wherein the fifth lens unit, in order from the object side to the image side, comprises a lens element having negative optical power, and a lens element having positive optical power.

7. An interchangeable lens apparatus comprising:
the zoom lens system as claimed in claim 1; and
a lens mount section which is connectable to a camera body including an image sensor for receiving an optical image formed by the zoom lens system and converting the optical image into an electric image signal.

8. A camera system comprising:
an interchangeable lens apparatus including the zoom lens system as claimed in claim 1; and
a camera body which is detachably connected to the interchangeable lens apparatus via a camera mount section, and includes an image sensor for receiving an optical image formed by the zoom lens system and converting the optical image into an electric image signal.

* * * * *